(12) United States Patent  
Kondo et al.

(10) Patent No.: US 7,054,241 B2
(45) Date of Patent: May 30, 2006

(54) OPTICAL DISC APPARATUS

(75) Inventors: Kenji Kondo, Kadoma (JP); Yuichi Kuze, Settsu (JP); Kenji Fujiune, Takatsuki (JP); Shinichi Yamada, Katano (JP); Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 282 days.

(21) Appl. No.: 10/326,621

(22) Filed: Dec. 19, 2002

(65) Prior Publication Data

US 2003/0147314 A1     Aug. 7, 2003

(30) Foreign Application Priority Data

Dec. 19, 2001  (JP) ............................ 2001-385808
Jan. 15, 2002  (JP) ............................ 2002-005592

(51) Int. Cl.
  *G11B 7/00*   (2006.01)
(52) U.S. Cl. ................................. 369/44.32; 369/53.12
(58) Field of Classification Search ................ 369/116, 369/47.5, 47.51, 44.32, 53.12, 53.28, 44.25, 369/53.32
  See application file for complete search history.

(56) References Cited

U.S. PATENT DOCUMENTS 5,103,436 A      4/1992  Yajika et al.
6,842,414 B1 *   1/2005  Park ........................ 369/53.19

* cited by examiner

*Primary Examiner*—Nabil Hindi
(74) *Attorney, Agent, or Firm*—Akin Gump Strauss Hauer & Feld, LLP

(57) ABSTRACT

An optical disc apparatus comprises: rotating means for rotating an information recording medium; a light source for irradiating a light beam onto a data side of the information recording medium; converging means for converging said light beam; focus error detecting means for detecting a difference between said data side and the focus of the light beam converged by said converging means; focus direction transferring means for transferring said converging means in a direction perpendicular to said data side; focus controlling means for driving said focus direction transferring means based on the output of said focus error detecting means in such a way that said light beam converges on said data side in a predetermined state; tracking direction transferring means for transferring said light source in the radius direction of said information recording medium; and tilt calculating means for calculating average values of the outputs of said focus controlling means obtained for a period of time, which is an integer multiple of a period during which said information recording medium makes one rotation at two different points in said radius direction and calculating an inclination of said data side based on said average values at said two different points.

31 Claims, 27 Drawing Sheets

T
(ONE ROTATION)

OPTICAL DISC APPARATUS

BACKGROUND OF THE INVENTION

1. Field of the Invention

The present invention relates to an optical disc apparatus that records data in an information recording medium such as an optical disc using a light beam or reproduces data recorded in the recording medium, and more particularly, to an optical disc apparatus provided with a mechanism for controlling an angle of incidence of a light beam with respect to the data side of the recording medium.

2. Description of the Related Art

In an optical disc apparatus, with respect to the optical axis of a light beam irradiated onto a recording medium such as an optical disc, an angle by which the data side deviates from the vertical line is called a "tilt angle" and when this tilt angle is not zero, it is considered that tilt angle has occurred. With increasing recording density of a recording medium such as an optical disc, controlling the tilt angle is becoming an important issue. This is because once tilt occurs, deterioration of jitter in a recording or reproduction signal becomes noticeable and it is difficult to secure the performance of the optical disc apparatus.

FIGS. 1A and 1B show a cross section of a light beam projected onto the data side of a disc when no tilt has occurred and when tilt has occurred. On the other hand, FIGS. 2A and 2B are characteristic diagrams showing jitter and an error rate of a reproduced signal with respect to the amount of tilt. As is apparent from FIGS. 1 and 2, tilt causes coma aberration, resulting in a worsening of jitter and an increased error rate in the reproduced signal.

When aberration caused by the tilt exceeds a tolerance, a problem arises that recording or reproduction in an optimum condition is no longer possible and reliability of the data deteriorates. Furthermore, the allowable width of aberration with respect to this tilt angle narrows as the recording density of the optical disc increases and it is difficult to secure the recording or reproduction performance of the apparatus.

An optical disc apparatus is known which not only performs mechanical alignment or adjustment of the optical system and drive system but also introduces tilt control of detecting the tilt angle by providing a dedicated sensor and appropriately tilting the optical head or objective lens, thereby correcting the tilt angle and realizing optimum recording and reproduction in order to secure the recording/reproduction performance for a high-density optical disc.

FIG. 3 is a block diagram showing a configuration of this conventional optical disc apparatus. The conventional optical disc apparatus is disclosed in Japanese Raid-Open Patent Publication No. 2-122432. Focus control and tilt control of the optical disc apparatus shown in FIG. 3 will be explained below.

A light beam generated from a light source 1 such as a semiconductor laser passes through a beam splitter 3 and converges onto and irradiates a data side (information recording side) of an optical disc 2, which is a recording medium, through an objective lens 4, which is converging means for converging the light beam. The returned light of the light beam diffracted and reflected by the data side of the optical disc 2 is reflected by a beam splitter 3 and received and detected by a detector 5, which is photo-receiving means for photo-receiving the returned light. The objective lens 4 is moved in a direction perpendicular to the data side (hereinafter referred to as "focus direction") by a focus actuator 6, which is transferring means, and can thereby change the converging condition of the light beam on the data side of the optical disc 2.

A detection signal carried by the returned light output from the detector 5 is input to an FE signal generation section 7, which is focus error detecting means for generating a focus error signal (FE signal) corresponding to the converging state of the light beam on the data side of the optical disc 2 and an FE signal is generated. The FE signal is input to a phase compensation section 8, and output as a focus drive signal after passing through a phase compensation, low frequency compensation circuits composed of, for example, a digital filter using a DSP (digital signal processor). The focus drive signal is amplified at a focus drive section 9 and the amplified signal drives the focus actuator 6, which realizes focus control whereby the light beam is controlled in such a way that the converging state of the light beam on the data side of the optical disc is always kept in a predetermined converging state.

Then, tilt control by the conventional optical disc apparatus in FIG. 3 will be explained. A tilt sensor 10 that detects an inclination of the optical axis of the light beam irradiated onto the optical disc 2 with respect to the data side is constructed of a light source 42 such as a light-emitting diode that emits light toward the data side of the optical disc 2 and a detector 43 that receives reflected light from the data side and outputs a detection signal.

A tilt actuator 11, which is optical axis tilting means for tilting the optical axis of the light beam irradiated onto the optical disc 2, can change the angle formed by the optical disc 2 and the optical axis of the light beam irradiated onto the optical disc 2 by tilting the optical head 12. A tilt signal generation section 13 generates a tilt signal corresponding to the angle between the data side of the optical disc 2 and the optical axis using the detection signal from the tilt sensor 10. A tilt control section 14 receives the tilt signal and outputs a tilt actuator drive signal to the tilt actuator 11. Thus, the conventional optical disc apparatus realizes tilt control on the optical head 12 in such a way that the light beam is always irradiated onto the signal recording plane of the optical disc 2 in the direction perpendicular to the optical disc 2.

However, the conventional tilt control involves the following problems.

In tilt detection using a tilt sensor, it is difficult to match the detection position by the tilt sensor to the position of the light beam irradiated onto the data side of the optical disc for reasons related to spatial arrangement. This is because the optical head (especially the objective lens 4) always exists under the irradiation position of the light beam on the data side in the vertical direction. Thus, the tilt sensor detects the inclination of the optical disc at a certain distance from the position of the light beam. As a result, when the data side of the optical disc 2 has a curved surface, the tilt sensor cannot correctly detect the tilt angle at the position of the light beam, which produces a problem that it is impossible to perform accurate tilt control.

Furthermore, a difference (zero-point offset) between the tilt angle detected by the tilt sensor and the actual tilt angle is generated due to individual characteristics variation of a tilt censor and an arrangement error, etc., during assembly which occurs between the tilt sensor and the drive mechanism that rotates the optical head 12 and optical disc. To reduce this zero-point offset to a predetermined value or below, it is necessary to precisely adjust each optical disc apparatus in the step of assembling the apparatus. This results in a problem that the production cost of the optical disc apparatus increases.

Furthermore, in the step of assembling the apparatus, even if the zero-point offset is adjusted, errors may occur due to a time variation or temperature characteristic of the tilt sensor. Such an error after the assembly may also produce a problem that precise tilt control cannot be attained using the tilt sensor.

In recent years, commercially available information apparatuses are often strongly required to have small dimensions. However, it is difficult for the above-described conventional optical disc apparatus to reduce the size of the optical head in order to secure a space for mounting the tilt sensor. This makes it difficult to reduce the size of the optical disc apparatus. Furthermore, the tilt sensor itself may be a factor to increase the cost of the optical disc apparatus.

It is an object of the present invention to provide an optical disc apparatus capable of solving at least one of the above-described problems, and recording and reproducing data accurately through appropriate tilt control.

SUMMARY OF THE INVENTION

In one aspect of the present invention, there is provided an optical disc apparatus comprising: rotating means for rotating an information recording medium; a light source for irradiating a light beam onto a data side of the information recording medium; converging means for converging the light beam; focus error detecting means for detecting a difference between the data side and the focus of the light beam converged by the converging means; focus direction transferring means for transferring the converging means in a direction perpendicular to the data side; focus controlling means for driving the focus direction transferring means based on the output of the focus error detecting means in such a way that the light beam converges on the data side in a predetermined state; tracking direction transferring means for transferring the light source in the radius direction of the information recording medium; and tilt calculating means for calculating average values of the outputs of the focus controlling means obtained for a period of time, which is an integer multiple of a period during which the information recording medium makes one rotation at two different points in the radius direction and calculating an inclination of the data side based on the average values at the two different points.

Preferably, the rotating means rotates the information recording medium in such a way that the rotation speed is smaller when the light source is located at the outer radius of the information recording medium than at the inner radius, and the value of the multiple is decreased when the light source is located at the outer radius of the information recording medium than at the inner radius.

In another aspect of the present invention, there is provided an objective lens tilt control apparatus comprising: first driving means for outputting a drive value to drive first focus direction transferring means for transferring one end of an objective lens in the focus direction thereof; second driving means for outputting a drive value to drive second focus direction transferring means for transferring the other end of the objective lens in the focus direction thereof; drive level difference detecting means for detecting the drive values of the first driving means and the second driving means and outputting the difference thereof; and controlling means for controlling the first driving means and the second driving means in such a way that the difference between the drive values becomes a predetermined value.

Preferably, the controlling means controls the first driving means and the second driving means using the difference between the drive values when the first driving means and the second driving means are stopped as a reference level.

Preferably, the controlling means controls the first driving means and the second driving means by electrically separating the first focus direction transferring means and the second focus direction transferring means from the first driving means and the second driving means respectively and using a difference between drive values to be output to the first focus direction transferring means and the second focus direction transferring means when the drive values are set to zero as a reference level.

Preferably, the reference level is updated at predetermined time intervals.

Preferably, the objective lens tilt control apparatus, further comprises a temperature sensor, wherein the reference level is updated when the output of the temperature sensor changes by a predetermined value or more.

In another aspect of the present invention, there is provided an optical disc apparatus comprising: an objective lens for converging a light beam; first focus direction transferring means for transferring one end of the objective lens in the focus direction thereof; second driving means for transferring means for transferring the other end of the objective lens in the focus direction thereof; and any of the objective lens tilt control apparatuses described above.

Preferably, the optical disc apparatus further comprises: rotating means for rotating an information recording medium; a light source for irradiating a light beam onto a data side of the information recording medium; focus error detecting means for detecting a difference between the data side and the focus of the light beam converged by the converging means; tracking direction transferring means for transferring the light source in the radius direction of the information recording medium; and tilt calculating means for obtaining outputs of the focus controlling means at two different points in the radius direction and calculating an inclination of the data side based on the outputs of the two different points, wherein the predetermined value is determined based on the calculation result of the tilt calculating means.

In another aspect of the present invention, there is provided a focus drive apparatus comprising: driving means for outputting a drive value for driving focus direction transferring means for transferring an objective lens in the focus direction thereof; and drive level detecting means for detecting the drive value, wherein using the output of the drive level detecting means when the drive value is set to zero as a reference level, the DC level of the output of the driving means is corrected based on the reference level.

In another aspect of the present invention, there is provided a focus drive apparatus comprising: driving means for outputting a drive value for driving focus direction transferring means for transferring an objective lens in the focus direction thereof; and drive level detecting means for detecting the drive value, wherein using the output of the drive level detecting means when the operation of the driving means is stopped for a predetermined period as a reference level, the DC level of the output of the driving means is corrected based on the reference level.

In another aspect of the present invention, there is provided a focus drive apparatus comprising: driving means for outputting a drive value for driving focus direction transferring means for transferring an objective lens in the focus direction thereof; and drive level detecting means for detecting the drive value, wherein using the output of the drive level detecting means when the drive level detecting means is electrically separated from the focus direction transferring means and a drive value to be output to the focus direction transferring means is set to zero as a reference level, the DC level of the output of the driving means is corrected based on the reference level.

Preferably, the reference level is updated at predetermined time intervals.

Preferably, the focus drive apparatus further comprises a temperature sensor, wherein the reference level is updated when the output of the temperature sensor changes by a predetermined value or more.

In another aspect of the present invention, there is provided an optical disc apparatus comprising: an objective lens for converging a light beam; focus direction transferring means for transferring the objective lens in the focus direction thereof; focus error detecting means for generating a focus error signal indicating a difference between the focus of the light beam converged by the objective lens and a predetermined position; any of the focus drive apparatuses described above; and control element means for controlling the driving means in such a way that the focus error signal and the output of the drive level detecting means have a predetermined relationship.

Preferably, the optical disc apparatus further comprises: rotating means for rotating an information recording medium; and a light source for irradiating the light beam onto a data side of the information recording medium.

In another aspect of the present invention, there is provided a tracking drive apparatus comprising: driving means for outputting a drive value for driving tracking direction transferring means for transferring an objective lens in a radius direction of an information recording medium; and drive level detecting means for detecting the drive value, wherein using the output of the drive level detecting means when the drive value is set to zero as a reference level, the DC level of the output of the driving means is corrected based on the reference level.

In another aspect of the present invention, there is provided a tracking drive apparatus comprising: driving means for outputting a drive value for driving tracking direction transferring means for transferring an objective lens in a radius direction of an information recording medium; and drive level detecting means for detecting the drive value, wherein using the output of the drive level detecting means when an operation of the driving means is stopped for a predetermined period as a reference level, the DC level of the output of the driving means is corrected based on the reference level.

In another aspect of the present invention, there is provided a tracking drive apparatus comprising: driving means for outputting a drive value for driving tracking direction transferring means for transferring an objective lens in a radius direction of an information recording medium; and drive level detecting means for detecting the drive value, wherein using the output of the drive level detecting means when the drive level detecting means is electrically separated from the tracking direction transferring means and a drive value to be output to the tracking direction transferring means is set to zero as a reference level, the DC level of the output of the driving means is corrected based on the reference level.

Preferably, the reference level is updated at predetermined time intervals.

Preferably, the tracking drive apparatus further comprises a temperature sensor, wherein the reference level is updated when the output of the temperature sensor changes by a predetermined value or more.

In another aspect of the present invention, there is provided an optical disc apparatus comprising: an objective lens for converging a light beam; tracking direction transferring means for transferring the objective lens in a radius direction of an information recording medium; tracking error detecting means for generating a tracking error signal indicating a difference between the light beam converged by the objective lens and a predetermined position; the tracking drive apparatus described above; and control element means for controlling the driving means in such a way that the tracking error signal and the output of the drive level detecting means have a predetermined relationship.

Preferably, the optical disc apparatus further comprises: rotating means for rotating an information recording medium; and a light source for irradiating the light beam onto a data side of an information recording medium.

In another aspect of the present invention, there is provided an objective lens tilt control apparatus comprising: driving means for outputting a drive value for driving objective lens tilting means for changing tilt of an objective lens; and drive level detecting means for detecting the drive value, wherein using the output of the drive level detecting means when the drive value is set to zero as a reference level, the DC level of the output of the driving means is corrected based on the reference level.

In another aspect of the present invention, there is provided an objective lens tilt control apparatus comprising: driving means for outputting a drive value for driving objective lens tilting means for changing tilt of an objective lens; and drive level detecting means for detecting the drive value, wherein using the output of the drive level detecting means when the operation of the driving means is stopped for a predetermined period as a reference level, the DC level of the output of the driving means is corrected based on the reference level.

In another aspect of the present invention, there is provided an objective lens tilt control apparatus comprising: driving means for outputting a drive value for driving objective lens tilting means for changing tilt of an objective lens; and drive level detecting means for detecting the drive value, wherein using the output of the drive level detecting means when the drive level detecting means is electrically separated from the objective lens tilting means and a drive value to be output to the tracking direction transferring means is set to zero as a reference value, the DC level of the output of the driving means is corrected based on the reference level.

Preferably, the reference level is updated at predetermined time intervals.

Preferably, the objective lens tilt control apparatus further comprises a temperature sensor, wherein the reference level is updated when the output of the temperature sensor changes by a predetermined value or more.

In another aspect of the present invention, there is provided an optical disc apparatus comprising: an objective lens for converging a light beam; objective lens tilting means for changing tilt of the objective lens; any of the objective lens tilt control apparatuses described above; and control element means for controlling the driving means in such a way that the output of the drive level detecting means has a predetermined value.

In another aspect of the present invention, there is provided an the optical disc apparatus further comprises: rotating means for rotating an information recording medium; and a light source for irradiating the light beam onto a data side of the information recording medium.

In another aspect of the present invention, there is provided an optical disc apparatus comprising: a light source for irradiating a light beam onto a data side of an information recording medium; converging means for converging the light beam; transferring means for transferring the converging means in such a way that the distance between the converging means and the data side changes; photo-receiving means for receiving returned light of the light beam reflected by the data side; converging state detecting means for generating a signal according to a converging state of the light beam on the data side of the information recording medium based on a signal from the photo-receiving means; focus controlling means for outputting a drive signal to the transferring means based on a signal from the converging state detecting means and controlling the light beam in such a way that the light beam is in a predetermined converging state; tilting means for tilting the converging means; tilt calculating means for determining at least one calculation expression used for calculating a shape of the data side based on the drive signal and determining an amount of tilt of the data side and the converging means using the determined calculation expression; and tilt controlling means for driving the tilting means according to the amount of tilt and irradiating the light beam onto the data side in a direction substantially perpendicular to the data side.

Preferably, the tilt calculating means updates the determined calculation expression based on the drive signal obtained after the calculation expression is determined.

Preferably, after setting the information recording medium in the optical disc apparatus and before recording or reproducing the information recording medium, the tilt calculating means executes initial detection of a drive signal to determine the calculation expression and complementary detection of a drive signal to update the calculation expression while recording or reproducing the information recording medium.

Preferably, the tilt calculating means determines the calculation expression at a plurality of detection points set at different radius positions of the data side based on drive signals obtained when the light beam irradiates the data side.

Preferably, the tilt calculating means detects a drive signal and updates the calculation expression every time the light beam arrives at or passes through any one of the plurality of detection points while performing recording or reproduction on the information recording medium.

Preferably, the tilt calculating means detects the drive signal at a plurality of positions in the radius direction of the information recording medium before the initial detection, decides a deflected shape of the data side from the detection result and determines the position of a detection point for detecting a drive signal during the initial detection and the complementary detection based on the decision result.

Preferably, when the tilt calculating means decides that the deflected shape of the data side is a first shape, the tilt calculating means sets a plurality of detection points during the initial detection and the complementary detection in such a way that the plurality of detection points are placed more densely at the inner radius and outer radius than the intermediate radius of the data side, and when the tilt calculating means decides that the deflected shape of the data side is a second shape, the tilt calculating means sets the plurality of detection points during the initial detection and the complementary detection in such a way that the plurality of detection points are spaced uniformly at the inner radius, intermediate radius and outer radius.

Preferably, the optical disc apparatus further comprises error detecting means for detecting a write error that occurs when data is recorded on the data side or a read error that occurs when data recorded on the data side is reproduced, wherein the drive signal used to update the calculation expression during the complementary detection is detected based on the signal of the error detecting means.

Preferably, the error detecting means further comprises code error correcting means for detecting and correcting code errors of data reproduced from the information recording medium and the complementary detection is executed every time the number of code errors of the code error correcting means exceeds a predetermined value.

Preferably, the error detecting means further comprises address error detecting means for detecting reproduction errors of address information corresponding to position information of the data side and the complementary detection is executed every time the number of the reproduction errors exceeds a predetermined value.

Preferably, the optical disc apparatus further comprises buffering means for temporarily storing data reproduced from the information recording medium and data recorded on the information recording medium, wherein the complementary detection is executed based on an amount of data stored in the buffering means.

Preferably, time intervals of detecting the drive signal during the complementary detection are different when data is reproduced from the information recording medium and when data is recorded in the information recording medium.

Preferably, the optical disc apparatus further comprises a temperature sensor, wherein the complementary detection is performed when the output of the temperature sensor changes by a predetermined value or more.

Preferably, the calculation expression of the tilt calculating means includes a deflection function to approximate tilt on the data side and the degree of the deflection function is set when the calculation expression is updated during the complementary detection.

Preferably, the optical disc apparatus further comprises rotating means for rotating the information recording medium at a predetermined number of rotations, wherein the drive signal output by focus controlling means is an average value of a period which is an integer multiple of a period during which the information recording medium makes one rotation.

Preferably, the optical disc apparatus further comprises: rotating means for rotating the information recording medium at a predetermined number of revolutions; and rotation controlling means for controlling the rotating means to a constant linear velocity when recording or reproduction is carried out on the information recording medium and controlling the rotating means to a constant angular velocity during the initial detection.

Preferably, when the drive signal is detected twice or more at one of the plurality of detection points, the tilt calculating means updates the calculation expression using an average value of drive signal values obtained so far.

Preferably, when the drive signal is detected twice or more at one of the plurality of detection points and the detection result is outside a predetermined range, with respect to a value of the drive signal which has been detected and obtained so far, the tilt calculating means decides the detection result to be inaccurate and stops the update of the calculation expression.

Preferably, the at least one calculation expression includes a deflection function that approximates deflection of the data side and a tilt approximate function that indicates tilt at an arbitrary position in the radius direction.

Preferably, the calculation expression of the tilt calculating means includes a line graph function.

Preferably, the tilt calculating means detects a drive signal every time the light beam arrives at or passes through any one of the plurality of detection points while recording or reproducing is being performed on the information recording medium and updates all drive signal values used when deciding the line graph function based on the detection result and updates the line graph based on the updated drive signal value.

Preferably, a plurality of detection points during the initial detection and the complementary detection is set so that the detection points are more densely located at the inner radius and outer radius than the intermediate radius of the data side.

Preferably, when the data side of the information recording medium includes a first and second recording layers, the tilt calculating means determines at least one calculation expression used to calculate the shape of the first and second recording layers and calculates an amount of tilt of the first and second recording layers and the converging means using the determined calculation expression.

Preferably, the transferring means includes a pair of focus actuators which drive the converging means in an approximately perpendicular direction to the data side, and the tilting means is the pair of focus actuators which drives the conversing means so as to incline with respect to the data side.

Preferably, the transferring means includes a pair of focus actuators which drive the converging means in an approximately perpendicular direction to the data side, and the tilting means includes a tilt actuator which drives the conversing means so as to incline with respect to the data side.

Preferably, the transferring means includes a pair of focus actuators which drive the converging means in an approximately perpendicular direction to the data side, and the tilting means is the pair of focus actuators which drives the converging means so as to incline with respect to the data side.

Preferably, the transferring means includes a pair of focus actuators which drive the converging means in an approximately perpendicular direction to the data side, and the tilting means includes a tilt actuator which drives the converging means so as to incline with respect to the data side.

In another aspect of the present invention, there is provided a method of driving an objective lens comprising: a step of outputting a drive signal for driving an objective lens in a predetermined direction; a step of detecting the drive signal; and a step of using a value detected in the detecting step when the drive signal is set to zero as a reference level and correcting the DC level of the drive signal based on the reference level.

In another aspect of the present invention, there is provided a method of driving an objective lens comprising: a step of outputting a drive signal for driving an objective lens in a predetermined direction; a step of detecting the drive signal; and a step of using a value detected in the detecting step when the output of the drive signal is stopped for a predetermined period as a reference level and correcting the DC level of the drive signal based on the reference level.

In another aspect of the present invention, there is provided a method of driving an objective lens comprising: a step of outputting a drive signal for driving transferring means for transferring an objective lens in a predetermined direction; a step of detecting the drive signal; and a step of using a value detected in the detecting step when means for outputting the drive signal is electrically separated from the transferring means and the drive signal is set to zero as a reference level and correcting the DC level of the drive signal based on the reference level.

Preferably, the predetermined direction is a focus direction.

Preferably, the predetermined direction is a tracking direction.

Preferably, the predetermined direction is a tilt direction.

In another aspect of the present invention, there is provided a method of controlling an optical disc apparatus comprising: a step of driving converging means for converging a light beam irradiated onto a data side of an information recording medium in a direction perpendicular to the data side so as to change the converging state of the light beam; a step of receiving returned light of the light beam reflected by the data side; a step of generating a signal according to the converging state of the light beam on the data side of the information recording medium based on a signal from the photo-receiving means; a step of outputting a drive signal to means for transferring the converging means based on a signal from the converging state detecting means and controlling the light beam in such a way that the beam is in a predetermined converging state; a step of determining at least one calculation expression used to calculate the shape of the data side based on the drive signal and calculating an amount of tilt of the data side and the converging means using the determined calculation expression; and a step of driving means for changing tilt of the converging means according to the amount of tilt and controlling the light beam in such a way that the light beam is irradiated onto the data side in a direction substantially perpendicular to the data side.

In another aspect of the present invention, there is provided a method of controlling an optical disc apparatus comprising the steps of: (A) acquiring a plurality of focus drive signals which are obtained by irradiating a light beam a data side of an information recording medium at a plurality of detection positions different with each other in a radial direction of the information recording medium, under the condition that a focus control is conducted such that the light beam irradiating the data side is in a predetermined conversing state; (B) determining at least one calculation expression used for calculating a shape of the data side based on the acquired focus drive signals; and (C) calculating an amount of tile of the data side by using the determined calculation expression and changing the tile of an objective lens based on the calculated amount of the tilt.

Preferably, the method further comprises the steps of: (D) acquiring at least one focus drive signal which is obtained by irradiating a light beam onto a data side at at least one predetermined detection position under the focus control state, after performing step (B); (E) updating the calculation expression based on the focus drive signals acquired in steps (A) and (D); and (F) calculating the amount of tile of the data side by using the updated calculation expression and changing the tile of an objective lens based on the calculated amount of the tilt.

In another aspect of the present invention, there is provided a method of controlling an optical disc apparatus comprising the steps of: (A) acquiring a plurality of focus drive signals which are obtained by irradiating a light beam a data side of an information recording medium at a plurality of detection positions different with each other in a radial direction of the information recording medium, under the condition that a focus control is conducted such that the light beam irradiating the data side is in a predetermined conversing state; (B) determining at least one calculation expression used for calculating a shape of the data side based on the acquired focus drive signals; and (C) calculating an amount of tilt of the data side by using the determined calculation expression and changing the tilt of an objective lens based on the calculated amount of the tilt.

Preferably the steps (D) to (F) are performed based on a result of detecting a write error that occurs when data is recorded on the data side or a read error that occurs when data recorded on the data side is reproduced.

Preferably, the steps (D) to (F) are performed based on an amount of data stored in a buffer for temporarily storing data reproduced from the information recording medium and data recorded on the information recording medium.

Preferably, the method further comprises the step of detecting a temperature in the optical disc apparatus, wherein the steps (D) to (F) are performed in the case where the change of the temperature exceeds a predetermined value.

Preferably, the detection positions where the focus drive signals are acquired in steps (A) and (D) are arranged more densely at an inner radius and an outer radius of the information recording medium than at an intermediate radius.

Preferably, calculation expression includes a polygonal line graph function.

Preferably, the method further comprises the step of correct all the focus drive signals acquired in step (A) based on the focus drive signal acquired in step(D), and wherein step (E) is performed based on the corrected focus drive signals.

Preferably, the acquisition of each of the focus drive signals is performed during an integer multiple of a period during which the information recording medium makes one rotation, and the average value by the acquisition is used for the respective focus drive signal.

In another aspect of the present invention, there is provided a computer-readable recording medium that records a program that allows a computer to execute the steps specified in any of the methods described above.

DETAILED DESCRIPTION OF PREFERRED EMBODIMENTS

An inclination of a light beam axis with respect to a data side of an optical disc can be divided into a radius direction and a circumferential direction of the optical disc. The present invention handles the tilt in the radius direction of the optical disc. Hereinafter, the tilt in the radius direction of the optical disc (tilt in a radial direction) will be simply referred to as "tilt" or a "tilt angle" in the present Specification. A reproduced signal processing circuit is constructed in such a way that influences of the circumferential direction on the tilt are removed through signal processing.

Figure 1A:
FIG. 1A shows a cross section of a light beam projected on a data side of a disc when no tilt is generated on the disc and FIG. 1B shows a cross section of a light beam projected on the data side of the disc when tilt is generated.
Figure 1B:
Figure 2A:
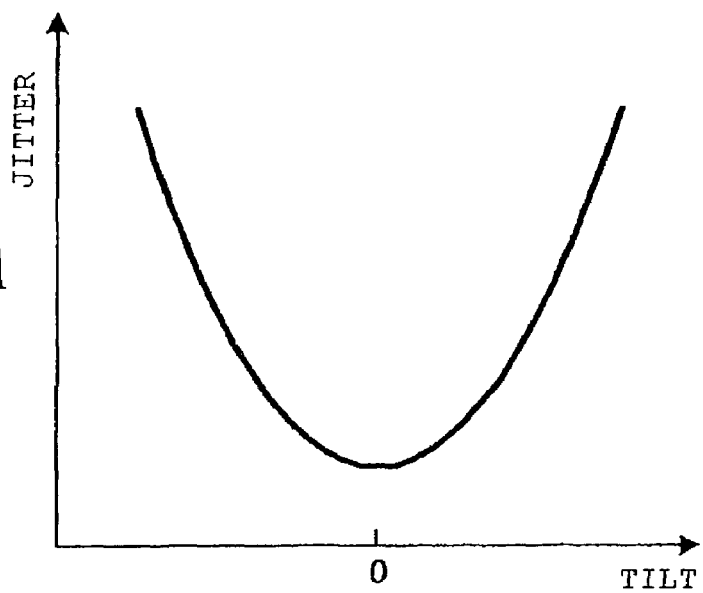
FIGS. 2A and 2B are, when tilt is generated on the disc, graphs showing relationships between an amount of tilt of the disc and jitter of a reproduced signal and between an amount of tilt of the disc and an error rate, respectively.
Figure 2B:
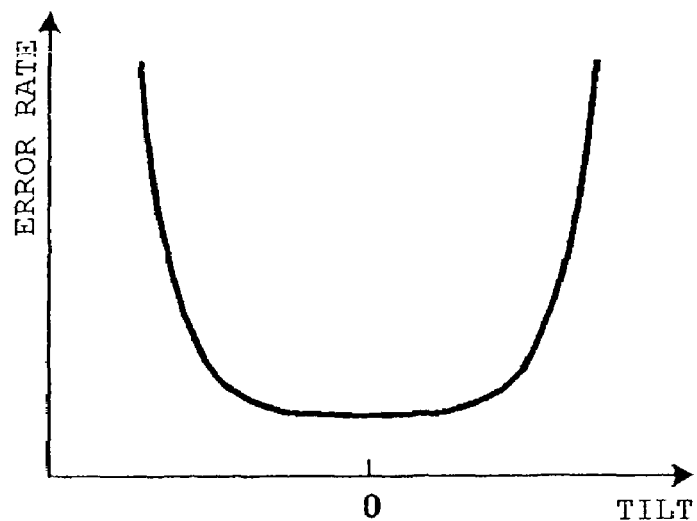
Figure 3:
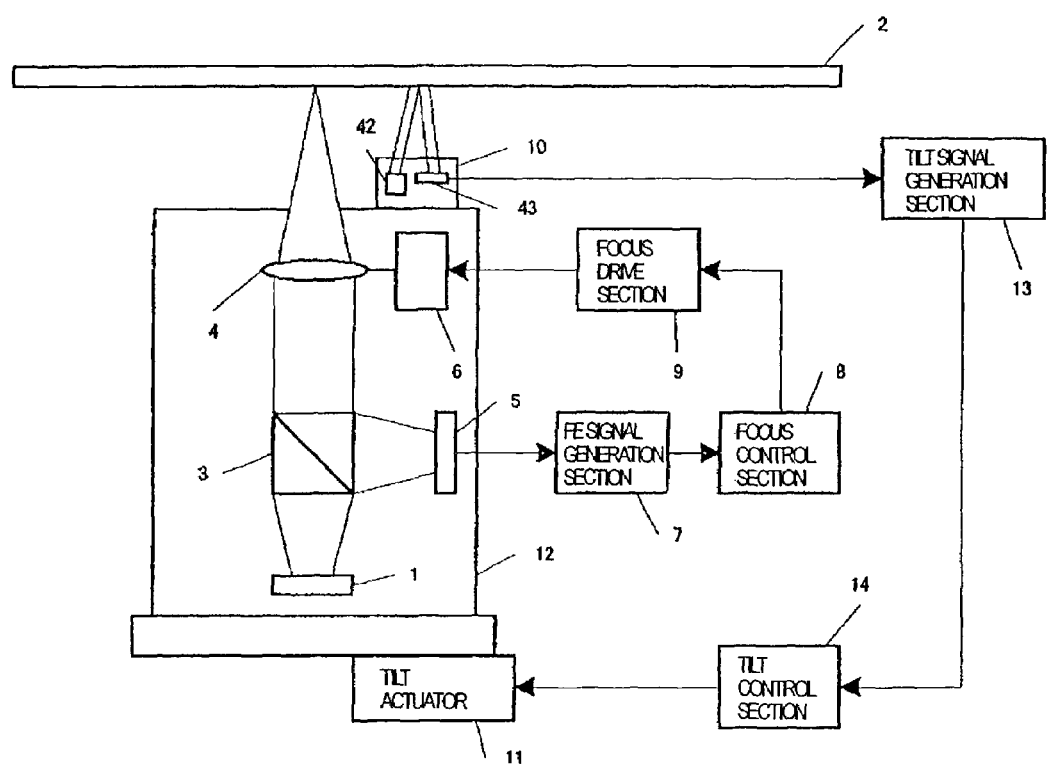
FIG. 3 is a block diagram showing a configuration of an optical disc apparatus according to a conventional art.
Figure 4A:
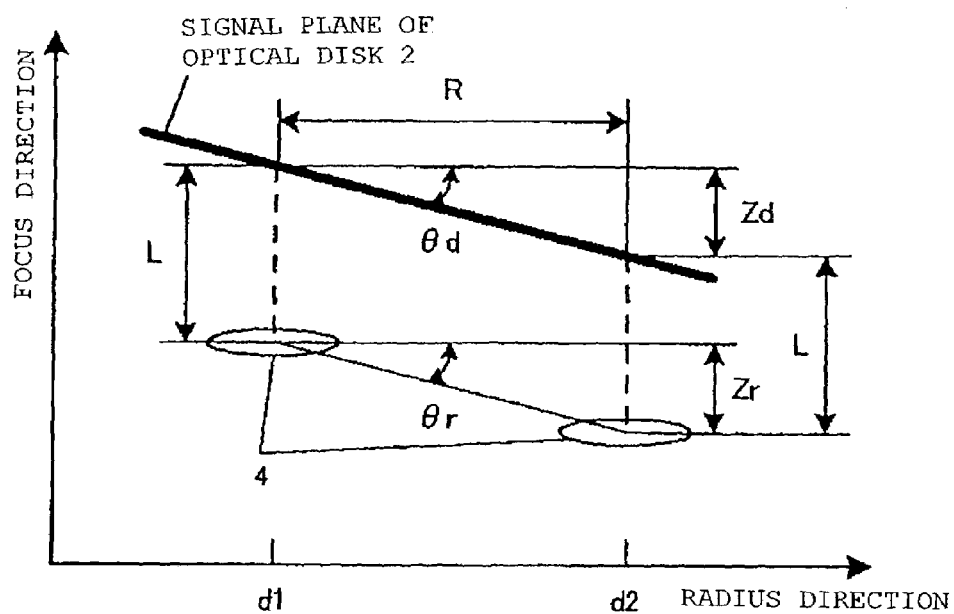
FIG. 4A is a schematic view of relative positions of an objective lens 4 and a data side of an optical disc 2 when tilt is generated and FIG. 4B is a schematic view of a relationship between the position of an optical head and a focus drive signal value at that position.
Figure 4B:
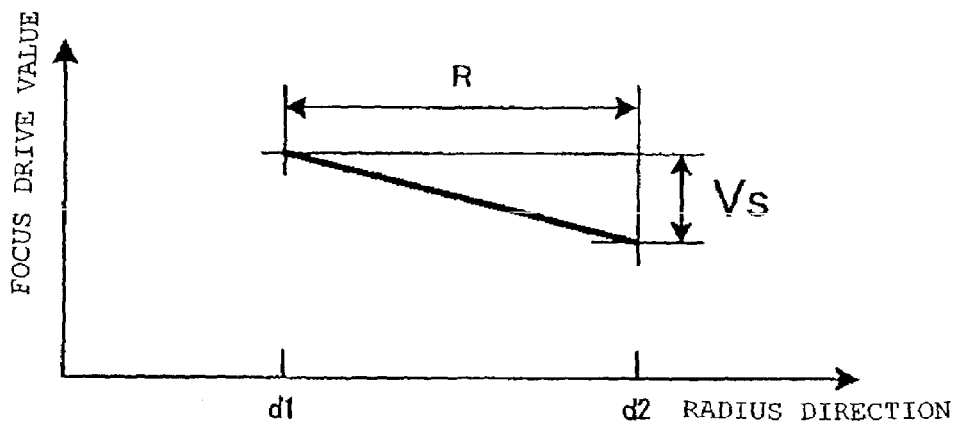

First, detection of a tilt angle using a focus drive signal, which is a technology commonly used in embodiments of the present invention will be explained. FIG. 4 is a schematic view showing a relationship between relative positions of the objective lens 4 and the data sides of the optical disc 2, and focus drive values. As is explained with reference to FIG. 3, the optical disc apparatus performs focus control by driving the focus actuator in such a way that a light beam is always in a predetermined converging condition on the data side of the optical disc 2. Therefore, while focus control is in progress, the distance between the data side of the optical disc 2 and the objective lens 4 is constant (L) irrespective of the radius position. When the optical disc 2 is inclined, the position of the objective lens 4 changes accordingly, and therefore a difference between the positions of the objective lens 4 at radius positions d1 and d2 is Zr.

This Zr becomes equal to a difference Zd between the heights of the data side at radius positions d1 and d2 of the optical disc 2. Since an inclination θd of the disc with respect to the horizontal plane is equal to an angle θr formed by a line connecting the positions of the objective lens 4 at the radius positions d1 and d2 and the horizontal plane, it is possible to calculate an inclination of the data side of the optical disc 2 from Zr and a difference R between the radius positions d1 and d2 according to the following expression (1):

$$\theta d = \theta r = \tan^{-1}(Zr/R) \tag{1}$$

Furthermore, the relationship between a focus drive value which is a drive input to control the focus actuator and a variation of the objective lens 4 is known beforehand, and therefore the position of the objective lens 4 in the focus direction can be calculated from the focus drive value. Here, assuming that a relationship between the focus drive value and the variation of the objective lens 4 in the focus direction is Pf and a difference between the focus drive values at the radius positions d1 and d2 is Vs, according to expression (1), θd can be expressed by the following expression (2):

$$\theta d = \tan^{-1}(Pf \times Vs/R) \tag{2}$$

For example, since an inclination generated on the optical disc 2 such as a CD or DVD is on the order of 1 degree, there may be almost no error when θd is approximated as shown in the following expression (3):

$$\theta d \approx Pf \times Vs/R \tag{3}$$

As shown above, the variation of the focus drive value with respect to the radius position is almost equal to a variation of the amount of deflection of the data side with respect to the radius direction. Thus, it is possible to detect a radial tilt angle by detecting a predetermined radius position and this focus drive value taking advantage of this relationship.

In the following embodiments, an optical disc apparatus and control method for calculating a radial tilt from this focus drive value (signal) and performing tilt control using the calculation result will be explained. Especially, the first to fourth embodiments mainly relate to a method of controlling a light beam and the fifth to seventh embodiments mainly relate to a method of detecting tilt of the data side of the optical disc and correcting the tilt based on the detected tilt angle.

First Embodiment

Figure 5:
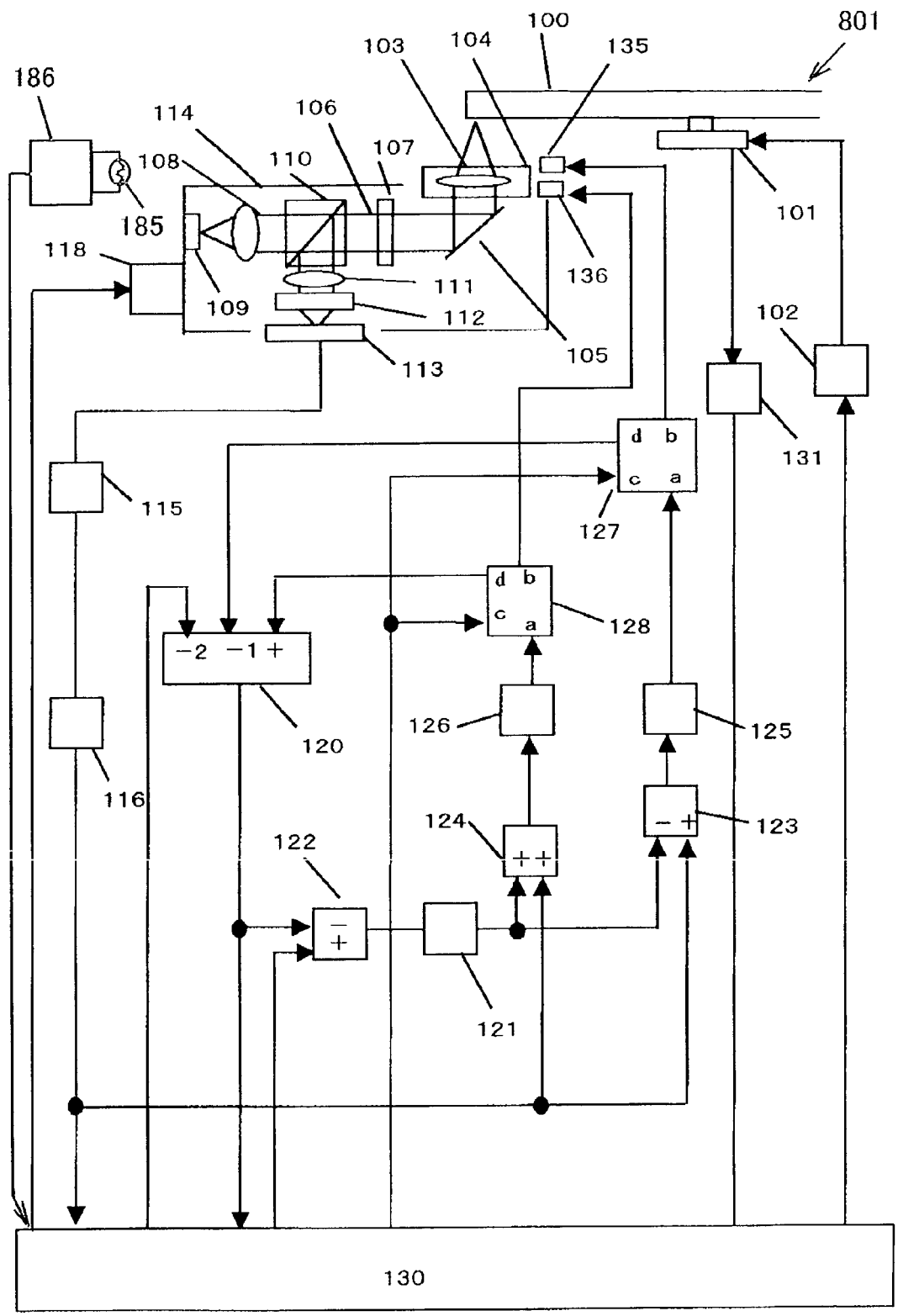
FIG. 5 is a block diagram showing a first embodiment of an optical disc apparatus of the present invention.

FIG. 5 is a block diagram showing a first embodiment of an optical disc apparatus according to the present invention. In an optical disc apparatus 801, an optical disc 100 is attached to a motor 101 which corresponds to rotating means and rotates at a predetermined number of revolutions. The motor 101 is controlled by a motor control section 102 that corresponds to rotation controlling means. The number of revolutions of the motor 101 is set by a microcomputer 130. A rotation detection section 131 outputs a pulse every time the motor 101 makes one rotation. Hereafter, this signal will be described as one-rotation signal. A one-rotation signal is sent to the microcomputer 130.

The optical disc 100 has a substrate of a predetermined thickness, one side of which constitutes a data side and is irradiated with a light beam. On the data side, spiral-shaped tracks made of projections and depressions are formed. An optical head 114 is provided with an objective lens 103, a laser 109 which serves as a light source to emit a light beam, a coupling lens 108, a beam splitter 110, a ¼ wavelength plate 107, a total reflector 105, a detection lens 111, a cylindrical lens 112, a detector 113 and an actuator 104.

A transfer motor 118 functions as means for moving the tracking direction and moves the optical head 114 in the radius direction of the optical disc 100 (horizontal direction in the figure). The transfer motor 118 is controlled by the microcomputer 130.

A light beam 106 generated by the laser 109 is transformed into parallel light by a coupling lens 108, then passes through a beam splitter 110 and ¼ wavelength plate 107, is reflected by the total reflector 105, converged and irradiated onto the data side of the optical disc 100 by the objective lens 103.

The light reflected by the data side of the optical disc 100 passes through the objective lens 103, is reflected by the total reflector 105, passes through the ¼ wavelength plate 107, beam splitter 110, detection lens 111 and cylindrical lens 112 and enters the detector 113 made up of a photo-reception section which is divided into a plurality of sections (4 sections in this embodiment). The objective lens 103 is attached to a movable section (hereinafter described as "lens holder") of the actuator 104. The actuator 104 includes a first focus coil 135, a second focus coil 136, a first focus permanent magnet (not shown) and a second focus permanent magnet (not shown). The actuator 104 and first focus coil 135, and actuator 104 and second focus coil 136 function as first focus direction controlling means and second focus direction controlling means, respectively. The first focus direction controlling means and second focus direction controlling means function as the focus direction moving means.

The first focus coil 135 and the second focus coil 136 are attached to a fixed section of the actuator 104. Furthermore, the first focus permanent magnet and second focus permanent magnet are attached to the lens holder.

The first focus coil 135 and the second focus coil 136 are placed in the radius direction of the optical disc 100 on both sides of the objective lens 103. Because of difficulty in correct illustration, FIG. 5 shows the first focus coil 135 and the second focus coil 136 placed on one side of the objective lens 103.

When an equal voltage is applied to the first focus coil 135 and the second focus coil 136 of the actuator 104 using the first focus drive section 125, which is first drive means, and second focus drive section 126, which is second drive means, a current of the same intensity flows through the first focus coil 135 and the second focus coil 136 causing the first focus coil 135 and the second focus coil 136 to generate equal magnetic flux. The generated magnetic flux has the same influence on the magnetic flux of the first focus permanent magnet and that of the second focus permanent magnet. Thus, the objective lens 103 moves in the direction perpendicular to the data side of the optical disc 100 (vertical direction in the figure). Hereinafter, this direction will be called a "focus direction".

Applying different voltages to the first focus coil 135 and the second focus coil 136 of the actuator 104 using the first focus drive section 125 and second focus drive section 126 produces a difference between drive currents of the first focus coil 135 and the second focus coil 136, causing different influences on the magnetic flux generated by the first focus coil 135 and the magnetic flux generated by the second focus coil 136 and magnetic fluxes of the corresponding focus permanent magnets. For this reason, the variation of the focus direction differs between the inside and outside of the objective lens 103 in the radius direction of the optical disc. As a result, the objective lens 103 tilts in the radius direction of the optical disc 100. When the optical axis of the objective lens 103 tilts in the radius direction of the optical disc 100 with respect to the optical axis of the light beam 106, coma aberration occurs in the radius direction. By the way, when the optical disc 100 tilts in the radius direction with respect to the optical axis of the light beam 106, coma aberration occurs in the radius direction.

Thus, tilting the objective lens 103 in the radius direction by giving a difference between the drive current of the first focus coil 135 and that of the second focus coil 136 makes it possible to cancel out comma aberrations produced by the optical disc 100 tilting in the radius direction. That is, even if the optical disc 100 tilts, tilting the objective lens 103 accordingly makes it possible to reduce comma aberration and secure a satisfactory data reproduction characteristic and recording characteristic.

The detector 113 is formed of four photoreceptors. The reflected light from the optical disc which is incident upon the detector 113 is sent to a focus error signal generation section 115 (hereinafter referred to as an "FE signal generation section 115"). The FE signal generation section 115 generates a focus error signal (hereinafter referred to as an "FE signal") indicating a focus conversing state of the light beam 106 (or a difference between the focus of the light beam 106 and the data side of the optical disc 100) as the focus error detecting means.

The optical system shown in FIG. 5 constitutes an FE signal detection system generally called an "astigmatic method." The FE signal is sent to a phase compensation section 116. The phase compensation section 116 is a filter that advances the phase to stabilize the focus control system. A focus drive signal which is an output of the phase compensation section 116 is sent to the microcomputer 130. It is also sent to the second focus drive section 126 and the first focus drive section 125 through one + terminal of an addition section 124 and the + terminal of a subtraction section 123 respectively.

The addition section 124 outputs a value obtained by adding up signals input to the respective + terminals. The subtraction section 123 outputs a value obtained by subtracting the signal input to the − terminal from the signal input to the + terminal.

The detector 113 is formed of four photoreceptors. The reflected light from the optical disc which is incident upon the detector 113 is sent to a focus error signal generation section 115 (hereinafter referred to as an "FE signal generation section 115"). The FE signal generation section 115 generates a focus error signal (hereinafter referred to as an "FE signal") indicating a focus converging state of the light beam 106 (or a difference between the focus of the light beam 106 and the data side of the optical disc 100) as the focus error detecting means.

A drive current detection section 127 and a drive current detection section 128 detect an amount of drive current that flows the first focus coil 135 and the second focus coil 136 respectively. The phase compensation section 116, the first focus drive section 125 and the second focus drive section 126 function as focus control means. Since a current according to the FE signal indicating a difference between the focus of the light beam 106 and the data side of the optical disc 100 flows equally through the first focus coil 135 and the second focus coil 136, the objective lens 103 is controlled so that the focus of the light beam 106 is always located on the data side of the optical disc 100.

The drive current detection section 127 and the drive current detection section 128 detect the drive currents that flow through the first focus coil 135 and the second focus coil 136 and send the detected drive currents to the + terminal and one − terminal (terminal indicated "−1" in the figure) of the subtraction section 120. The other − terminal (terminal indicated "−2" in the figure) of the subtraction section 120 is connected to the microcomputer 130. The subtraction section 120 outputs a value obtained by subtracting the input signals of the two − terminals from the input signal of the + terminal. Therefore, when the input signal of − terminal input from the microcomputer 130 is zero, the output of the subtraction section 120 indicates a difference between the drive current that flows through the first focus coil 135 and the drive current that flows through the second focus coil 136. Hereinafter, this signal will be described as a "drive current difference signal." The signal that the microcomputer 130 sets for the − terminal of the subtraction section 120 will be described later. The drive current difference signal is sent to the − terminal of the subtraction section 122. The drive current detection section 127, the drive current detection section 128 and the subtraction section 120 function as means for detecting a driving level difference to control the tilt of the objective lens 103.

The microcomputer 130 detects a tilt angle which is an inclination of the optical disc 100 in the radius direction from a difference between the outputs of the phase compensation section 116 at two different points in the radius direction of the optical disc 100 and the distance between the two points. The optical head 114 is moved in the radius direction by a transfer motor 118.

The amount of inclination of the objective lens 103 is set in the + terminal of the subtraction section 122 by the microcomputer 130.

The output of the subtraction section 122 is sent to the − terminal of the subtraction section 123 and one + terminal of the addition section 124 through a phase compensation section 121. When the output of the phase compensation section 121 is sent to the − terminal of the subtraction section 123 and the + terminal of the addition section 124, a difference is produced between the drive current of the first focus coil 135 and the drive current of the second focus coil 136.

Therefore, the level of the drive current difference signal is controlled by the microcomputer 130 so that it is equal to the level set at the + terminal of the subtraction section 122. This causes the objective lens 103 to have an inclination according to the level set at the + terminal of the subtraction section 122 by the microcomputer 130. That is, the objective lens 103 is controlled according to the inclination of the optical disc 100. The phase compensation section 121 is a phase compensation filter to stabilize the control system of the drive current difference signal. In this way, the phase compensation section 121, the subtraction section 122, the subtraction section 123, the addition section 124 and the microcomputer 130 function as control means for controlling the tilt of the objective lens.

The drive current detection section 127 is constructed to be able to electrically separate the first focus drive section 125 from the first focus coil 135. Likewise, the drive current detection section 128 is constructed to be able to electrically separate the second focus drive section 126 from the second focus coil 136. Setting high the terminals c of the drive current detection sections 127 and 128 allows this electrically separated state to be set.

The output of the subtraction section 120 in this separated state indicates a circuit offset of the drive current detection sections 127 and 128 and the subtraction section 120. Here, the signal that the microcomputer 130 inputs to the − terminal of the subtraction section 120 is set to a zero level. Details will be described later.

The microcomputer 130 fetches the output of the subtraction section 120 while keeping high the terminals c of the drive current detection sections 127 and 128 and adjusts the level of the signal input to the − terminal of the subtraction section 120 so that the fetched value becomes zero. Therefore, the offset of the drive current difference signal is removed.

Figure 6:
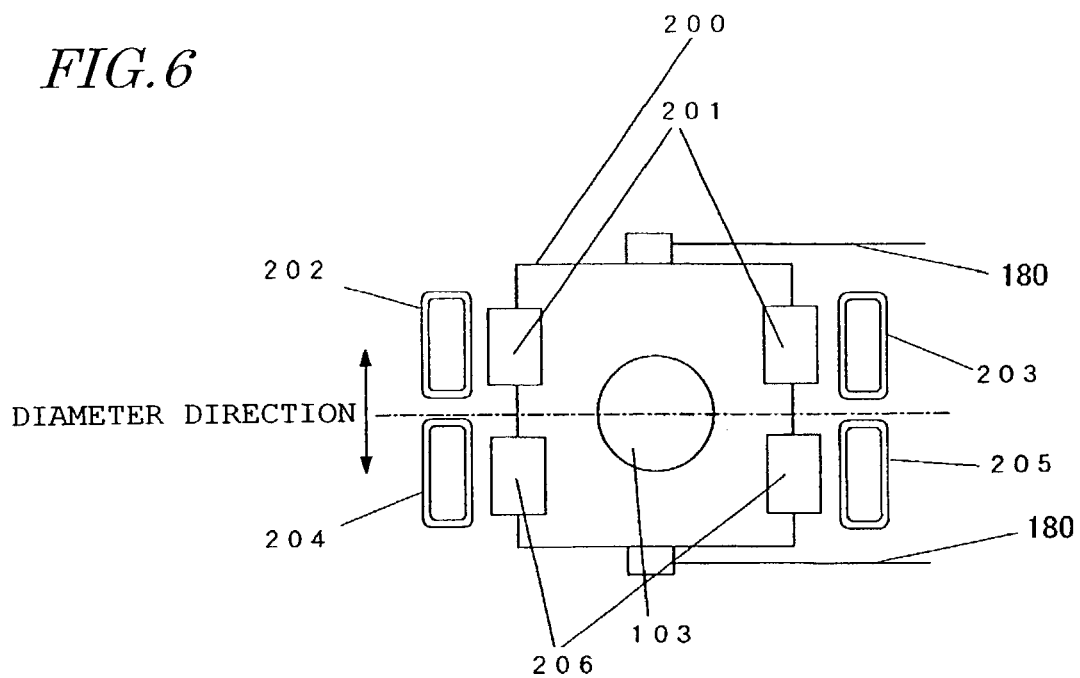
FIG. 6 is a plan view of an actuator of the optical disc apparatus shown in FIG. 5.

Then, an operation of each block will be explained in detail below. FIG. 6 is a plan view of the actuator 104 of the optical disc apparatus 801 viewed from above. A focus coil a 202 and focus coil b 203 are connected in series, constituting the first focus coil 135. A focus coil c 204 and focus coil d 205 are connected in series, constituting the second focus coil 136. The first focus coil 135 and the second focus coil 136 are placed in the radius direction (in the vertical direction in the figure) with the objective lens 103 inserted in between.

The lens holder 200 holding the objective lens 130 is connected to a fixed section (not shown) of the optical head 114 via a wire 180. Furthermore, the first focus coil 135 and second focus coil 136 are also attached to the fixed section of the optical head 114. A first focus permanent magnet 201 and second focus permanent magnet 206 are attached to the lens holder 200.

When the drive current of the first focus coil 135 flows in the direction opposite to the drive current of the second focus coil 136, direction of the magnetic flux generated in the first focus coil 135 is opposite to direction of the magnetic flux generated in the second focus coil 136.

Thus, direction of the influence received by magnetic flux of the first focus permanent magnet 201 is opposite to the direction of magnetic flux of the second focus permanent magnet 206. If a drive current flows through the first focus coil 135 so that the lens holder 200 approaches the data side of the optical disc 100 and a drive current flows through the second focus coil 136 so that the lens holder 200 goes away from the data side of the optical disc 100, the inner radius side of the lens holder 200 (side on which the first focus coil 135 is placed) approaches the data side of the optical disc 100 and the outer radius side of the lens holder 200 goes away from the data side of the optical disc 100. That is, the optical axis of the objective lens 103 tilts toward the outer radius side.

Furthermore, if a drive current flows through the first focus coil 135 so that the lens holder 200 goes away from the data side of the optical disc 100 and a drive current flows through the second focus coil 136 so that the lens holder 200 approaches the data side of the optical disc 100, the inner radius side of the lens holder 200 (side on which the first focus coil 135 is placed) goes away from the data side of the optical disc 100 and the outer radius side of the lens holder 200 approaches the data side of the optical disc 100. That is, the optical axis of the objective lens 103 tilts toward the inner radius side.

If the flow of the drive current of the first focus coil 135 and the flow of the drive current of the second focus coil 136 are oriented in the same direction, the magnetic flux generated in the first focus coil 135 and the magnetic flux generated in the second focus coil 136 are oriented in the same direction. Therefore, the influence received by the magnetic flux of the first permanent magnet 201 and the influence received by the magnetic flux of the second permanent magnet 206 are also oriented in the same direction and the lens holder 200 moves in the focus direction without tilting. That is, when the first focus coil 135 and the second focus coil 136 are driven in-phase with each other, the objective lens 103 moves in the focus direction and when the two focus coils are driven 180° out of phase with each other, the objective lens 103 tilts.

Here, suppose a relationship of a difference between the drive current of the first focus coil 135 and that of the second focus coil 136 which are outputs of the subtraction section 120 with respect to the inclination of the objective lens 103 is Pt. When the objective lens 103 is tilted by θr, a value of Y indicated by expression (4) is set in the + terminal of the subtraction section 122.

$$Y = \theta r \times Pt \quad (4)$$

This makes the level of the + terminal of the subtraction section 122 equal to that of the − terminal. Thus, the inclination of the objective lens 103 becomes Ur. Then, operations of the drive current detection sections 127 and 128 will be explained.

Figure 7:
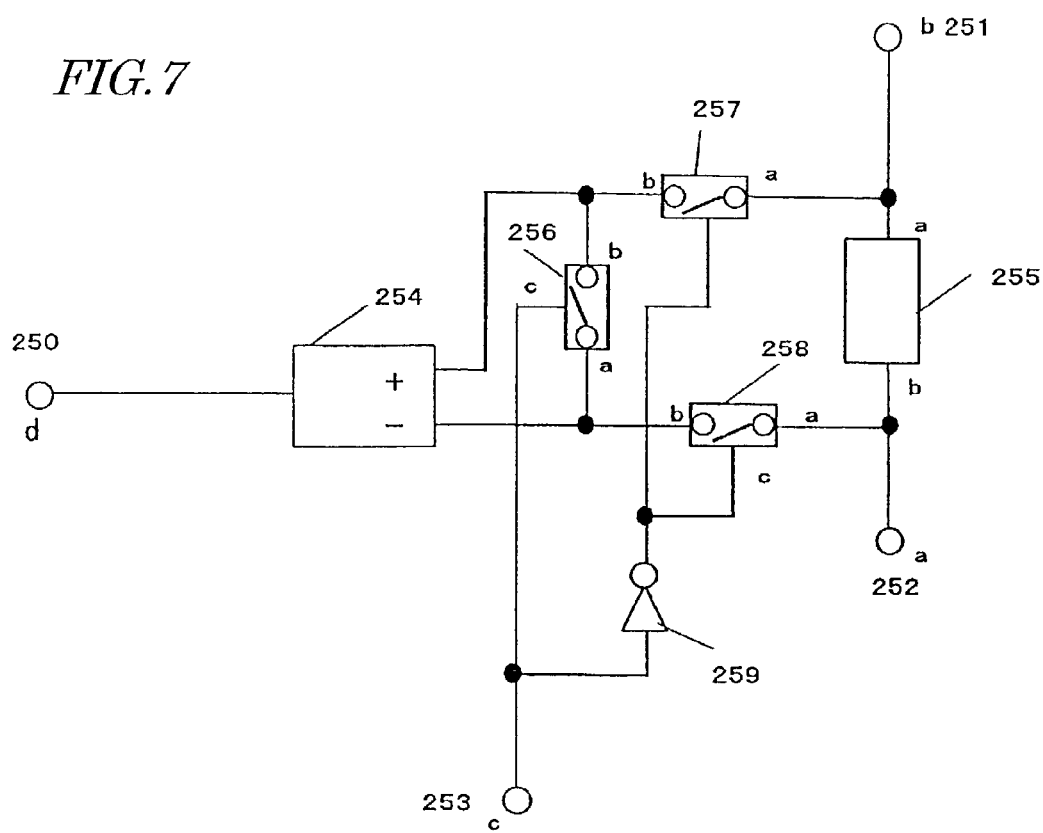
FIG. 7 is a block diagram of a drive current detection section of the optical disc apparatus shown in FIG. 5.

FIG. 7 is a block diagram showing a configuration of the drive current detection section 127. A terminal 250 is connected to one − terminal of the subtraction section 120 and a terminal 251 is connected to the first focus drive section 125, a terminal 252 is connected to the first focus coil 135 and a terminal 253 is connected to the microcomputer 130. That is, the terminal 250 corresponds to the terminal d of the drive current detection section 127 shown in FIG. 5. Likewise, the terminal 251 corresponds to the terminal b, the terminal 252 corresponds to the terminal a and the terminal 253 corresponds to the terminal c.

Switches 256, 257 and 258 are constructed in such a way as to close when, for example, a high level signal is input to the respective terminals c. An inversion section 259 is a digital circuit that inverts the input level and outputs it.

When a current flows through the first focus coil 135 by the first focus drive section 125, a current of the same intensity flows through a resistor 255. This voltage drop produces a potential difference at both ends of the resistor 255. A terminal a of the resistor 255 is connected to a terminal a of the switch 257 and a terminal b of the resistor 255 is connected to a terminal a of the switch 258. A terminal a of the switch 256 is connected to a − terminal of the subtraction section 254 and a terminal b of the switch 256 is connected to a + terminal of the subtraction section 254. The subtraction section 254 outputs a value obtained by subtracting the input level of the − terminal from the input level of the + terminal to the terminal 250.

Normally, the terminal 253 is set low by the microcomputer 130. Thus, the switch 256 is opened and the switches 257 and 258 are closed. Therefore, the signal of the terminal a of the resistor 255 is sent to the + terminal of the subtraction section 254 and the signal of the terminal b of the resistor 255 is sent to the − terminal of the subtraction section 254. The output of the subtraction section 254 indicates the level of the voltage drop of the resistor 255. That is, it indicates the value of a current that flows through the first focus coil 135.

The configuration of the drive current detection section 128 is also the same as that of the drive current detection section 127. Thus, the output of the drive current detection section 128 indicates the value of a current that flows through the second focus coil 136.

Therefore, when the terminal 253 of the drive current detection section (or terminals c of the drive current detection sections 127 and 128) is driven low by the microcomputer 130, the output of the subtraction section 120 indicates a difference of the current values that flow through the first focus coil 135 and second focus coil 136.

Then, an operation when the terminal 253 (or terminals c of the drive current detection sections 127 and 128) of the drive current detection section is driven high by the microcomputer 130 will be explained. When the terminal 253 is driven high, the terminal c of the switch 256 is driven high and the switch 256 is closed. Furthermore, the terminals c of the switches 257 and 258 are driven low and the switches 257 and 258 are opened. Therefore, the + terminal and − terminal of the subtraction section 254 are connected. That is, the input difference of the subtraction section 254 becomes zero. The output of the subtraction section 254 in this state indicates an offset of the output signal of the subtraction section 254.

The operation of the drive current detection section 128 is also the same as that of the drive current detection section 127. Thus, the output of the drive current detection section 128 indicates an offset of the output signal of the drive current detection section 128.

Therefore, when the terminal 253 (or terminals c of the drive current detection sections 127 and 128) of the drive current detection sections 127 and 128 is driven high by the microcomputer 130, the output of the subtraction section 120 is a signal obtained by subtracting the offset of the output signal of the drive current detection section 127 from the offset of the output signal of the drive current detection section 128.

This signal indicating the offset of the detection system of the drive current difference signal is sent to the microcomputer 130. The microcomputer 130 sets this offset value in the − terminal of the subtraction section 122. Therefore, even if the output signals of the drive current detection sections 127 and 128 are offset, accurate control is performed so that the difference between the drive current of the first focus coil 135 and that of the second focus coil 136 becomes a difference according to the voltage value set in the + terminal of the subtraction section 122.

If the offset of the detection system of this drive current difference signal is set to be measured at predetermined intervals by a timer of the microcomputer 130, even if the offset changes with time for various reasons, it is possible to perform appropriate control accordingly. Furthermore, the offset of the circuit generally changes depending on the temperature of the circuit. Thus, it is also possible to monitor the temperature inside the optical disc apparatus 801 to measure the offset of the detection system of the drive current difference signal based on the temperature. More specifically, as shown in FIG. 5, the optical disc apparatus 801 is provided with a temperature sensor 185 and an A/D conversion circuit 186 that A/D-converts the outputs of a temperature sensor 185 and inputs the converted signal to the microcomputer 130 and the offset of the detection system of the drive current difference signal is measured at timing at which the output changes by a predetermined value or more (that is, timing at which the output has changed by a predetermined amount of temperature). Even if the offset changes with time due to a temperature variation of the circuit, this configuration makes it possible to perform control adaptable to the temperature variation.

The offset of the drive current detection section 127 is set with the switches 257 and 258 left open and the switch 256 closed, but the offset can also be set with the operation of the first focus drive section 125 stopped. This is because when the operation of the first focus drive section 125 is stopped, the current that flows through the first focus coil 135 becomes zero. In this case, the drive current detection section 128 and the second focus drive section 126 are also set in the same way.

Then, the operation of the microcomputer 130 that detects a tilt angle which is an inclination of the disc 100 in the radius direction will be explained. As explained with reference to FIG. 4, assuming that a relationship of an amount of variation of the objective lens 103 with respect to a variation of the output of the phase compensation section 116 in the focus direction is Pf, a difference between the output levels of the phase compensation section 116 at the radius positions d1 and d2 is Vs and a distance between the radius positions d1 and d2 is R, an inclination θd of the optical disc 100 can be expressed by expression (3):

$$\theta d = Pf \times Vs/R \qquad (3)$$

Therefore, when voltage Ys of expression (5) is set in the + terminal of the subtraction section 122 from expression (3) and expression (4), inclination θo of the objective lens 103 is equal to θd as shown in expression (6).

$$Ys = Pf \times Vs \times Pt/R \qquad (5)$$

$$\theta o = Ys/Pt \qquad (6)$$
$$= Pf \times Vs \times Pt/(R \times Pt) = \theta d$$

Figure 8:
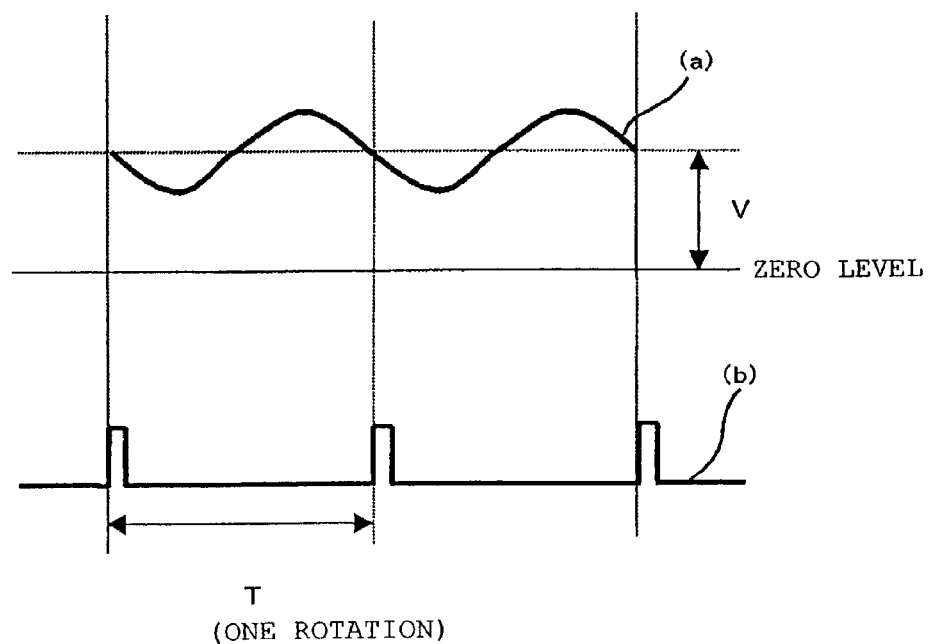
FIG. 8 shows waveforms of a focus drive signal and a one-rotation signal.

The operation of determining the position of the objective lens 103 from the focus drive signal output from the phase compensation section 116 will be explained using FIG. 8. In FIG. 8, a waveform (a) shows the output of the phase compensation section 116 and a waveform (b) shows one-rotation signal output from the rotation detection section 131. The optical disc 100 is generally subject to plane deflections and the objective lens 103 moves in the focus direction accordingly. Therefore, as shown in the waveform (a), the output of the phase compensation section 116 varies for a period during which the disc makes one rotation. The frequency of variations is equal to or greater than the rotation frequency of the optical disc 100 and synchronized with the one-rotation signal, and therefore it is possible to accurately remove the variable component by averaging the output of the phase compensation section 116 by a time T required for the optical disc 100 to make one rotation. That is, it is possible to accurately detect only the DC component. Furthermore, since the measurement is completed in a time during which the optical disc 100 makes one rotation, it is possible to shorten the measuring time.

The microcomputer 130 detects V, which is the DC component by integrating focus drive signal output from the phase compensation section 116 over a period of time T based on the one-rotation signal and dividing the integration result by the time T.

As described above, since the amplification factors of the first focus drive sections 125 and 126 are known beforehand, it is possible to calculate values of currents that flow through the first focus coil 135 and second focus coil 136. Furthermore, since a relation of a variation of the objective lens 103 with respect to a variation of the drive current is also known beforehand, an average height of the objective lens 103 can be determined by measuring V.

The microcomputer 130 moves the optical head 114 in the radius direction, calculates a height difference of the objective lens 103 at two points and calculates the inclination of the optical disc 100 based on the distance between the two points in the radius direction. Then, the microcomputer 130 sets a level of the + terminal of the subtraction section 122 according to the detected inclination of the optical disc 100 and thereby tilts the objective lens 103.

In the actual apparatus, the above-described value of Pf varies depending on the actuator. The operation in that case will be explained. The actual apparatus stores Pf of a standard actuator and calculates the inclination of the disc based on this value. Here, suppose the value of the actual actuator is Pfd, which is lower than Pf. Furthermore, suppose the difference between the positions of the objective lens 103 at the radius positions d1 and d2 is Zs and the difference between the outputs of the phase compensation section 116 is Vsd. Suppose the actual inclination of the disc is θr. Vsd is given by expression (7) according to expression (3).

$$Vsd = Zs/Pfd \quad (7)$$

Therefore, the inclination θsd of the disc detected is expressed by expression (8) according to expression (3).

$$\theta sd = Pf \times Vsd/R = Pf \times Zs/(R \times Pfd) \quad (8)$$

Therefore, according to expression (4) and expression (8), Ysd in expression (9) is set in the + terminal of the subtraction section 122.

$$Ysd = Pf \times Zs \times Pt/(R \times Pfd) \quad (9)$$

Here, a relation Pt of the variation in a difference of the drive current, which is the output of the subtraction section 120 with respect to the variation of the inclination of the objective lens 103, also varies depending on the actuator. However, in the actuator 104, the drive system in the focus direction and the inclination drive system are constructed of the same components. When the sensitivity of variation in the focus direction with respect to the drive current decreases, the sensitivity of inclination decreases in proportion thereto. A relation of the variation in a difference of the drive current which is the output of the subtraction section 120 with respect to the variation in the inclination of the objective lens 103 is defined as Pt and a relation of the variation in the focus direction of the objective lens 103 with respect to the variation in the output of the phase compensation section 116 is defined as Pf, and therefore if Pf decreases, Pt increases in inverse proportion thereto. If a relation of the assumed variation in a difference of the drive current, which is the output of the subtraction section 120 with respect to the variation in the inclination of the objective lens 103 of the actuator, is Ptd, then Ptd is given by expression (10):

$$Ptd = Pf \times Pt/Pfd \quad (10)$$

According to expression (4), expression (9) and expression (10), the actual inclination θod of the objective lens 103 is given by the following expression (11):

$$\theta od = Ysd/Ptd \quad (11)$$
$$= Pf \times Zs \times Pt/(R \times Pfd \times Ptd)$$
$$= Pf \times Zs \times Pt \times Pfd/(R \times Pfd \times Pf \times Pt)$$
$$= Zs/R$$
$$= Ur$$

As shown in expression (11), even if Pf and Pt vary depending on the actuator, the inclination of the optical disc 100 becomes θr. That is, the inclination of the objective lens 103 can be controlled accurately according to the inclination of the optical disc 100.

As shown above, according to this embodiment, focus drive signals are acquired through focus control at two different points in the radius direction of the optical disc 100 and the signals acquired for a period during which the optical disc 100 makes one rotation are averaged. The averaged focus drive signal values are stripped of influences of plane deflections of the optical disc. Since the difference between two averaged focus drive signal values corresponds to a difference between the heights of the objective lens 103 at the two points, an inclination of the optical disc 100 is calculated based on the distance between the two points in the radius direction. By driving the actuator 104 based on the calculated inclination, it is possible to match the objective lens to the tilt of the optical disc 100 and irradiate the optical disc 100 with a light beam in a direction perpendicular thereto. This makes it possible to realize an optical disc apparatus capable of accurately recording/reproducing data.

Furthermore, no new elements for detecting the inclination of the objective lens are required. This eliminates the problem that using new elements would increase a cost, increase an amount of adjustment at the time of assembly and increase the number of factors of errors over time. This further allows the size of the optical head to be reduced.

In the case of this embodiment in particular, the focus actuator used to calculate the inclination of the optical disc 100 is used as the actuator for tilting the objective lens. For this reason, even if the focus actuator is affected by an ambient temperature, the actuator receives the same influence as the actuator for tilting the objective lens, and therefore the influence is canceled out. Furthermore, even if a drive sensitivity difference as the focus actuator is produced between the first focus coil 135 and second focus coil 136 making up the focus actuator, the drive sensitivity difference is canceled out when the actuator is driven as the actuator for tilting the objective lens.

Furthermore, drive currents that flow through the first focus drive section 125 and second focus drive section 136 are detected by the drive current detection section 127 and drive current detection section 128 respectively and a drive current difference signal which indicates this difference is calculated by the subtraction section 120. Since the first focus drive section 125 and second focus drive section 136 are controlled so that this drive current difference signal matches the level of a signal set by the microcomputer in such a way that the objective lens 103 inclines according to the inclination of the optical disc 100, it is possible to accurately adjust the inclination of the objective lens even if there are offsets at the first focus drive section 125 and second focus drive section 136.

Furthermore, when the microcomputer 130 sets high the terminals c of the drive current detection section 127 and drive current detection section 128, it is possible to electrically separate the first focus coil 135, first focus drive section 125, second focus coil 136 and second focus drive section 126 from the subtraction section 120. At this time, the signals input from the drive current detection section 127 and drive current detection section 128 to the subtraction section 120 indicate offsets of the output signals of the drive current detection section 127 and drive current detection section 128 when drive currents flowing into the first focus coil 135 and second focus coil 136 are zero.

Therefore, when the microcomputer 130 inputs this output value to the minus terminal of the subtraction section 120 so as to perform control using the output of the subtraction section 120 at this time as a reference, offsets of the drive current detection section 127 and drive current detection section 128 are canceled out.

In this embodiment, the microcomputer 130 calculates an average value of the output of the phase compensation section 116 for a period during which the optical disc 100 makes one rotation, but the same effect as that of this embodiment can be obtained even if the period for calculating an average of the output of the phase compensation section 116 is an integer multiple of 2 or more of the period during which the optical disc 100 makes one rotation.

Furthermore, when the optical disc 100 is rotated while keeping a constant linear velocity called "CLV" and data is recorded/reproduced, the number of revolutions of the optical disc at the outer radius is smaller than that at the inner radius. Thus, when the time for measuring an average value of the output of the phase compensation section 116 is limited to a predetermined time at the inner radius and at the outer radius, it is possible to regard the measuring time at the inner radius as the time during which the optical disc makes n rotations, the measuring time at the outer radius as the time during which the optical disc makes m rotations and determine m and n in such a way that m is equal to or smaller than n (both are integers equal to 0 or greater). This allows more precise detection within a restricted measuring time.

Second Embodiment

Figure 9:
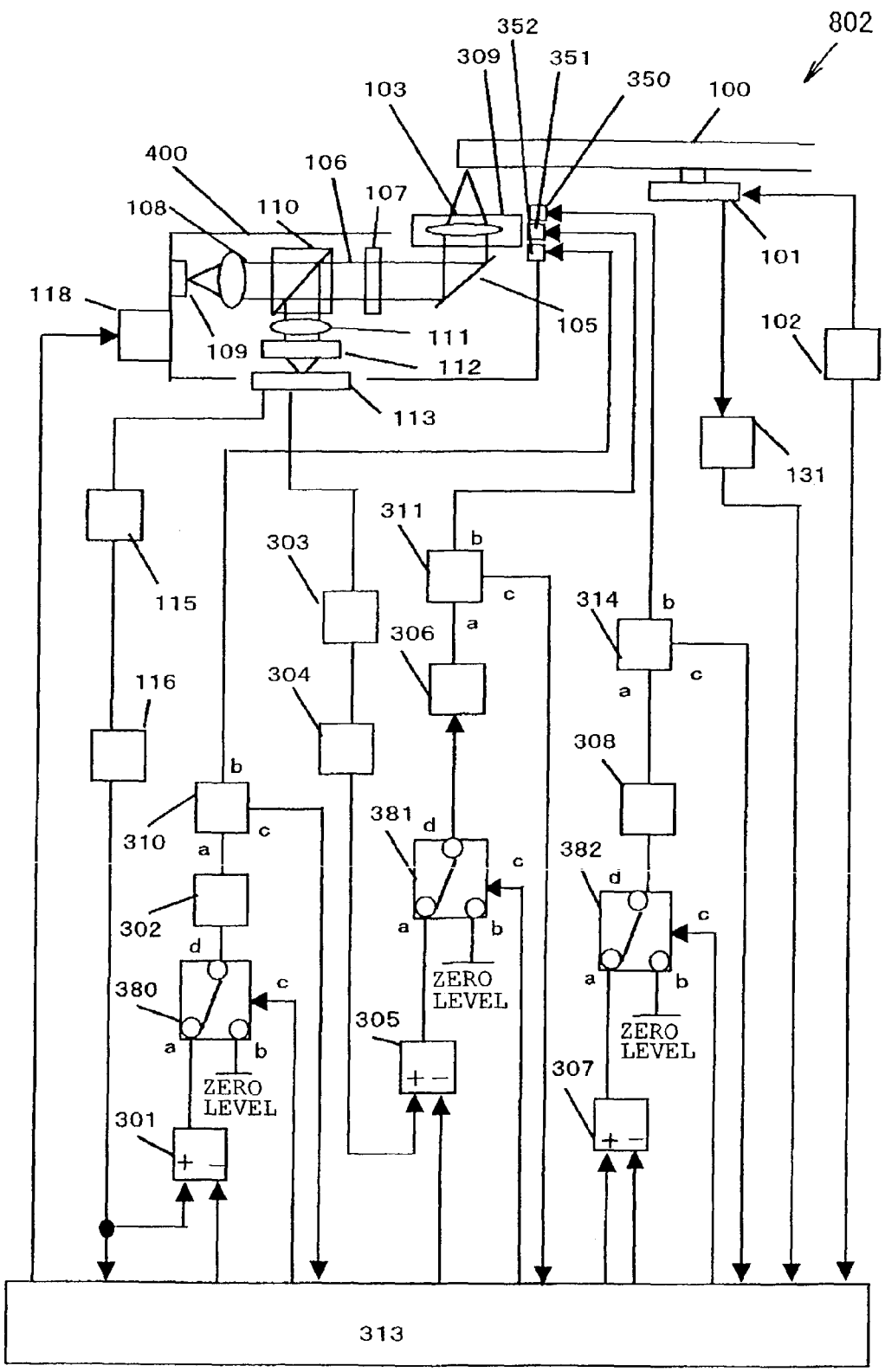
FIG. 9 is a block diagram showing a second embodiment of the optical disc apparatus of the present invention.

FIG. 9 is a block diagram showing a second embodiment of the optical disc apparatus according to the present invention. In an optical disc apparatus 802 shown in FIG. 9, the same components as those in the first embodiment are assigned the same reference numerals.

In the optical disc apparatus 802, the objective lens 103 is attached to a movable section of an actuator 309. The actuator 309 includes a focus coil 352, a tracking coil 351, a tilt coil 350 and four permanent magnets (not shown). The focus coil 352, the tracking coil 351, and the tilt coil 350 correspond to focus direction transferring means, tracking direction transferring means and objective lens tilting means, respectively.

When a voltage is applied to the focus coil 352 using a focus drive section 302, a current flows through the coil and magnetic flux is generated. The magnetic flux generated by the focus coil 352 acts on the magnetic flux of the permanent magnet and the objective lens 103 moves in the focus direction. Likewise, when a voltage is applied to the tracking coil 351 using a tracking drive section 306, a current flows through the coil and magnetic flux is generated. The magnetic flux generated by the tracking coil 351 acts on the magnetic flux of the permanent magnet and the objective lens 103 moves in the radius direction of the optical disc 100, that is, the objective lens 103 moves across tracks on the optical disc 100 (in the horizontal direction in the figure). Furthermore, when a voltage is applied to the tilt coil 350 using the tilt drive section 308, the objective lens 103 tilts in the radius direction of the optical disc 100 (in the horizontal direction in the figure). That is, each of the focus drive section 302, tracking drive section 306 and the tilt drive section 308 functions as drive means.

An FE signal which is the output of an FE signal generation section 115 is sent to the focus drive section 302 through a phase compensation section 116, a subtraction section 301 and a switch 380. The focus drive section 302 allows a current according to an input signal to flow into the focus coil 352 through a drive current detection section 310, which is drive level detection means. The drive current detection section 310 detects the current that flows through the focus coil 352. At this time, a terminal a and a terminal d of the switch 380 are connected. In this configuration, the objective lens 103 is controlled in such a way that the focus of a light beam 106 is always located on the data side of the optical disc 100. That is, the phase compensation section 116 and focus drive section 302 function as focus control means. The phase compensation section 116 function as focus control element means.

A microcomputer 313 connects the terminal b and terminal d of the switch 380 for a time Ts and fetches the output of the drive current detection section 310 in that condition. Since the terminal b of the switch 380 is set to a zero level, a zero-level signal is input to the drive section 302. Thus, the output of the drive current detection section 310 in this condition indicates an offset of the output of the focus drive section 302. Suppose an offset of the output of the drive current detection section 310 is zero. Hereinafter, this signal will be described as an offset signal. The microcomputer 313 sends the fetched offset signal to a – terminal of the subtraction section 301. This eliminates the influence of the offset of the focus drive section 302 and a current according to the output of the phase compensation section 116 flows through the focus coil 352 accurately. That is, an offset, which is disturbance, is eliminated and the control accuracy of focus control is improved.

Offset measurement for the above-described drive current detection section 310 and focus drive section 302 is carried out when the operation of focus control is stopped. When time Ts is set to, for example, several 10 µs or below, then offset measurement can also be performed when focus control is in operation.

As in the case of the first embodiment, the microcomputer 313 detects an inclination of the optical disc 100 in the radius direction from a difference between the outputs of the phase compensation section 116 at two different points of the optical disc 100 in the radius direction and the distance between the two points. The microcomputer 313 tilts the optical lens 103 by allowing a current according to the detected inclination of the disc to flow into the tilt coil 350. The microcomputer 313 sets a current value required for this in the + terminal of the subtraction section 307. The configurations and operations of the switch 382, drive current detection section 314 functioning as drive level detection means and tilt drive section 308 are the same as those of the switch 380, drive current detection section 310 and focus drive section 302. Thus, it is possible to eliminate influences of the offset of the tilt drive section 308 and a current according to the level set in the + terminal of the subtraction section 307 by the microcomputer 313 flows through the tilt coil 351 accurately. That is, the accuracy of adjusting the inclination of the objective lens 103 improves.

The optical system shown in FIG. 9 constitutes a method of detecting a tracking error signal generally called a "push-pull method." Hereinafter, a tracking error signal will be described as a "TE signal." A TE signal generation section 303, which is tracking error detection means, detects and outputs a difference between the light beam 106 and tracks of the optical disc 100 using the push-pull method. The TE signal is sent to the tracking drive section 306 through a phase compensation section 304, subtraction section 305 and switch 381. A current flows through the tracking coil 351 by the tracking drive section 306. Therefore, the focus of the light beam 106 is controlled to be located on a track of the optical disc 100. The phase compensation section 304 functions as control element means, and the phase compensation section 304 and tracking drive section 306 function as tracking control means.

The microcomputer 313 sets an offset of the tracking drive section 306 and drive current detection section 311 functioning as drive level detection means in a − terminal of the subtraction section 305. The configurations and operations of the switch 381, drive current detection section 311 and tracking drive section 306 are the same as those of the switch 380, drive current detection section 310 and focus drive section 302. Thus, it is possible to eliminate influences of the offset of the tracking drive section 306 and a current according to the output of the phase compensation section 304 flows through the tracking coil 351 accurately. That is, the control accuracy of tracking control improves.

Figure 10:
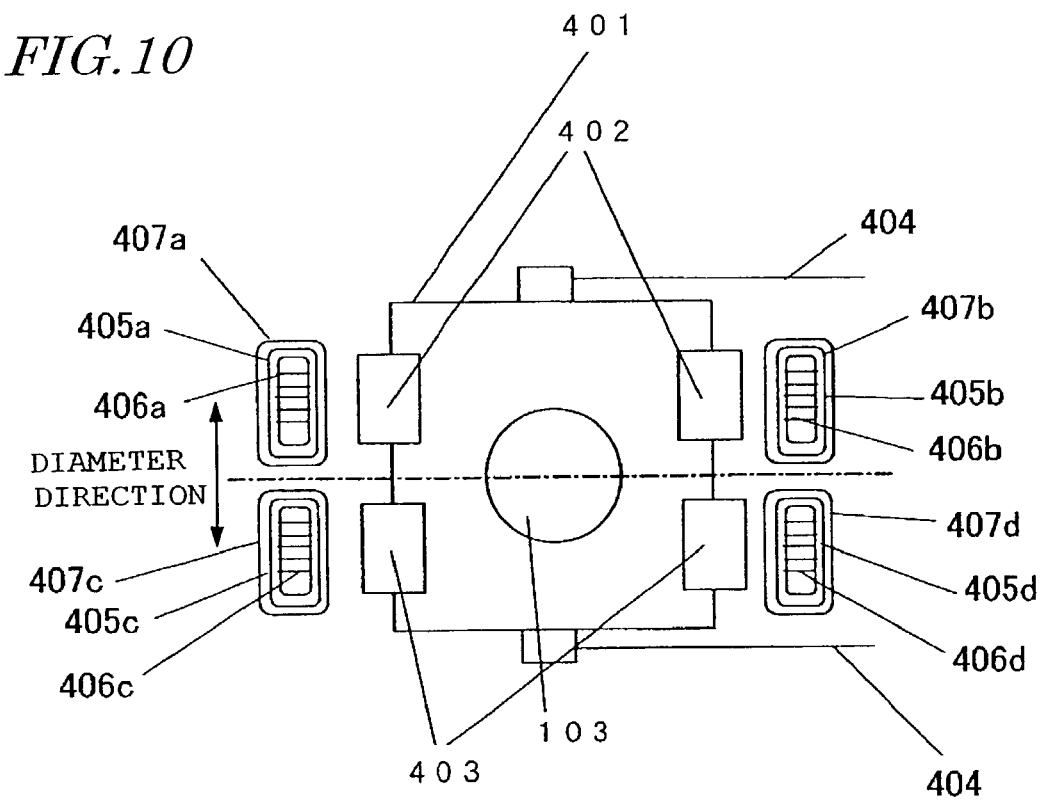
FIG. 10 is a plan view of an actuator of the optical disc apparatus shown in FIG. 9.

Hereinafter, the actuator 309 will be explained in more detail. FIG. 10 illustrates a configuration of the actuator 309 in the optical disc apparatus according to this embodiment and is more specifically a top view of the actuator 309. A lens holder 401 holding the objective lens 103 is connected to a fixed section (not shown) of an optical head 400 via a wire 404. Furthermore, permanent magnets 402 and 403 are attached to the lens holder 401. The actuator 309 is provided with four focus coils 405a, 405b, 405c and 405d, four tracking coils 406a, 406b, 406c and 406d and four tilt coils 407a, 407b, 407c and 407d. Each coils is wound around an iron core and attached to a fixed section of the optical head 400. Furthermore, each iron core and a permanent magnet which forms a pair with each iron core form a magnetic flux loop.

The focus coils 405a, 405b, 405c and 405d are connected in series and constitute the focus coil 352. When a voltage is applied to the focus coil 352 using the focus drive section 302, a current flows through the coil and magnetic flux is generated. The magnetic flux generated by the focus coil 352 acts on the magnetic flux of the permanent magnet and the objective lens 103 moves in the focus direction of the optical disc 100.

Likewise, the tracking coils 406a, 406b, 406c and 406d are connected in series and constitute the tracking coil 351. When a voltage is applied to the tracking coil 351 using the tracking drive section 306, a current flows through the coil and magnetic flux is generated. The magnetic flux generated by the tracking coil 351 acts on the magnetic flux of the permanent magnet and the objective lens 103 moves in the radius direction of the optical disc 100, that is, moves across tracks on the optical disc 100.

The tilt coils 407a, 407b, 407c and 407d are connected in series and constitute the tilt coil 350. The coils are connected in such a way that when a voltage is applied to the tilt coil 350 using the tilt drive section 308, the magnetic flux generated by the coils 407a and 407b is oriented opposite to the magnetic flux generated by the coils 407c and 407d. Therefore, the objective lens 103 tilts in the radius direction of the disc 100.

Offsets of the above-described focus drive section 302, tracking drive section 306, tilt drive section 308 and drive current detection sections 310, 311 and 314 are measured at predetermined intervals by a timer of the microcomputer 313. Furthermore, since an offset of the circuit generally varies depending on the temperature of the circuit, and therefore as explained in the first embodiment, it is possible to provide a temperature sensor and measure a circuit offset when the output changes by a predetermined value or more.

Thus, according to this embodiment, by setting the input of the focus drive section 302 to zero for a predetermined period of time using the switch 380, the drive current detection section 310 outputs an offset signal of the drive current detection section 310. Using this offset signal as a reference value, the DC level of the signal input from the phase compensation section 116 to the focus drive section 302 is corrected by the subtraction section 301. That is, the offset is removed. Thus, the accuracy of focus control can be improved even if an offset is generated at the focus drive section 302. Furthermore, for tracking control and tilt control, offsets at their respective drive sections are also removed in the like manner and their respective control accuracy can be improved.

Third Embodiment

Figure 11:
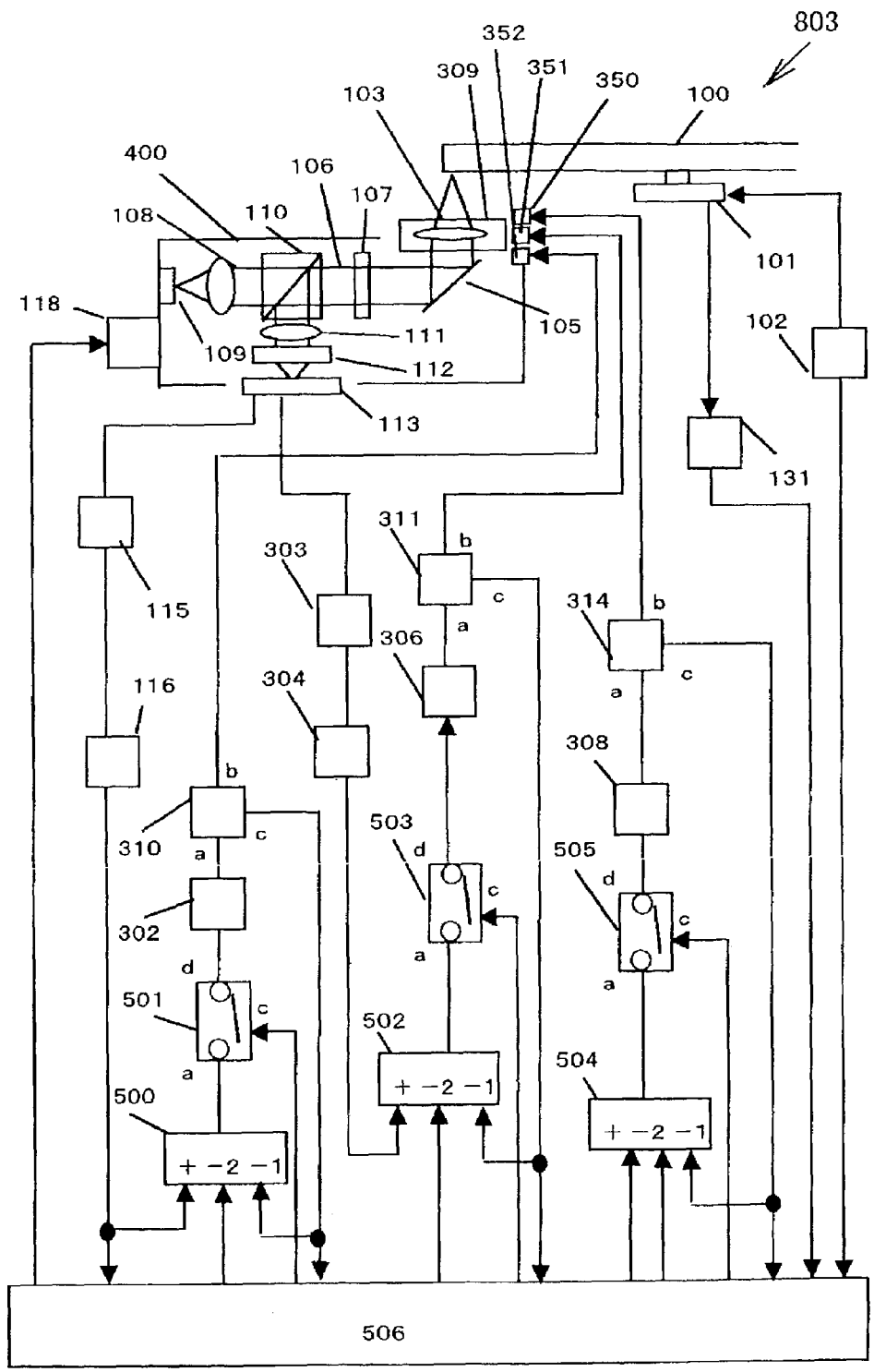
FIG. 11 is a block diagram showing a third embodiment of the optical disc apparatus of the present invention.

FIG. 11 is a block diagram showing a third embodiment of the optical disc apparatus according to the present invention. In an optical disc apparatus 803 shown in FIG. 11, the same components as those in the second embodiment are assigned the same reference numerals.

In the optical disc apparatus 803, an FE signal, which is the output of an FE signal generation section 115, is sent to a focus drive section 302 through a phase compensation section 116 and a subtraction section 500. The focus drive section 302 allows a current according to an input signal to flow into the focus coil 352 through a drive current detection section 310. A drive current detection section 310 detects a current that flows through the focus coil 352. The output of the drive current detection section 310 is sent to a microcomputer 506 and one − terminal (terminal indicated as "−1" in the figure) of the subtraction section 500. At this time, a terminal a and terminal d of a switch 501 are connected. Furthermore, a zero level is set in the other − terminal (terminal indicated as "−2" in the figure) of the subtraction section 500 by the microcomputer 506.

The focus drive section 302 is fed a difference between the output of the phase compensation section 116 and the output of the drive current detection section 310. Thus, a current of the focus coil 352 is controlled in such a way that the output of the subtraction section 500 has a predetermined relationship (zero in this embodiment). That is, a current according to the output of the phase compensation section 116 flows through the focus coil 352. Thus, the objective lens 103 is controlled in such a way that the focus of the light beam 106 is always located on the data side of the optical disc 100.

Then, a signal set in the other − terminal (terminal indicated as "−2" in the figure) of the subtraction section 500 by the microcomputer 506 will be explained. The microcomputer 506 opens the terminal a and terminal d of the switch 501 for a period of time Tp and fetches the output of the drive current detection section 310 in that condition. The output of the drive current detection section 310 in this condition indicates an offset of the output of the drive current detection section 310. The microcomputer 506 sends the offset level of the fetched output of the drive current detection section 310 to the − terminal of the subtraction section 500. Thus, it is possible to eliminate influences of the offset of the drive current detection section 310 and a current according to the output of the phase compensation section 116 flows through the focus coil 352 accurately. That is, an offset, which is disturbance, is eliminated, which improves the control accuracy of focus control.

By the way, offsets of the above-described drive current detection section 310 are measured while the focus control operation is stopped. By setting the time Tp to, for example, several 10 μs or less, offsets may also be measured when the focus control operation is in progress.

As in the case of the second embodiment, the microcomputer 506 detects the inclination of the optical disc 100 in the radius direction from a difference of the outputs of the phase compensation section 116 at two different points in the radius directions of the optical disc 100 and the distance between the two points. By allowing a current according to the detected inclination of the disc to flow into the tilt coil 350, the objective lens 103 is tilted. The current value is set in the + terminal of the subtraction section 504. The configurations and operations of the subtraction section 504, switch 505, drive current detection section 314 and tilt drive section 308 are the same as those of the subtraction section 500, switch 501, drive current detection section 310 and focus drive section 302. Thus, it is possible to eliminate influences of the offset of the drive current detection section 314. Thus, a current according to the level set in the + terminal of the subtraction section 504 by the microcomputer 506 flows through the tilt coil 351 accurately. That is, the accuracy of adjusting the inclination of the objective lens 103 improves.

A TE signal is sent to the tracking drive section 306 through the phase compensation section 304 and subtraction section 502. The tracking drive section 306 allows a current according to an input signal to flow into the tracking coil 351 through the drive current detection section 311. Thus, control is performed in such a way that the focus of the light beam 106 is located on a track of the disc 100.

The microcomputer 506 sets the offset of the drive current detection section 311 in the – terminal (terminal indicated as "–2" in the figure) of the subtraction section 502 of the drive current detection section 311. The configurations and operations of the subtraction section 502, switch 503, drive current detection section 306 and drive current detection section 311 are the same as those of the subtraction section 500, switch 501, focus drive section 302 and drive current detection section 310. Thus, it is possible to eliminate influences of the offset of the tracking drive section 306 and a current according to the output of the phase compensation section 304 flows through the tracking coil 351 accurately. That is, the accuracy of tracking control improves.

Thus, according to this embodiment, the operation of the focus drive section 302 is stopped by opening the switch 501 for a predetermined period. During this period, the signal output by the drive current detection section 310 indicates an offset. Thus, by correcting the output of the phase compensation section 116 at the subtraction section 500 using this offset as a reference, the offset of the drive current detection section 310 is removed from the output of the phase compensation section 116. As a result, the accuracy of the focus control can be improved. Furthermore, for tracking control and tilt control, offsets at their respective drive current detection sections are also removed in the like manner and the control accuracy can be improved.

Fourth Embodiment

Figure 12:
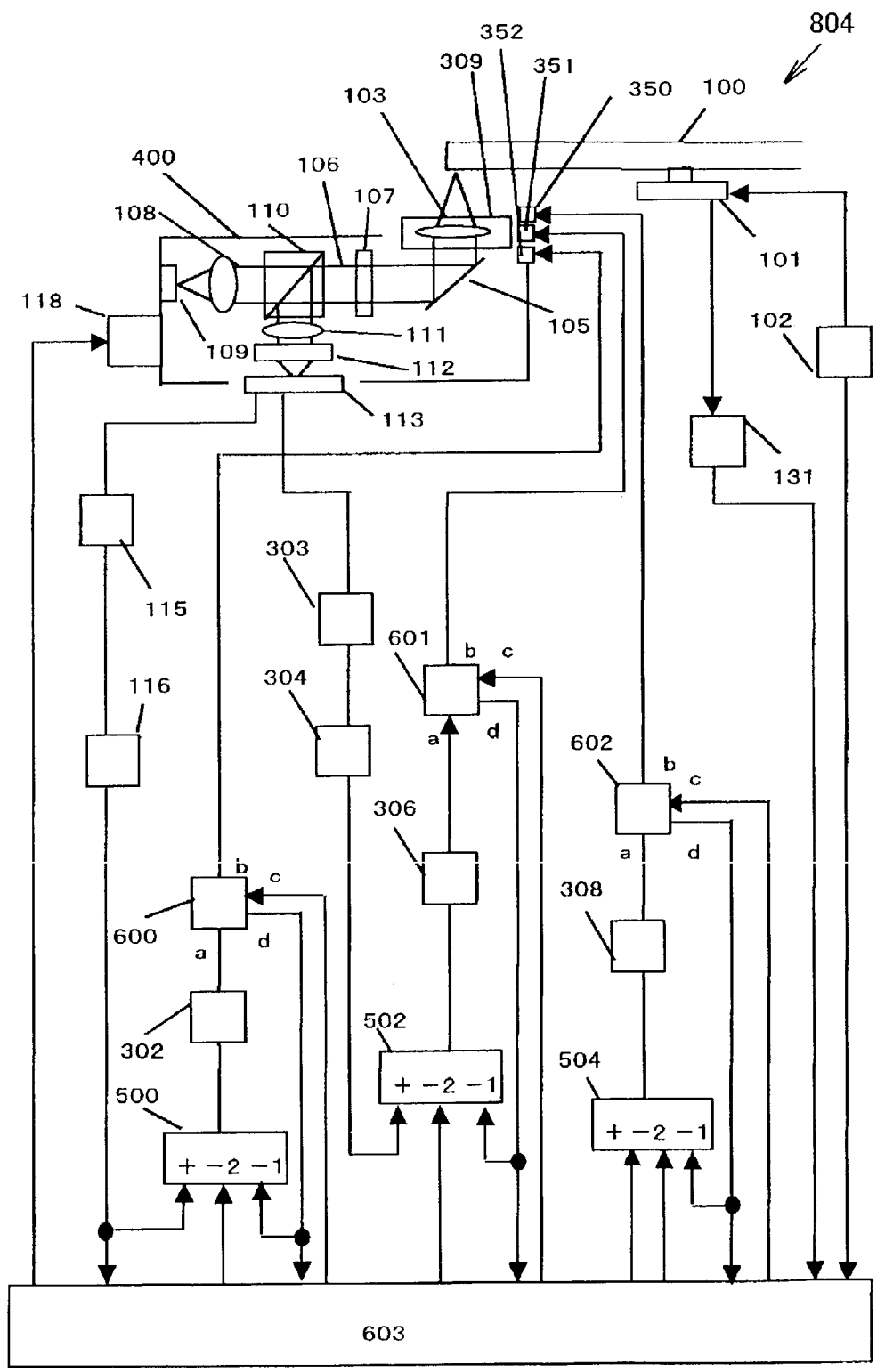
FIG. 12 is a block diagram showing a fourth embodiment of the optical disc apparatus of the present invention.

FIG. 12 is a block diagram showing a fourth embodiment of the optical disc apparatus according to the present invention. In an optical disc apparatus 804 shown in FIG. 12, the same components as those in the second embodiment are assigned the same reference numerals. The optical disc apparatus 804 is different from the third embodiment in the method of adjusting offsets generated in each drive section and detection section.

In the optical disc apparatus 804, an FE signal, which is the output of an FE signal generation section 115, is sent to a focus drive section 302 through a phase compensation section 116 and a subtraction section 500. The focus drive section 302 allows a current according to an input signal to flow into the focus coil 352 through a drive current detection section 600 acting as drive level detection means. The drive current detection section 600 detects the current that flows through the focus coil 352. The configuration and operation of the drive current detection section 600 are the same as those of the drive current detection section 127 used in the first embodiment. The output of the drive current detection section 600 is sent to a microcomputer 603 and one— terminal (terminal indicated as "–1" in the figure) of the subtraction section 500. A zero level is set in the other – terminal (terminal indicated as "–2" in the figure) of the subtraction section 500 by the microcomputer 603.

The focus drive section 302 is fed a difference between the output of the phase compensation section 116 and the output of the drive current detection section 600. Thus, a current of the focus coil 352 is controlled in such a way that the output of the subtraction section 500 becomes zero. That is, a current according to the output of the phase compensation section 116 flows through the focus coil 352. Thus, the objective lens 103 is controlled in such a way that the focus of the light beam 106 is always located on the data side of the optical disc 100.

Then, a signal set in the other – terminal of the subtraction section 500 by the microcomputer 603 will be explained. The microcomputer 603 drives high the terminal c of the drive current detection section 600 for a period of time Tp. The microcomputer 603 fetches the output of the terminal d of the drive current detection section 600 in this condition. The output of the drive current detection section 600 in this condition indicates an offset of the output signal of the drive current detection section 600 as explained in the first embodiment.

The microcomputer 603 sends the offset level of the fetched output signal of the drive current detection section 600 to the – terminal of the subtraction section 500. Thus, influences of an offset of the drive current detection section 600 can be eliminated and a current according to the output of the phase compensation section 116 flows through the focus coil 352 accurately. That is, an offset, which is disturbance, is eliminated, which improves the control accuracy of focus control.

Offsets of the above-described drive current detection section 600 are measured while the focus control operation is stopped. By setting the time Tp to, for example, several 10 μs or less, offsets may also be measured while the focus control operation is in progress.

As in the case of the second embodiment, the microcomputer 603 detects the inclination of the optical disc 100 in the radius direction from a difference between the outputs of the phase compensation section 116 at two different points in the radius direction of the optical disc 100 and the distance between the two points.

By allowing a current according to the detected inclination of the disc to flow into the tilt coil 350, the microcomputer 603 tilts the objective lens 103. The current value is set in the + terminal of the subtraction section 504. The configurations and operations of the subtraction section 504, drive current detection section 602 functioning as drive level detection means and tilt drive section 308 are the same as those of the subtraction section 500, drive current detection section 600 and focus drive section 302. Thus, it is possible to eliminate influences of the offset of the drive current detection section 602 and a current according to the level set in the + terminal of the subtraction section 504 by the microcomputer 603 flows through the tilt coil 351 accurately. That is, the accuracy of adjusting the inclination of the objective lens 103 improves.

A TE signal is sent to the tracking drive section 306 through the phase compensation section 304 and subtraction section 502. The tracking drive section 306 allows a current to flow into the tracking coil 351. Thus, control is performed in such a way that the focus of the light beam 106 is located on a track of the disc 100.

The configurations and operations of the subtraction section 502, tracking drive section 306 and drive current detection section 601 functioning as drive level detection means are the same as those of the subtraction section 500, focus drive section 302 and drive current detection section 600. Thus, it is possible to eliminate influences of the offset of the drive current detection section 601 and a current according to the output of the phase compensation section 304 flows through the tracking coil 351 accurately. That is, the accuracy of tracking control improves.

Thus, according to this embodiment, the microcomputer 603 sets high the level of the terminal c of the drive current detection section 600, and can thereby electrically separate the focus drive section 302 and the second focus coil 352 from the subtraction section 500. The signal input from the drive current detection section 600 to the subtraction section 500 at this time indicates an offset of the output signal of the drive current detection section 600 when a drive current that flows through the focus coil 352 is zero.

Therefore, the microcomputer 603 inputs this output value to the minus terminal of the subtraction section 500 so as to perform control using the output of the subtraction section 500 at this time as a reference, and can thereby cancel the offset of the drive current detection section 600 and improve the accuracy of focus control. Furthermore, for tracking control and tilt control, offsets at their respective drive current detection sections are also removed in the like manner and their respective control accuracy can be improved.

Fifth Embodiment

Figure 13:
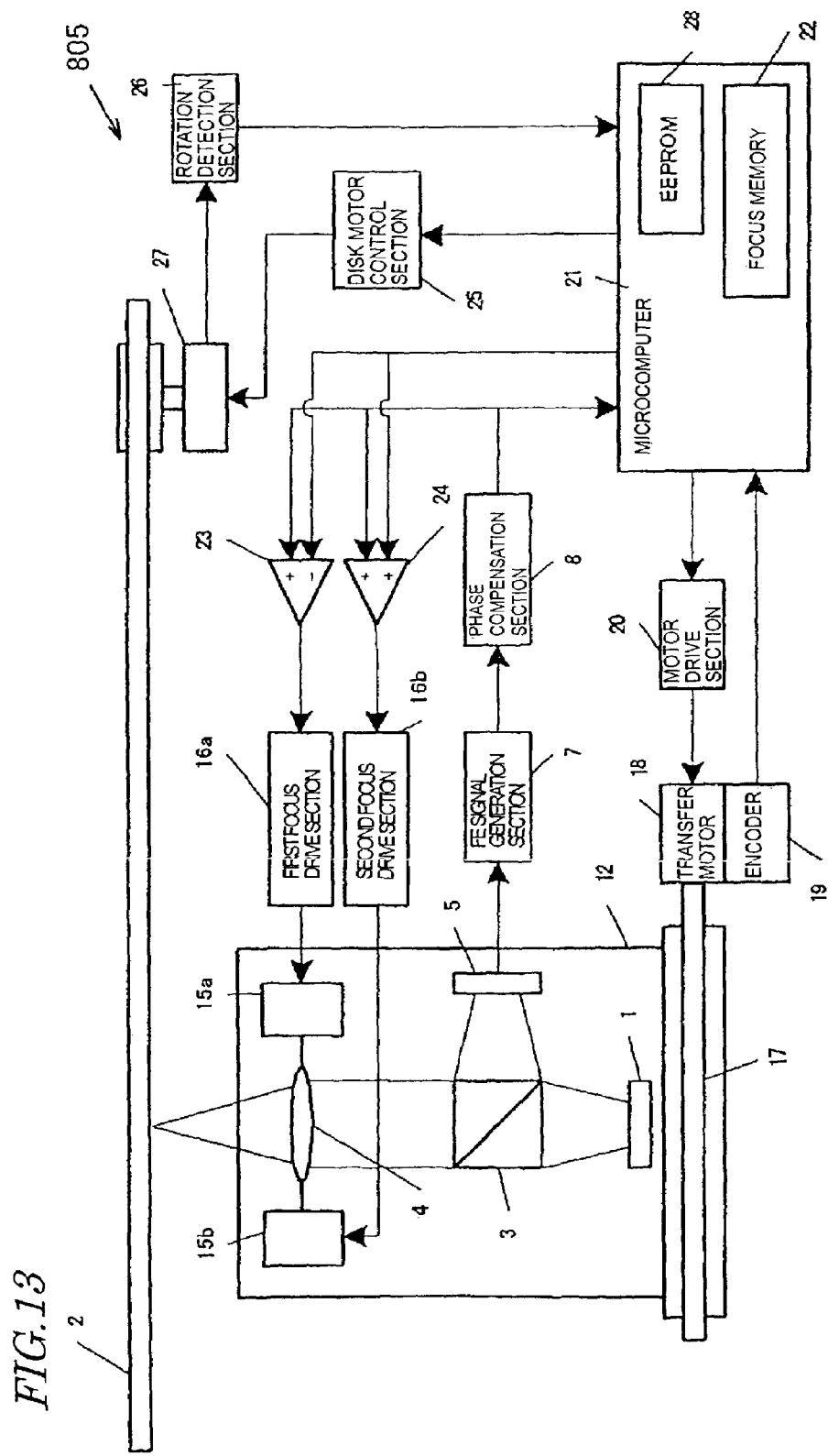
FIG. 13 is a block diagram showing a fifth embodiment of the optical disc apparatus of the present invention.

FIG. 13 is a block diagram showing a fifth embodiment of the optical disc apparatus of the present invention. In an optical disc apparatus 805 shown in FIG. 13, an optical disc 2 is attached to a motor 27 which corresponds to rotating means and rotates at a predetermined number of revolutions. The number of revolutions of the motor 27 is set by a microcomputer 21 and it is controlled by a motor control section 25 which corresponds to rotation controlling means, for example, in such a way that the linear velocity of the motor 27 is constant. A rotation detection section 26 outputs a one-rotation signal every time the motor 27 makes one rotation.

Focus actuators 15*a* and 15*b* are attached in the radius direction of the optical disc 9 with an objective lens 4 inserted in between. The focus actuators 15*a* and 15*b* include a focus permanent magnet and focus coil provided for a lens holder to hold the objective lens 4, for example, as shown in FIG. 6.

When the same focus drive signal is input to a first focus drive section 16*a* and second focus drive section 16*b*, the first focus drive section 16*a* and second focus drive section 16*b* drive the objective lens 4 so as to move in the focus direction. That is, the focus actuators 15*a* and 15*b* correspond to first focus direction transferring means and second focus direction transferring means, respectively, and constitute focus direction transferring means together.

Furthermore, when focus drive signals of different phases or different signal levels are input to the first focus drive section 16*a* and second focus drive section 16*b*, the variation in the focus direction of the objective lens 4 varies between the inside and outside of the objective lens 4 because there is a difference in the direction or magnitude of the currents for driving the first focus drive section 16*a* and second focus drive section 16*b*. This makes it possible to tilt the objective lens 4 in the radius direction (or radial direction) of the optical disc 2. That is, the focus actuators 15*a* and 15*b* constitute objective lens tilting means.

As described in the prior art, when the optical disc 2 inclines in the radius direction with respect to the optical axis of the light beam, comma aberration is generated in the radius direction. On the contrary, even if the optical axis of the objective lens 4 is inclined in the radius direction of the optical disc 2 with respect to the optical axis of the light beam, comma aberration is also generated in the radius direction, and therefore tilting the objective lens 4 in the radius direction by inputting focus drive signals of different phases to the first focus drive section 16*a* and second focus drive section 16*b* makes it possible to cancel out comma aberration generated by tilting of the optical disc 2 in the radius direction. Thus, it is possible to realize satisfactory recording and reproduction by tilting the objective lens 4 and thereby reducing comma aberration.

A transfer motor 18 is attached to an optical head feeding axis 17 and functions as tracking direction transferring means for transferring the optical head 12 in the radius direction of the optical disc 2 by driving this transfer motor 18 and thereby rotating the optical head feeding axis 17. The transfer motor 18 is provided with an encoder 19, which generates pulse signals in synchronization with the rotation of the transfer motor 18 and outputs pulse signals synchronized with the rotation. The output of the encoder 19 is input to the microcomputer 21, which can detect the rotation angle of the motor by counting pulses. Since the rotation angle of the transfer motor 18 corresponds to the amount of transfer of the optical head 12, the radius position of the optical head 12 (more specifically, the radius position of the optical disc 2 irradiated with the light beam) can be detected based on the output of the encoder 19.

A focus drive signal from a phase compensation section 8 is input to the microcomputer 21, which is tilt calculating means for calculating an amount of tilt, one + terminal of a subtraction section 23 and the + terminal of an addition section 24. The microcomputer 21 includes a focus memory 22 for storing the input focus drive signal and radius position as numerical data, decides whether the current radius position is a predetermined radius position set so as to detect a focus drive signal or not, and if the current radius position is the predetermined radius position, a relationship between the radius position and the DC component of the focus drive signal is stored as numerical data in the focus memory 22 as appropriate. The procedure for the microcomputer 21 to detect a DC component of the focus drive signal, determine a deflection function approximating to the deflected shape of the disc using the detected value and determine a tilt approximate function obtained from the deflection function and the procedure for updating the deflection function and the tilt approximate function will be explained in detail below.

The microcomputer 21, which is tilt controlling means calculates a tilt approximate value at the current radius position using the tilt approximate function obtained, generates a tilt drive signal from the tilt approximate value and outputs it. The tilt drive signal is input to the − terminal of the subtraction section 23 and one + terminal of the addition section 24. The subtraction section 23 subtracts the signal input to the − terminal from the signal input to the + terminal and outputs it to the second focus drive section 16*b*. The addition section 24 outputs the sum of the signals input to the two + terminals to the first focus drive section 16*a*.

The procedure described above realizes focus control whereby the light beam is controlled to be always in a predetermined converging state on the signal plane of the optical disc and tilt control whereby the inclination of the objective lens is controlled so as to reduce comma aberration due to tilting.

As described in the first embodiment, the DC component of the focus drive signal output from the phase compensation section 8 is used for tilt control. FIG. 8A shows a waveform of the focus drive signal output from the phase compensation section 8 and FIG. 8B shows a waveform of a one-rotation signal output from the rotation detection section 26. In both figures, the vertical axis and horizontal axis indicate the signal output and time respectively. As shown in FIG. 8A, since the plane deflections are produced on the rotating disc, the objective lens 4 moves in the focus direction following the plane deflections when focus control is in progress. Thus, the focus drive signal varies in synchronization with the plane deflections when the disc makes one rotation. One of possible causes for the variation of the focus drive signal other than plane deflections is a scar or groove produced on the surface of the rotation disc. However, the variation of the focus drive signal due to these influences exceeds the rotating frequency. Thus, by averaging the focus drive signal by one rotation period T of the disc makes it possible to remove or average the variation component and detect only the DC component of the focus drive signal necessary for tilt calculations. Furthermore, using the detection result for tilt detection, it is possible to detect precise tilting in the radius direction of the optical disc 2. The averaged focus drive signal is called a "focus drive signal value."

Figure 14:
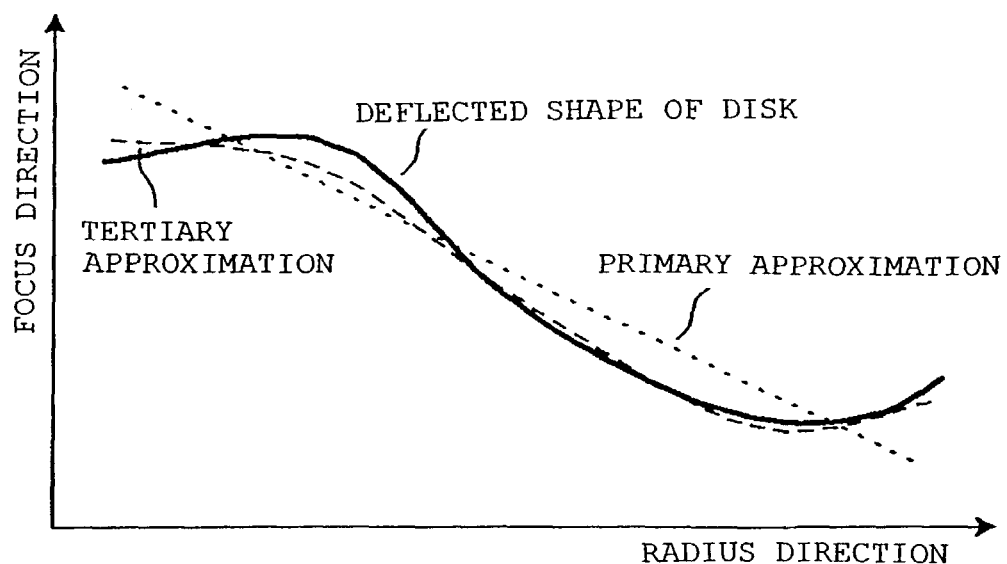
FIG. 14 is a schematic view of a shape of an optical disc.

Then, the method and configuration for calculating tilt from the focus drive signal value will be explained in detail. A deflected shape of the general optical disc 2 represented by a CD or DVD is not a simple linear shape as shown in FIG. 4, but deflections near the outer radius are greater than near the inner radius as shown in FIG. 14 and deflections decrease toward the outermost radius. Thus, deflections do not occur uniformly in the radius direction. Moreover, the deflected shape varies depending on the optical disc 2. In this embodiment, the deflected shape generated in the disc is approximated by a function determined from the focus drive signal value. For this reason, it is more preferable that the accuracy of approximation of the function to determine the deflected shape of the optical disc 2 be high in order to improve the accuracy of tilt correction of the objective lens 4.

As shown in FIG. 14, when the deflected shape of the disc is approximated by a linear function, areas where the deflected shape coincides with the straight line of the linear function are extremely small. On the contrary, when the deflected shape of the disc is approximated by a cubic function, the deflected shape roughly coincides with the curved line of the cubic function. In this way, it is preferable to approximate the deflected shape using a high-degree function.

Figure 15:
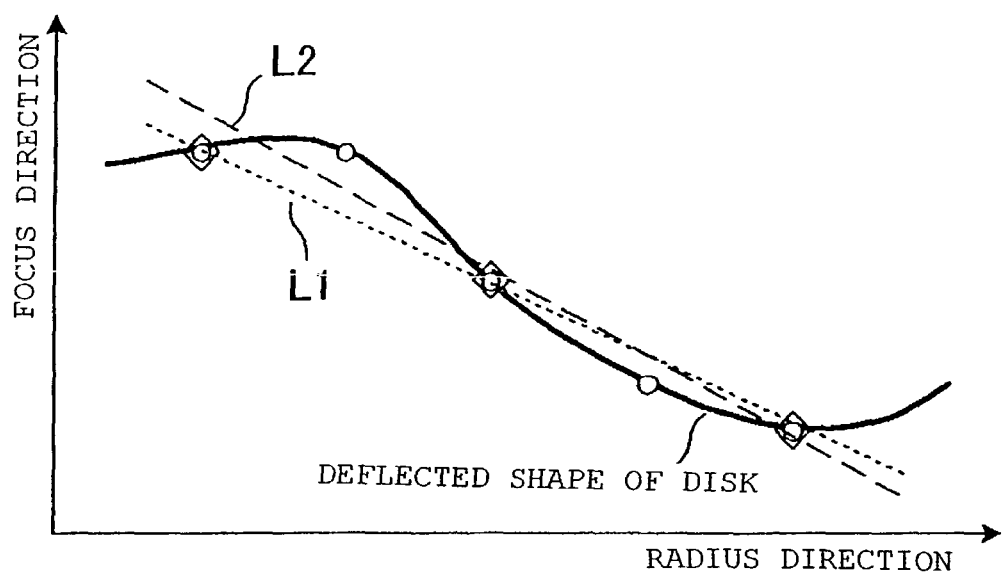
FIG. 15 is a schematic view of a shape of an optical disc and an approximate function thereof.

FIG. 15 shows an example where the deflected shape of the disc indicated by a solid line is approximated by a linear function. As shown in FIG. 15, approximating the deflected shape of the disc at three points, the distances of which are relatively large, gives an approximate function shown by a straight line L1, while approximating the deflected shape of the disc at five points, the distances of which are relatively small, gives an approximate function shown by a straight line L2. It is apparent from FIG. 15 that the accuracy of approximation can improve as the distances among approximate positions are decreased by increasing the degree of the approximate function.

It is apparent from above that reducing distances among approximate points by increasing the degree of approximate function and increasing the number of points used for approximate calculations can improve the accuracy of approximation.

However increasing the number of approximate points results in an extension of time required for estimating the deflected shape of the disc. Furthermore, increasing the degree of the approximate function also increases the number of approximate points to determine the approximate function, which likewise extends the time required for estimating the deflected shape of the disc. This results in a problem that the time required for starting the optical disc apparatus increases.

In order to solve these problems simultaneously, this embodiment detects the deflected shape (tilt) of the disc in two stages; initial detection executed before a recording or reproduction operation is performed on the optical disc and complementary detection executed when a recording or reproduction operation on the optical disc is in progress. For example, in the initial detection, only deflected shape of the inner radius areas used for reading of a lead-in or addition of control information are detected. This reduces the number of detection points and reduces the detection time at startup. Then, in the complementary detection during recording or reproduction, additional detection is performed to improve the accuracy of approximation over the entire circumference. This makes it possible to shorten the detection time at startup and approximate the deflected shape of the disc accurately.

By the way, the initial detection is performed after the optical disc is set in the optical disc apparatus 805 until either a recording operation or reproduction operation on the optical disc is started. The initial detection is generally performed based on the loading operation of the optical disc and automatically performed after the optical disc is set in the optical disc apparatus 805 whether the operator has carried out a recording operation or reproduction operation. However, the initial detection may also be performed immediately before a recording operation or reproduction operation is performed on the optical disc based on the recording operation or reproduction operation by the operator. When the optical disc on which the initial detection has been performed once remains in the optical disc apparatus 805, the initial detection may be omitted before the next recording or reproduction is performed.

On the other hand, the complementary detection is performed during recording or reproduction of the optical disc. This "during recording or reproduction" does not necessarily mean that a recording or reproduction operation is being performed continuously, but does typically mean a period of time during which the optical disc apparatus 805 is carrying out a series of recording or reproduction operations after a recording or reproduction operation on the optical disc is started until the rotation of the optical disc is stopped. Therefore, the complementary detection may also be performed, for example, when the optical head is in a seek operation or paused.

A specific method and configuration for the microcomputer 21 determining a tilt approximate function from this detected focus drive signal will be explained in detail below. The microcomputer 21 approximates a relationship between a radius position x of a detected point and focus drive signal value y which is the output of the focus control section 8 at that position as a predetermined deflection function $y=f(x)$ from the data stored in the focus memory 22. Assuming that the deflection function is quadratic, $f(x)$ can be expressed by the following expression (12):

$$f(x)=ax^2+bx+c \tag{12}$$

Coefficients a, b and c can be determined using various approximation methods. For example, coefficients a, b and c may be determined using a least-square method. Assuming that a focus drive signal value at a radius position xi is yi, a difference vi between the deflection function $f(x)$ and actual value yi at xi can be expressed by the following expression (13):

$$vi=f(xi)-yi=axi^2+bxi+c-yi \tag{13}$$

When the values of a, b and c are determined so that the sum total of the squares of vi reaches a minimum for all detection points, the curve expressed by expression (12) passes an almost average position of the detection points. In this way, a predetermined deflection function $y=f(x)$ that approximates the relationship between the radius position x of the detection point and focus drive signal value y at the position can be calculated.

Since tilt is an inclination corresponding to deflection, a tilt approximate function $z=g(x)$ can be obtained by differentiating the deflection function. The tilt approximate function $z=g(x)$ can be expressed by the following expression (14) using a, b and c:

$$z=g(x)=df(x)/dx=2ax+b \tag{14}$$

Thus, the microcomputer 21 uses the data output from the focus memory 22, determines the values of a, b and c so that the sum total of the squares of vi expressed by expression (13) reaches a minimum, obtains a tilt approximate function $z=g(x)$ and calculates the tilt at the current radius position as a tilt approximate value using the tilt approximate function. Then, the microcomputer 21 generates a tilt drive signal based on the tilt approximate value and outputs it.

Then, the procedure for initial detection and complementary detection after the startup will be explained. For the initial detection and complementary detection, the degree of the approximate function used by the microcomputer 21 and radius positions (detection points) to detect focus drive signals necessary for performing approximate calculations are set beforehand. Furthermore, detection points for initial detection and detection points for complementary detection are set.

Figure 16:
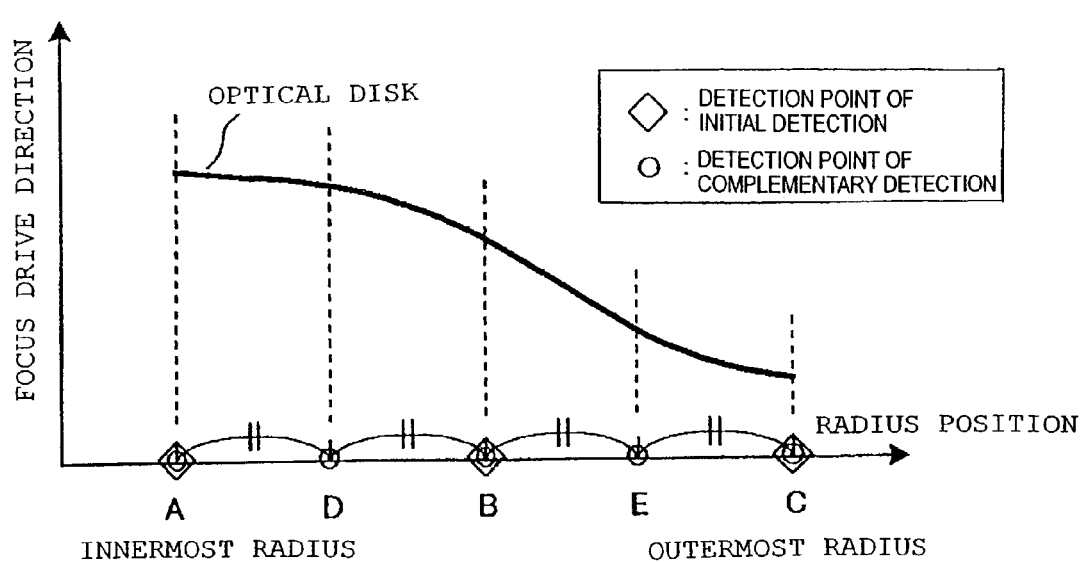
FIG. 16 shows positions of detection points during initial detection and complementary detection.

FIG. 16 is an example showing positions of detection points for detecting focus drive signal values in the radius direction of the disc. As shown in FIG. 16, the initial detection acquires focus drive signal values at point A at the innermost radius of the optical disc, point C at the outermost radius and point B at the mid point between the two points. Furthermore, in addition to points A, B and C of initial detection, the complementary detection acquires focus drive signal values at points D and E at points located midway between these points. Data related to position information of the set detection points is stored in the ROM (not shown) of the microcomputer 21 or EEPROM 28 connected to the microcomputer 21.

For simplicity of explanation, this embodiment assumes that the degree of the deflection function is quadratic and that spacing between detection points used for initial detection and complementary detection is uniform as described above, but the present invention is not limited to the degree of the approximate function or type of the function. Furthermore, considering the characteristic of the general deflected shape of the disc, it is also possible to narrow the spacing between detection points at the inner radius or outer radius having a complicated deflected shape and widen the spacing in the intermediate radius having a simple deflected shape. This makes it possible to improve the accuracy of approximation efficiently with respect to the number of detection points and handle discs with various deflections or in a sagging shape. It is to be noted that the intermediate radius, inner radius and outer radius respectively mean the intermediate area, inner area and outer area obtained by equally dividing the data side into three areas in the radial direction.

Furthermore, it is also possible to detect focus drive signal values in the radius direction at predetermined intervals to grasp the deflected shape of the overall optical disc during initial detection. Then, based on the detection result, it is possible to determine the deflected shape of the disc and set optimum detection points for the deflected shape. For example, as the deflected shape of the disc, it is possible to preset a first shape having greater deflections at the inner radius and outer radius than in the intermediate area and a second shape where the disc is deflected overall at an almost the same curvature. When the shape is considered to be the first shape, a plurality of detection points of focus drive signal values is set so that the detection points are more densely located at the inner radius and outer radius than in the intermediate area. When the shape is considered to be the second shape, a plurality of detection points of focus drive signal values is set so that the detection points are equally spaced in the intermediate area, at the inner radius and outer radius. Then, at the set detection points, initial detection and complementary detection are carried out. This makes it possible to efficiently improve the accuracy of approximation with respect to the number of detection points and discs of various types of deflection and in a sagging shape.

Figure 17:
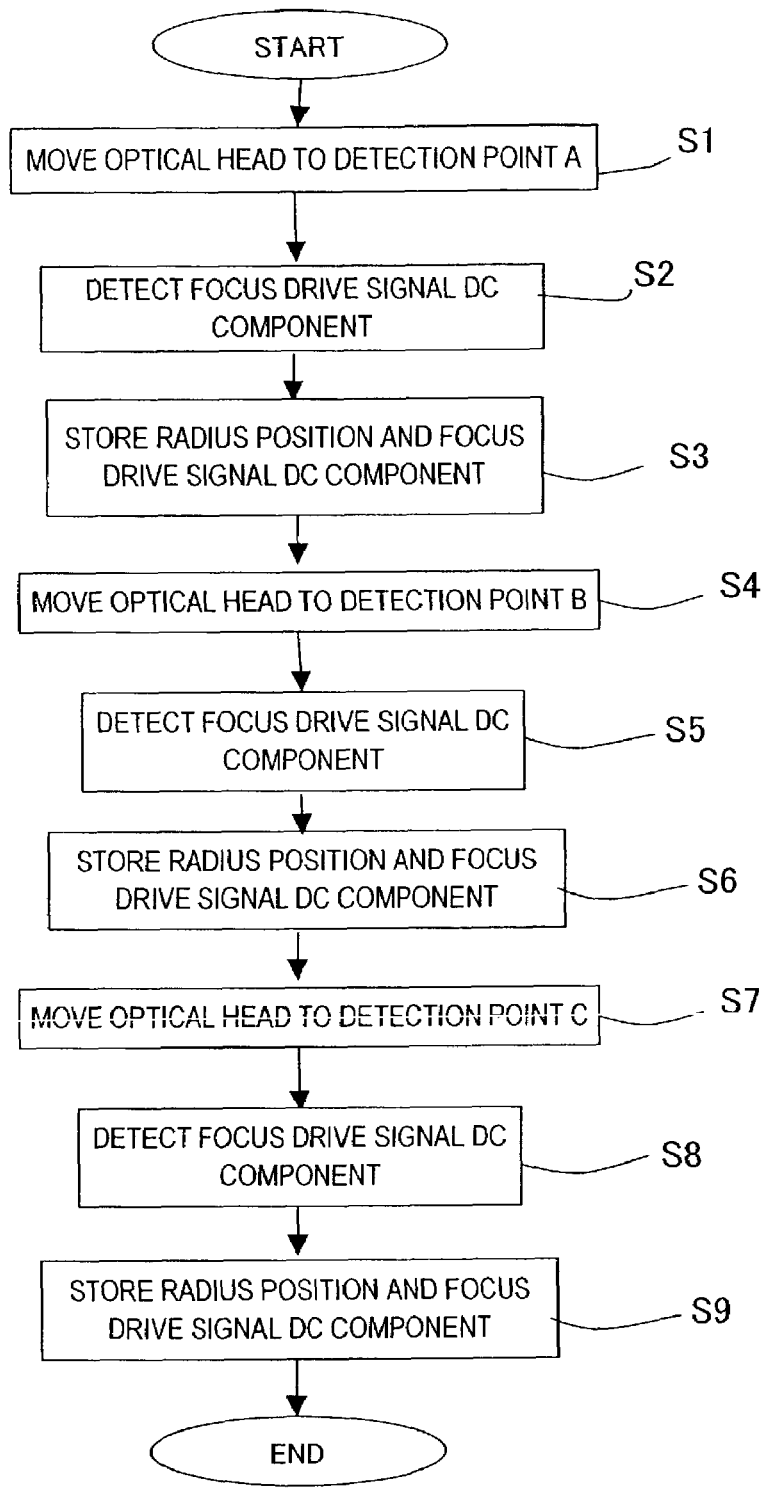
FIG. 17 is a flow chart showing a procedure for initial detection.

First, the processing carried out by the microcomputer 21 at initial detection at startup of the apparatus will be explained. FIG. 17 is a flow chart illustrating the operation of the initial detection. When focus control is in operation, the microcomputer 21 controls the transfer motor 18 to move the optical head 12 to a detection point A in the radius direction (S1). When the optical head 12 reaches the detection point A and a setting time for stabilizing deflections of the objective lens 4 has elapsed, the microcomputer 21 averages focus drive signals for one rotation period of the disc and thereby detects the DC component of the focus drive signal (S2). The relationship between the detection result and radius position is stored as numerical data in the focus memory 22 (S3).

Then, the optical head 12 is moved to the detection point B (S4) to detect the DC component of the focus drive signal (S5). The relationship between the detection result and radius position is stored in the focus memory 22 (S6). Furthermore, the optical head 12 is moved to the detection point C (S7) to detect the DC component of the focus drive signal (S8). The relationship between the detection result and radius position is stored as initial detection data in the focus memory 22 (S9). When detection at all the detection points A, B and C is completed, the process of initial detection is completed. According to the above-described procedure, the microcomputer 21 calculates a quadratic deflection function (expression (12)) using the initial detection data. Then, the tilt approximate function (expression (13)) is obtained.

When the apparatus is in operation, tilt approximate values are calculated one after another according to the position of the optical head 12 using the obtained tilt approximate function. Then, tilt drive signal is generated from the tilt approximate value and output to the subtraction section 23 and addition section 24. The first focus drive section and second focus drive section output drive currents based on the tilt drive signals to the actuators 15a and 15b. This causes the objective lens 4 to incline according to the tilt of the optical disc 2 and reduce or remove comma aberration.

As mentioned above, the initial detection performs detections by moving the optical head 12 to a predetermined radius position. If rotation of the motor is controlled according to a constant linear velocity (CLV) system, the number of revolutions of the motor changes depending on a predetermined radius position. For this reason, the focus drive signals should be detected after a lapse of a setting time necessary to stabilize the number of revolutions of the motor to a predetermined value, and therefore the detection time increases. In this case, rotation of the motor may be controlled according to a constant angular velocity (CAV) system and the above-described initial detection may be carried out while keeping the same number of revolutions, which can avoid an increase of the detection time and shorten the time for starting the apparatus. Furthermore, generally it is often the case that the optical head is positioned at the inner radius at startup. Thus, if control is performed at the number of revolutions of the inner radius set at startup at a constant angular velocity and the above-described initial detection is executed while keeping the number of revolutions, it is possible to reproduce inner radius control data necessary for the system of the optical disc apparatus and increase reliability of recording of information of INDEX and DMA, etc. Since the process of complementary detection which will be explained below allows the tilt accuracy to be secured over the entire circumference of the disc, it is possible to improve the system balance of the overall apparatus.

Figure 18:
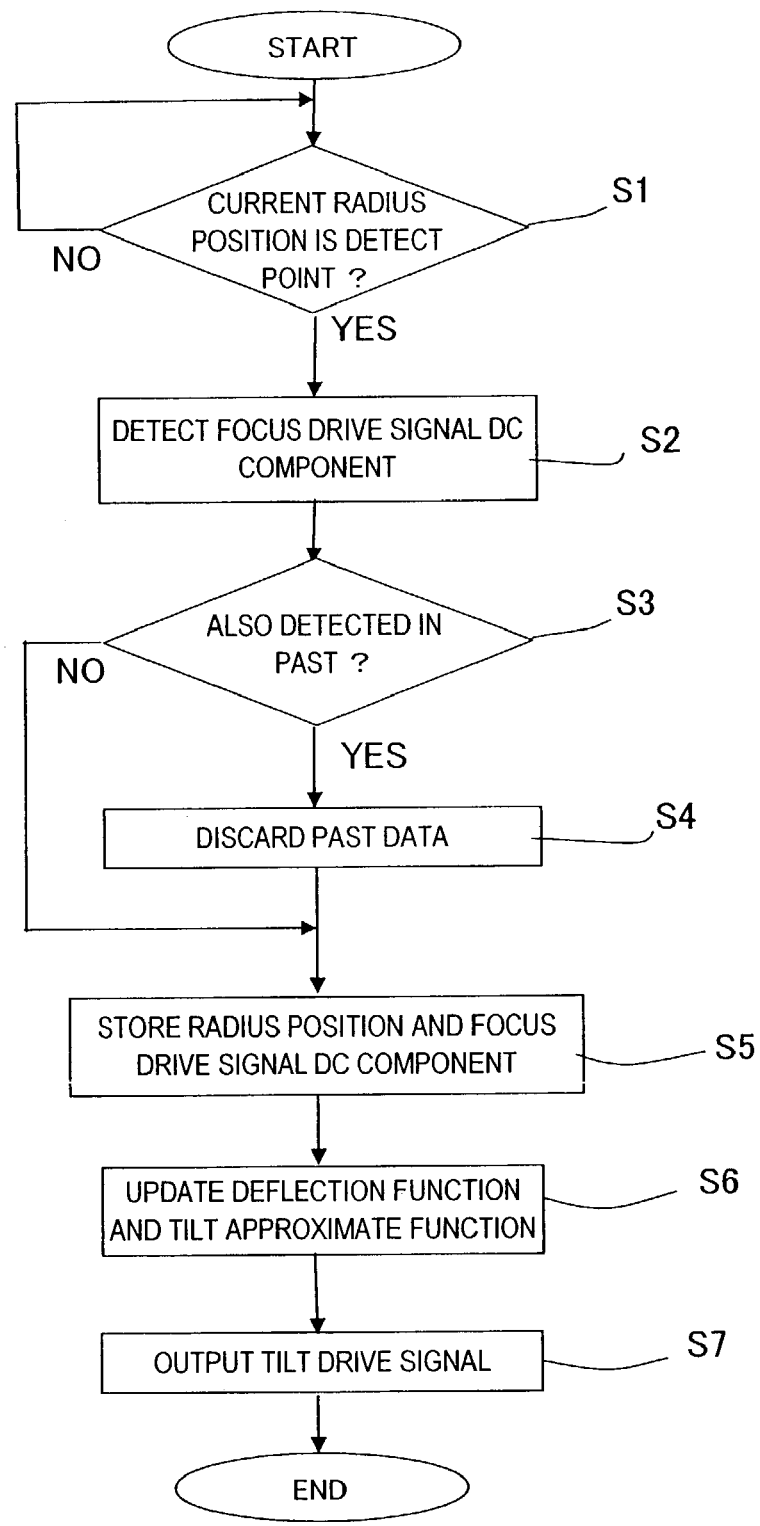
FIG. 18 is a flow chart showing a procedure for complementary detection.

Then, the complementary detection will be explained. The complementary detection is a detection carried out when the apparatus is in operation. FIG. 18 is a flow chart showing an operation of the complementary detection. When the apparatus is in operation and focus control is in operation, the microcomputer 21 decides whether the current radius position of the optical head 12 is the radius position indicated by the predetermined detection points A to E or not based on the signal from the encoder 19 (S1). If the current radius position is any one of the radius positions at the detection points A to E, the DC component of the focus drive signal is detected (S2). Furthermore, it is further decided whether detection was carried out in the past at the same radius position as that of the current detection point and the numerical data was stored in the focus memory 22 (S3). If the result shows that detection was carried out in the past at the same radius position, the data is discarded (S4) and the relationship between the current detection result and radius position is stored as numerical data in the focus memory 22 and data is updated (S5).

On the other hand, if no detection was carried out at the same radius position in the past, the relationship between the current detection result and radius position is stored as numerical data in the focus memory 22 without executing S4 (S5). The above-described process is executed every time the optical head 12 moves to the radius positions at the predetermined detection points A to E and the microcomputer 21 recalculates and updates a quadratic deflection function and tilt approximate function using the numerical data and initial detection data stored by the complementary detection (S6). Furthermore, the microcomputer 21 always generates and outputs a tilt drive signal at the current radius position using the updated tilt approximate function (S7). The objective lens 4 is inclined optimally according to the disc by the output tilt drive signal, making it possible to realize satisfactory reproduction and recording.

As described above, every time complementary detection is carried out, the deflection function and tilt approximate function are updated and tilt control is carried out based on the updated function. Therefore, a tilt drive value is calculated and tilt control is performed using the tilt approximate function determined by the initial detection until complementary detection is carried out for the first time after the initial detection. Thereafter, the tilt approximate function is updated every time complementary detection is carried out, a tilt drive value is calculated based on the updated tilt approximate function and tilt control is performed based on a new calculated value. Since the accuracy of approximation of the updated tilt approximate function is equivalent to or better than the previous tilt approximate function because the number of approximate points used for approximation calculations is increased.

The above-described procedures for initial detection and complementary detection are carried out by sequentially controlling the respective components of the optical disc apparatus 805. A program for allowing the microcomputer 21 to execute the procedure is stored in an EEPROM 28, ROM, RAM, hard disc and computer-readable recording medium such as magnetic recording medium (these are not shown).

In this embodiment, when a focus drive signal is detected at the same radius position, it is also possible to calculate an average value between the previously stored result and the current detection result and store it in the focus memory 22. This makes it possible to reduce influences such as a detection error that could not be eliminated from the focus drive signal by averaging it by the one-rotation period of the disc.

Furthermore, it is also possible to use the detected focus drive signal value, compare a relative coefficient of the updated deflected function and the relative coefficient prior to the update and decide, if the latter is smaller than the first, that the accuracy of approximation of the updated reflection function is deteriorating. In this case, the detected focus drive signal value is regarded as abnormal data and not allowed to be stored in the focus memory 22. This makes it possible to reduce or eliminate influences of inaccurate detection results due to focus skipping or vibration shock on calculations, and therefore improvements of reliability for the detected values of focus drive signals can be expected. Or if a comparison is made between the relative coefficient of the updated deflection function and the relative coefficient prior to the update and the result shows that the latter is smaller than the first, the degree of the deflection function is changed so that the relative coefficient becomes greater than the relative coefficient prior to the update and the coefficient of the deflection function of the changed degree is calculated. Further, a deflection function of the updated degree can also be used for subsequent tilt control. This improves the accuracy of approximation of the deflection function allowing accurate tilt control.

As explained above, this embodiment divides tilt detection into two stages of initial detection and complementary detection, and can thereby make a reduction of a detection time at startup compatible with improvement of accuracy of approximation.

Furthermore, since this embodiment detects the deflected shape of the disc as complementary detection after the startup as appropriate, it can appropriately detect and correct the tilt of the optical disc 2 even if the deflection of the optical disc 2 changes with time after the initial detection.

This embodiment approximates the deflected shape of the optical disc 2 using one function. However, it is also possible to divide the optical disc 2 into a plurality of areas in the radius direction and approximate the deflected shape using functions differing from one area to another. The deflected shape of the optical disc 2 can also be approximated using a line graph (or a polygonal line function). An optical disc apparatus that approximates the deflected shape of the optical disc 2 with a function made up of a line graph will be explained as a modification example of this embodiment below.

Figure 19:
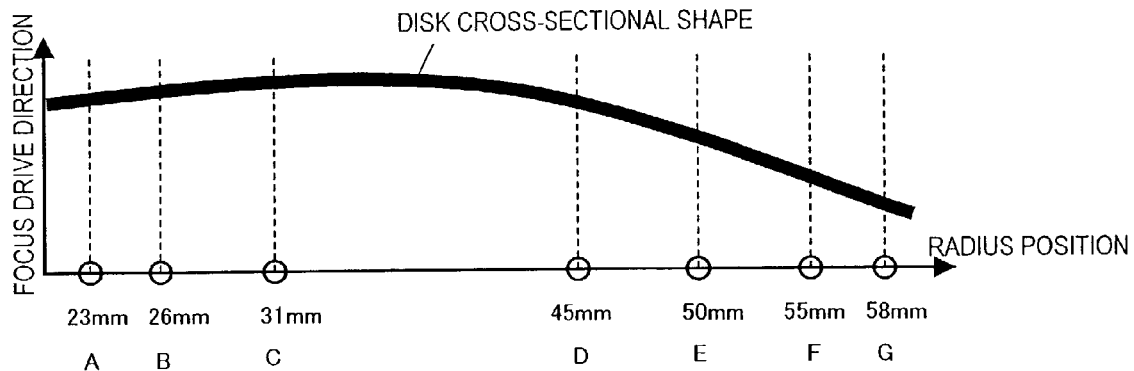
FIG. 19 illustrates positions of detection points in a modification example of the first embodiment.

An optical disc apparatus according to a modification example has a structure as shown in the block diagram in FIG. 13. FIG. 19 shows a deflected shape of the optical disc 2. The optical disc apparatus according to the modification example detects a focus drive signal value at detection points A to G as shown in FIG. 19. Detection points A to G are arranged at irregular intervals in such a way that more detection points are arranged at the inner radius and outer radius than at the intermediate radius. As described above, deflection that occurs in the optical disc 2 generally increase toward the inner radius and outer radius, and therefore increasing the density of detection points toward the inner radius and outer radius makes it possible to accurately approximate the deflected shape of the entire optical disc 2 with fewer detection points. In the case of a 5-inch optical disc such as a CD and DVD, detection points A to G are arranged at positions of 23 mm, 26 mm, 31 mm, 45 mm, 50 mm, 55 mm and 58 mm from the center of the disc, for example. Position information of these detection points is prestored in the optical disc apparatus. For the sake of clarity, FIG. 19 does not show accurate relative distances between detection points with respect to these values.

During the initial detection at startup, the transfer motor 18 is controlled by the microcomputer 21 while focus control is in operation to move the optical head 12 to the detection point A in the radius direction (S1). When the optical head 12 arrives at the detection point A and a setting time for stabilizing deflections of the objective lens 4 has elapsed, the microcomputer 21 averages the focus drive signal by one-rotation period of the disc and thereby detects the DC component of the focus drive signal (S2). The relationship between the detection result and the radius position is stored as numerical data in the focus memory 22 (S3).

Then, the optical head 12 is moved to the detection point B (S4) and the DC component of the focus drive signal is detected (S5). The relationship between the detection result and the radius position is stored in the focus memory 22 (S6). The optical head 12 is further moved to the detection point C (S7) and the DC component of the focus drive signal is detected (S8). The relationship between the detection result and the radius position is stored as initial detection data in the focus memory 22 (S9). Though not shown in FIG. 18, the optical head 12 is moved to the detection points D, E, F and G using the same procedure and the DC components of the focus drive signals at the respective detection points are detected. When detection at all the detection points A to G is completed, the process of initial detection is completed.

Figure 20:
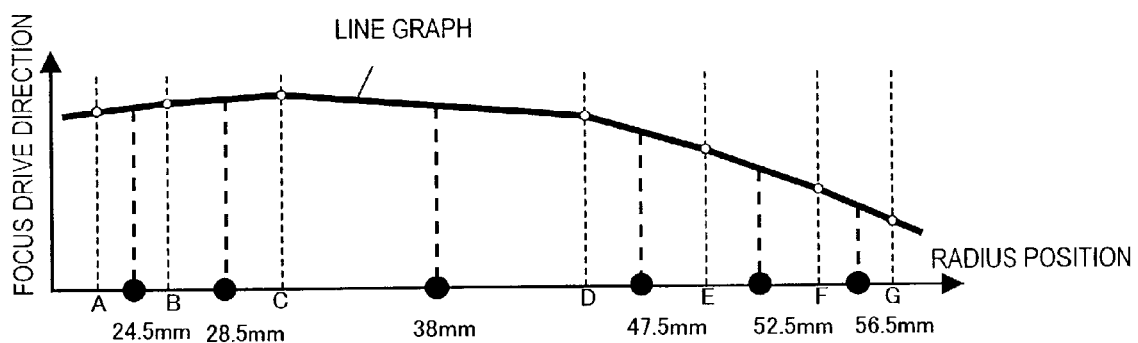
FIG. 20 illustrates a deflection function.

Then, the microcomputer 21 connects the focus drive signal values at the neighboring detection points using straight lines from data of the focus drive signal values at the respective detection points and radius positions and obtains a deflection function made up of the line graph shown in FIG. 20. Then, a tilt approximate function is determined by differentiating the deflection function obtained.

When the apparatus is in operation, the tilt approximate function obtained is used to sequentially calculate tilt approximate values according to the position of the optical head 12. Then, tilt drive signals are generated from the tilt approximate values and output to the subtraction section 23 and addition section 24. The first focus drive section and the second focus drive section output drive currents based on the tilt drive signals to the actuators 15a and 15b. This causes the objective lens 4 to incline according to the tilt of the optical disc 2 and comma aberration is reduced or eliminated.

Figure 21:
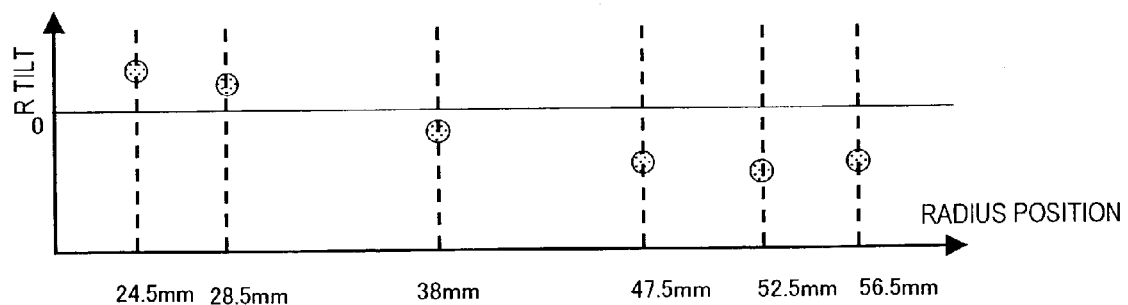
FIG. 21 illustrates tilt approximate values obtained from the function in FIG. 19.

Using the tilt approximate function, FIG. 21 shows tilts (inclinations of deflection function) at midpoints of the detection points A to G (positions of 24.5 mm, 28.5 mm, 38 mm, 47.5 mm, 52.5 mm and 56.5 mm from the center of the disc). As shown in FIG. 21, the tilt value from the position of 38 mm from the center of the disc toward the outer radius are negative and correctly shows the deflected shape of the optical disc 2 shown in FIG. 19.

Then, the procedure for complementary detection after startup will be explained. When a line graph is used as a deflection function, even if a focus drive signal value at one detection point is updated in the complementary detection, the entire deflection function made up of a line graph cannot be updated with the one updated focus drive signal value. For this reason, this modification example uses another function to update the deflection function during complementary detection.

After the optical disc apparatus is started, one of major causes for the deflected shape of the optical disc 2 to change is a variation of ambient temperature and humidity. According to experiment results, when the position in the radius direction of the optical disc 2 is r, a variation $\Delta y$ of the deflected shape at position r after time $\Delta t$ can be approximated by the following expression (15):

$$\Delta y = a \times (r - R0) \tag{15}$$

Here, a is a proportionality constant and R0 is a radius position whose deflected shape does not change. For example, R0 is the position of the outer radius of a clamper. Since the deflected shape can be expressed with a focus drive signal value, variation $\Delta f$ of the focus drive signal value at the position r after $\Delta t$ can be expressed by the following expression (16) where A is a proportionality constant:

$$\Delta f = A \times (r - R0) \tag{16}$$

Therefore, if a focus drive signal value during initial detection at any one of the detection points A to G and a focus drive signal value during complementary detection are known, Δf is known, and therefore it is possible to calculate the proportionality constant A by substituting Δf and position r in the radius direction of the detection point into expression (16).

Then, the focus drive signal value Δf at other detection points A to G is calculated from expression (16) using the calculated proportionality constant A and the focus drive signal values at other detection points A to G during complementary detection are calculated from the focus drive signal values during initial detection. The deflection function is updated using the focus drive signal values at the measured detection points and the calculated focus drive signal values at other detection points A to G and further the tilt approximate function is updated. Then, tilt approximate values are calculated from the updated tilt approximate function according to the position of the optical head 12 and tilt drive signals are further generated.

Figure 22:
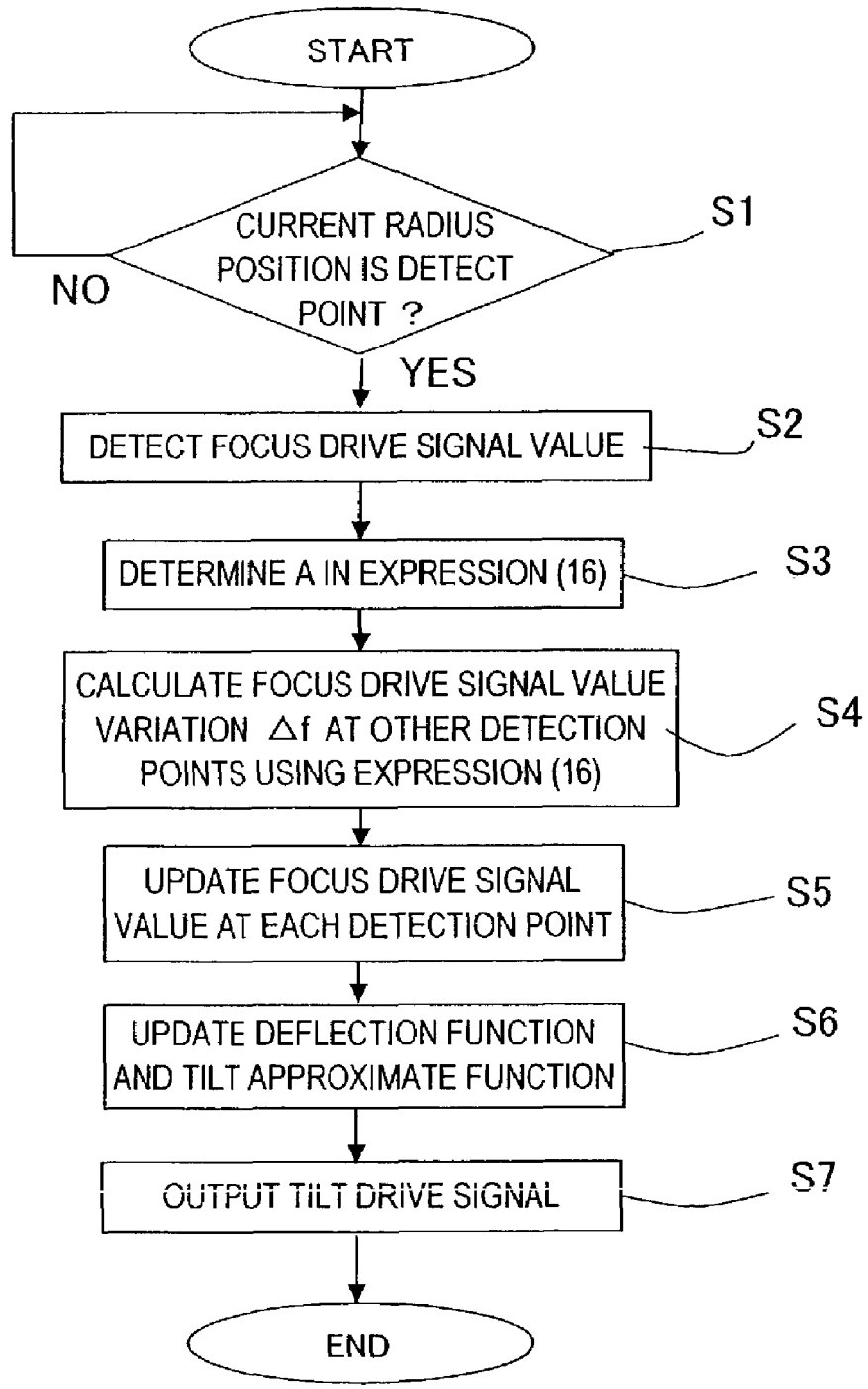
FIG. 22 is a flow chart showing a procedure for complementary detection.

These procedures will be summarized in FIG. 22. While the apparatus is in operation, when focus control is in progress, the microcomputer 21 decides whether the current radius position of the optical head 12 is the radius position indicated by a predetermined detention point A to G or not based on the signal from the encoder 19 (S1). If the current radius position is any one of the detection points A to E, the DC component of the focus drive signal is detected (S2).

Then, assuming that the difference between the focus drive signal value at the detection point during initial detection and the focus drive signal value detected in step S2 is Δf and the position of the detection point is r, these are substituted into expression (16) to calculate the proportionality constant A and determine expression (16) (S3). Δf at other detection points is calculated using expression (16) (S4). By adding the Δf obtained to the focus drive signal value during initial detection, the focus drive signal values at detection points other than the point detected in step S2 are updated (S5).

Using the focus drive signal value detected in step S2 and the focus drive signal value calculated in step S5, the deflection function and tilt approximate function are updated (S6). Furthermore, tilt approximate values are sequentially calculated according to the position of the optical head 12 and tilt drive signals are generated based on the values (S7).

The procedure shown in FIG. 22 performs complementary detection when the optical head reaches the radius positions indicated by the predetermined detection points A to G during the operation of the apparatus. However, as will be explained in the following embodiments, even if the optical head is used for recording or reproduction, if there is a time to move the optical head and carry out complementary detection, it is also possible to jump to a detection point A to G closest to a track on which recording/reproduction is being performed to perform complementary detection. Immediately after the apparatus is started, the disc may be subject to a great temperature variation and the deflected shape of the disc may change. In this case, it is also possible to carry out complementary detection at predetermined time intervals (e.g., every 2 to 3 minutes) after the apparatus is started irrespective the operating state of the apparatus.

As explained above, this embodiment makes it possible to detect the amount of tilt of the disc in two stages; before carrying out recording or reproduction on the disc and during recording or reproduction. Initial detection before carrying out recording or reproduction can reduce the number of detection points and shorten the detection time, while complementary detection during recording or reproduction can improve the accuracy of approximation of the function whose deflected shape of the disc is to be approximated by carrying out additional detection. This makes it possible to realize appropriate tilt control by accurately approximating the deflected shape of a recording medium such as an optical disc and at the same time shorten the detection time at startup. Furthermore, complementary detection can update the deflection function and tilt approximate function, and can thereby perform appropriate tilt control of the objective lens even if the tilt of the optical disc changes during recording or reproduction.

Sixth Embodiment

Figure 23:
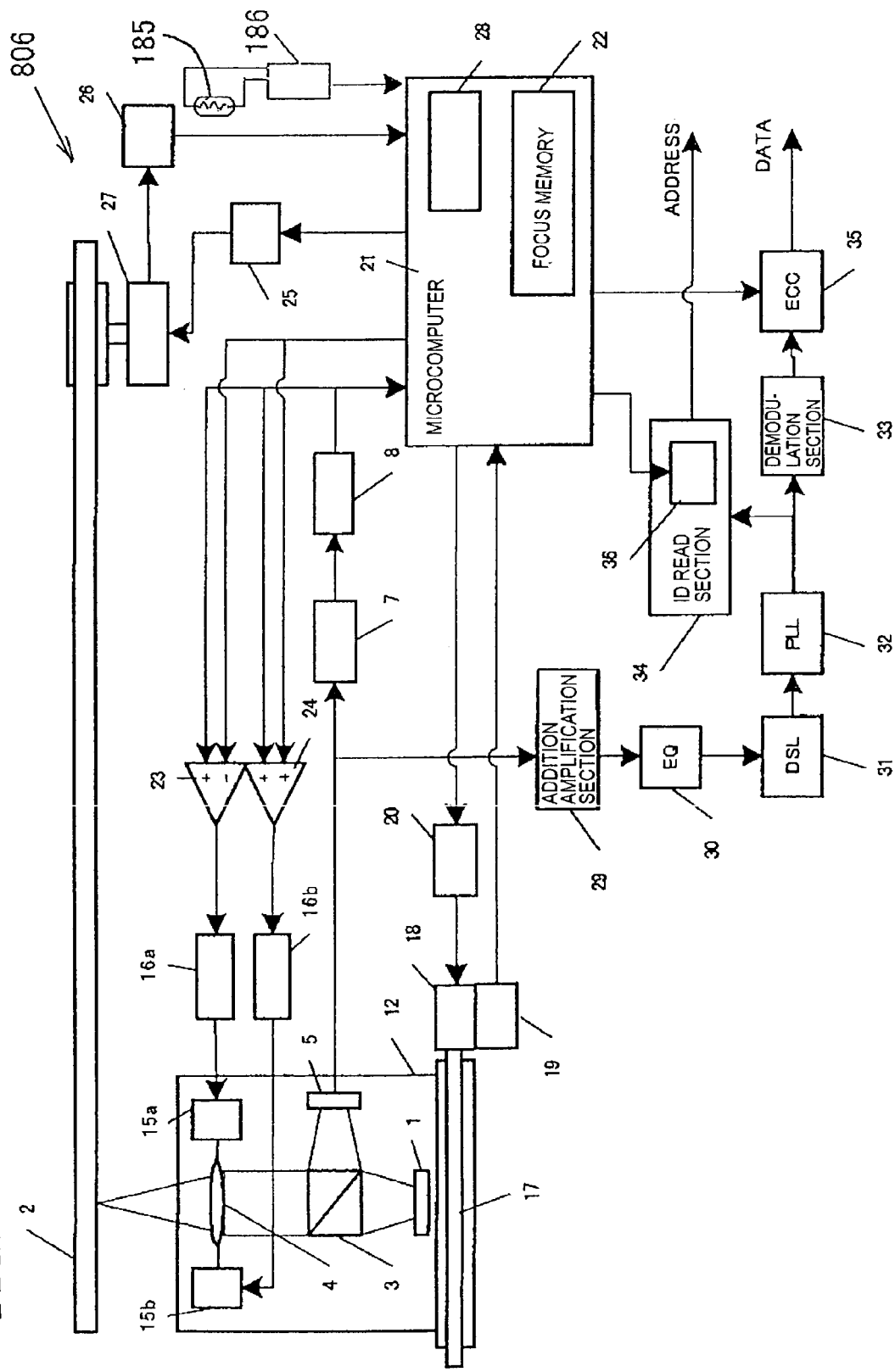
FIG. 23 is a block diagram showing a sixth embodiment of the optical disc apparatus of the present invention.

FIG. 23 is a block diagram showing a sixth embodiment of the optical disc apparatus of the present invention. In the optical disc apparatus 806 shown in FIG. 23, the same components as those in the fifth embodiment are assigned the same reference numerals.

In the optical disc apparatus 806, each detection signal output from a detector 5 whose photo-reception area is divided into a plurality of portions is added and amplified at an addition amplification section 29, converted to a reproduction signal (RF signal) and input to an equalizer (EQ) 30.

The equalizer 30 equalizes the waveform of the reproduced signal in its signal band and outputs the processed signal to a data slicer (DSL) 31. The data slicer 31 compares the waveform-equalized reproduced signal with a predetermined level which is stored beforehand, generates a binary data signal by binarizing it based on the result and outputs the binarized data signal to a PLL circuit (PLL) 32. The PLL circuit 32 performs frequency control and phase control on a clock signal that matches the binarized data signal and thereby synchronizes the binary data signal with the clock signal. A data window is generated from this synchronized clock signal, the data in the window is extracted and discriminated and output as a synchronized data signal to a demodulation section 33 and ID read section 34. The demodulation section 33 demodulates the synchronized data signal and outputs the demodulated data to an error correction circuit (ECC) 35 which is code error correcting means. The error correction circuit 35 carries out error correction on the demodulated data and outputs the corrected data signal (DATA).

Furthermore, a microcomputer 21, which is error detecting means, monitors the error correction circuit 35, compares data before and after correction, counts the number of errors and calculates an error rate from the number of errors. An ID read section 34 extracts a sector address signal from a sector ID in the synchronized data signal and outputs address information corresponding to the current scanning position to the host. Furthermore, when detection of the sector address signal fails, the ID read section 34 complements and outputs the undetected sector address information using the previously detected sector address and clock of the PLL circuit 32. A sector address complemented in this way is called a "pseudo-address." The microcomputer 21 monitors the ID read section 34 and outputs the number of times pseudo-addresses are calculated to a pseudo-address counter 36 which is address error detecting means.

As in the case of the fifth embodiment, this embodiment performs tilt detection in two stages; initial detection at startup and complementary detection during operation of the apparatus. This embodiment in particular is characterized by a method for carrying out complementary detection and a configuration to realize it. Initial detection can be realized using the same method and configuration as those of the fifth embodiment.

Figure 24:
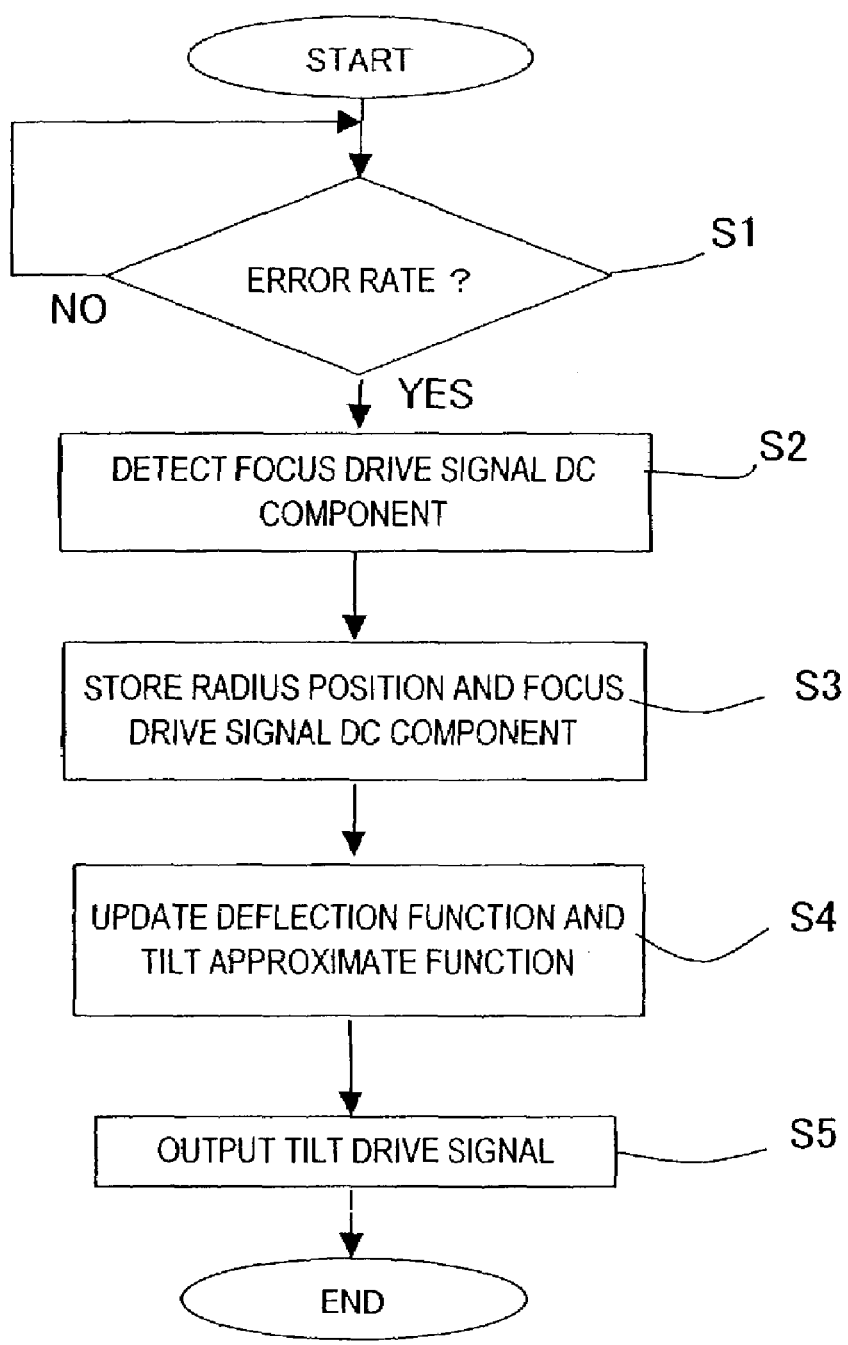
FIG. 24 is a flow chart showing a procedure for complementary detection.

Complementary detection in this embodiment is carried out when the apparatus is in operation. FIG. 24 is a flow chart showing its procedure. A microcomputer 21 monitors an error correction circuit 35 and decides whether an error rate exceeds a predetermined value or not (S1). With regard to a predetermined value, in the case of a DVD apparatus, for example, it is appropriate to set $1\times10^{-3}$ to $5\times10^{-3}$ as a byte error. This is attributable to the fact that the upper limit of byte errors correctable by one error correction is on the order of $5\times10^{-3}$ for a DVD apparatus. However, other predetermined values may also be set.

If the error rate exceeds this predetermined value, the DC component of the focus drive signal can be detected (S2) and furthermore the relationship between the detection result and radius position is stored as numerical data in a focus memory 22 (S3). Complementary detection is carried out every time it is confirmed that the error rate exceeds the predetermined value and the microcomputer 21 recalculates a deflection function and tilt approximate function using the numerical data stored through the error complementary detection and the initial detection data and updates it (S4). Furthermore, the microcomputer 21 always generates and outputs tilt drive signal at the current radius position using the updated tilt approximate function (S5). It is possible to tilt the objective lens 4 optimally according to the shape of the surface of the optical disc 2 using the output tilt drive signal and realize satisfactory reproduction.

This embodiment performs complementary detection according to an increase of the error rate as appropriate. Thus, it can detect deterioration of the accuracy of the deflection function during reproduction appropriately and in real time and update the deflection function and tilt approximate function. As a result, the update of the deflection function by complementary detection can be reflected in tilt control as appropriate.

Figure 25:
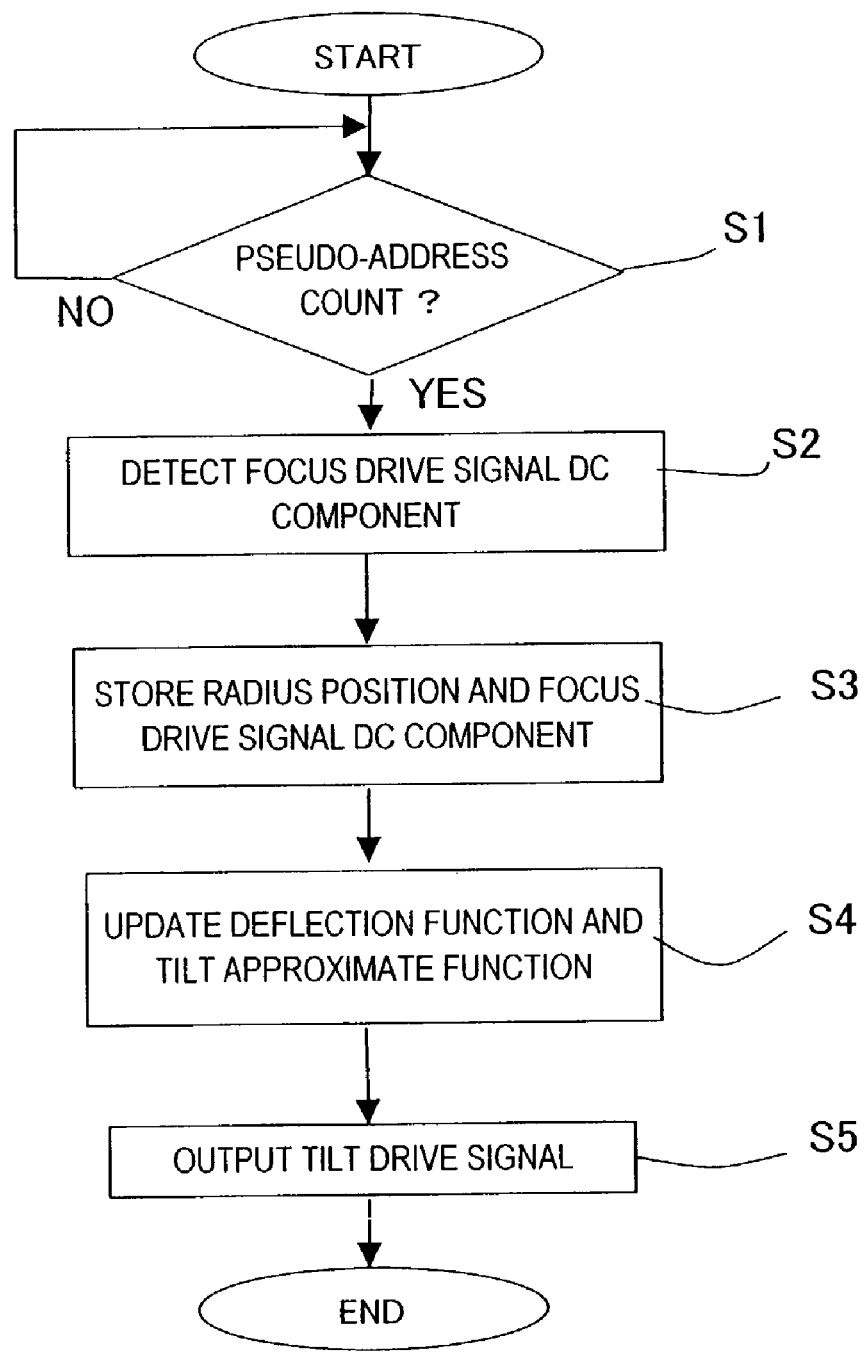
FIG. 25 is a flow chart showing another procedure for complementary detection.

By the way, timing for executing complementary detection in this embodiment can be decided using not only the above-described error rate but also the pseudo-address counter 36. FIG. 25 is a flow chart showing the procedure for complementary detection using the pseudo-address counter 36. The complementary detection using the pseudo-address counter 36 will be explained using this figure.

The microcomputer 21 decides whether the count value detected by the pseudo-address counter 36 exceeds the predetermined count value or not (S1) and detects, if it exceeds the predetermined count value, the DC component of the focus drive signal (S2). Then, the relationship between the detection result and radius position is stored as numerical data in the focus memory 22 (S3). Complementary detection is executed every time it is confirmed that the count value detected by the pseudo-address counter 36 exceeds the predetermined count value. The microcomputer 21 recalculates and updates a deflection function and tilt approximate function using the numerical data stored through complementary detection and initial detection data (S4). Furthermore, the microcomputer 21 always generates and outputs a tilt drive signal at the current radius position of the current light beam using the tilt approximate function (S5). The objective lens 4 is inclined according to the output tilt drive signal, making it possible to realize satisfactory reproduction and recording.

As described above, by carrying out complementary detection according to an increase in the pseudo-address count as appropriate, it is possible to detect deterioration of the accuracy of the deflection function appropriately and in real time and update the deflection function and tilt approximate function. The update of the deflection function by the complementary detection is reflected in tilt control as appropriate.

Figure 26:
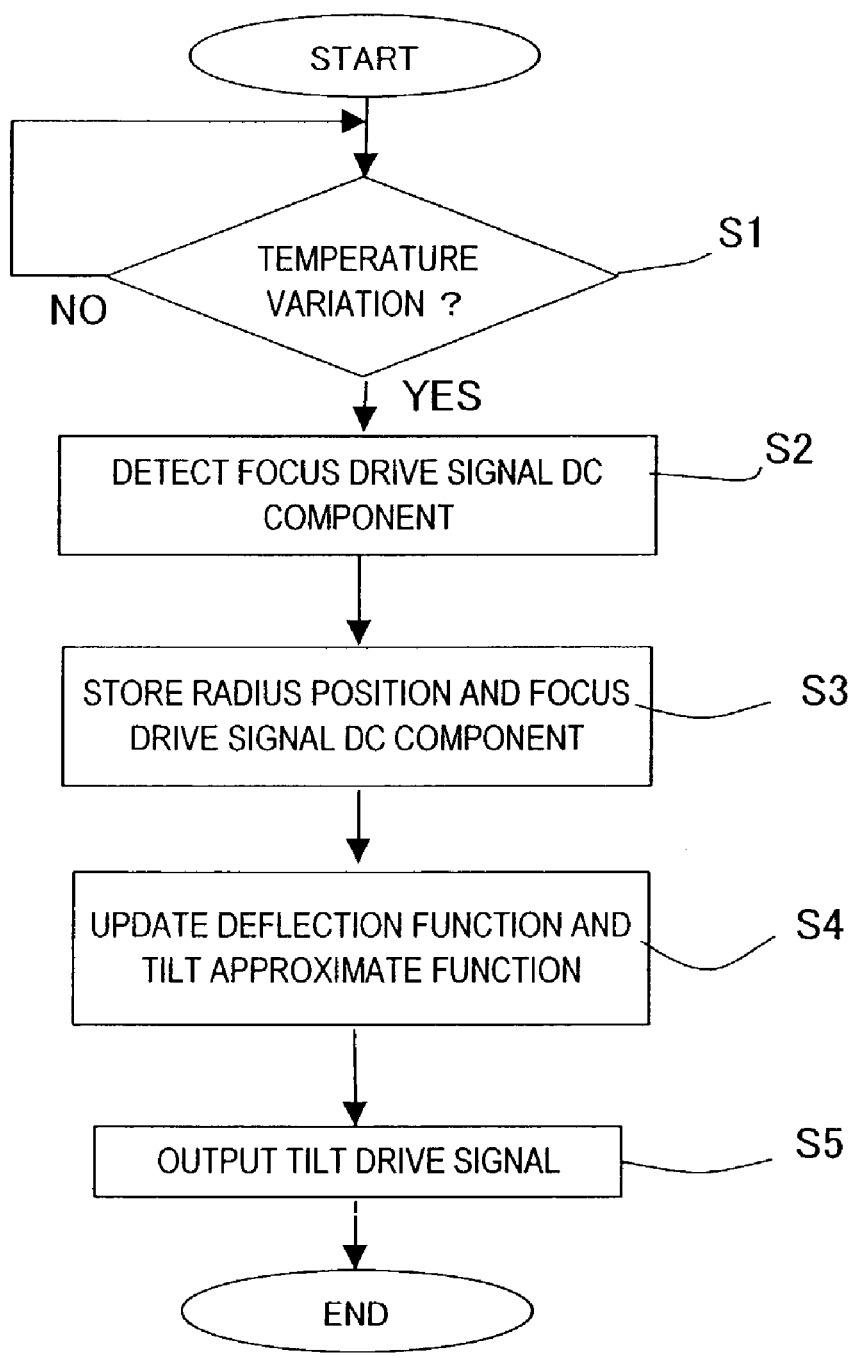
FIG. 26 is a flow chart showing another procedure for complementary detection.

In the above-described complementary detection, the execution is decided based on the error rate or pseudo-address count during the operation of the optical disc apparatus. However, since the deflection of the optical disc 2 varies depending on a temperature, it is also possible to provide a temperature sensor 185 and an A/D conversion circuit 186 that A/D-converts the output of the temperature sensor 185 and inputs it to the microcomputer 130 for the optical disc apparatus 806, allows the microcomputer 21 to decide whether the output of the temperature sensor has changed by a predetermined value or more, and update the deflection function through complementary detection. FIG. 26 is a flow chart showing a procedure for complementary detection using the temperature sensor and the complementary detection using the temperature sensor will be explained using this figure.

The microcomputer 21 decides whether the amount of temperature detected by the temperature sensor 185 has changed by more than a predetermined value or not (S1) and if it exceeds the predetermined value, the microcomputer 21 detects the DC component of the focus drive signal (S2) and stores the relationship between the detection result and radius position as numerical data in the focus memory 22 (S3). Complementary detection is carried out every time it is confirmed that the amount of change in the temperature detected by the temperature sensor has changed by more than a predetermined value. The microcomputer 21 recalculates and updates a deflection function and tilt approximate function using the numerical data stored through the complementary detection and the initial detection data (S4). Furthermore, the microcomputer 21 generates and outputs a tilt drive signal which is always at the current radius position using the updated tilt approximate function (S5). The objective lens 4 is inclined by the output tilt drive signal, making it possible to realize satisfactory reproduction and recording.

As described above, by using a temperature sensor and carrying out complementary detection according to a temperature variation, it is possible to appropriately detect a tilt variation of the optical disc 2 produced by a temperature characteristic of the optical disc 2 after startup and update the deflection function. Furthermore, the update of the deflection function and tilt approximate function by the complementary detection is reflected in tilt control as appropriate.

According to this embodiment, when an error rate or complemented address, that is, when an address error occurs, the deflection function and tilt approximate function are updated as appropriate and the tilt drive value is recalculated. For this reason, when disturbance (e.g., abnormal inclination of the tilt actuator due to damage, etc.) corresponding to partial deflection or tilt occurs, it is possible to read or write the data corresponding to that part.

Especially for reproduction or recording the moving picture data, if it takes time to update this deflection function, trouble such as data break or block noise is likely to be observed. However, if this embodiment is used, only one point is detected with one complementary detection, and therefore no data break occurs during reproduction or recording of moving picture data.

Thus, according to this embodiment, the deflection function is updated according to the rate of errors included in the data during recording or reproduction, which allows appropriate tilt control at any time and allows satisfactory recording or reproduction. Thus, this embodiment can improve reliability of a data write or read.

Seventh Embodiment

Figure 27:
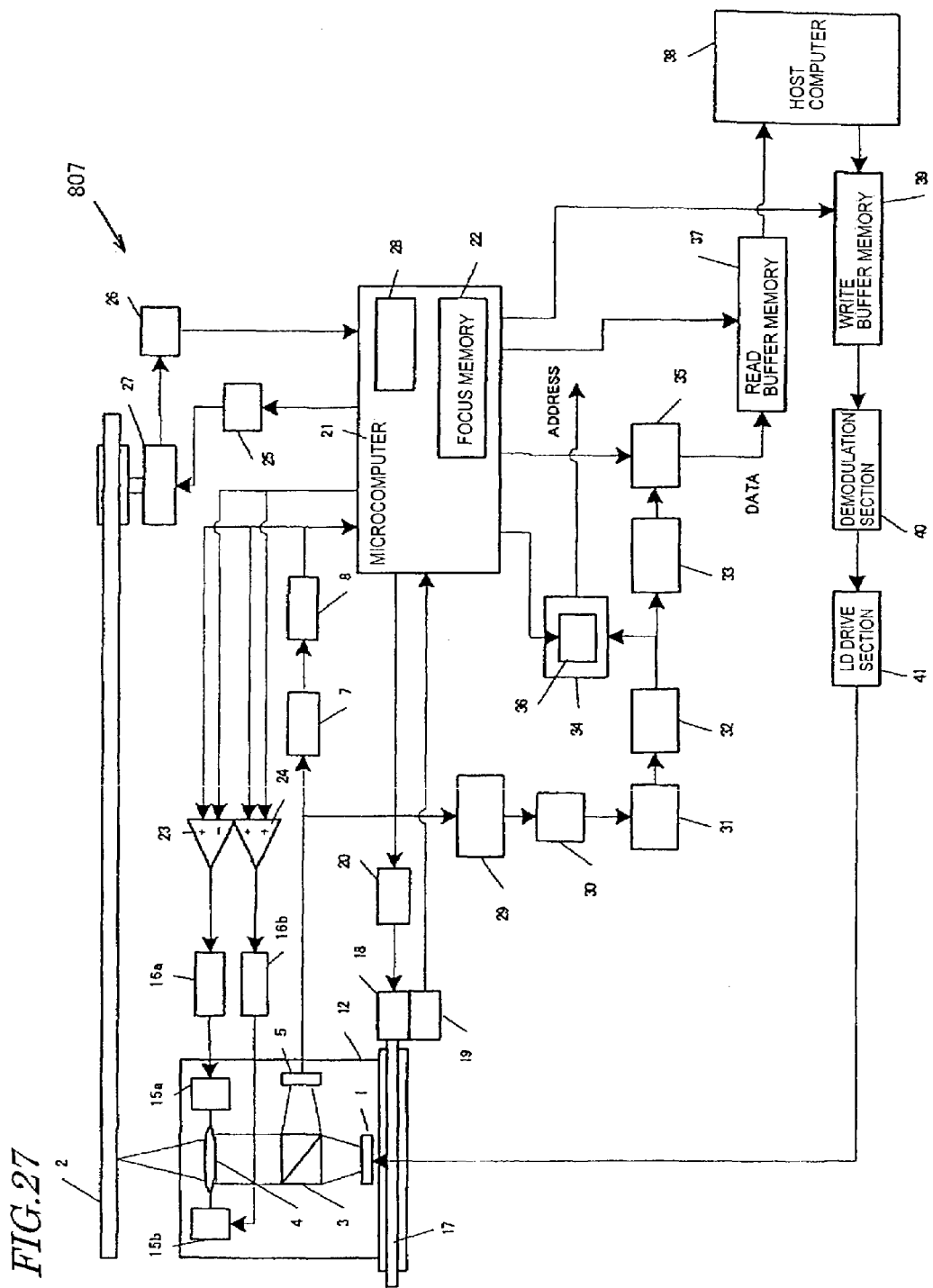
FIG. 27 is a block diagram showing a seventh embodiment of the optical disc apparatus of the present invention.

FIG. 27 is a block diagram showing a seventh embodiment of the optical disc apparatus of the present invention. In the optical disc apparatus 807 shown in FIG. 27, the same components as those in the sixth embodiment are assigned the same reference numerals.

When the optical disc apparatus 807 is performing a reproduction operation, an reproduction data signal (DATA) after error correction output from an error correction circuit 35 is input to and stored in a read buffer memory 37, which is buffer means for temporarily storing the reproduction data. The reproduction data stored in the read buffer memory 37 is output to a host computer 38 by the microcomputer 21 in response to a request from the host computer 38. This process allows the optical disc apparatus 807 to reproduce the signal stored in the optical disc. Furthermore, the microcomputer 21 monitors the read buffer memory 37 and can detect the amount of data stored in the read buffer memory 37.

On the other hand, when the optical disc apparatus 807 is performing a recording operation, recorded data output from the host computer 38 is stored in a write buffer memory 39, which is buffer means for temporarily storing the recorded data. The recorded data stored in the write buffer memory 39 is input to a modulation section 40 by the microcomputer 21 and modulated according to a predetermined modulation system. The modulated data is output to an LD drive section (laser diode drive section) 41, which allows a light source 1 mounted on an optical head 12 to emit light. The light source 1 emits a light beam according to the drive signal from the LD drive section 41 and when the recording plane of the optical disc 2 is irradiated with the emitted light beam, the signal is recorded on the recording plane of the optical disc 2. Furthermore, the microcomputer 21 monitors the write buffer memory 39 and can detect the amount of data stored in the write buffer memory 39.

Then, timings for carrying out a data read, data write and complementary detection, which constitutes a feature of this embodiment, will be explained. Suppose a data input/output velocity between the optical disc 2 and buffer memory is Vin and data input/output velocity between the buffer memory and the host computer 38 is Vout. To secure the time for executing a retry process as much as possible, the data input/output velocity is normally set so as to secure Vin>Vout. Suppose the optical disc apparatus 807 also satisfies this relationship.

Figure 28:
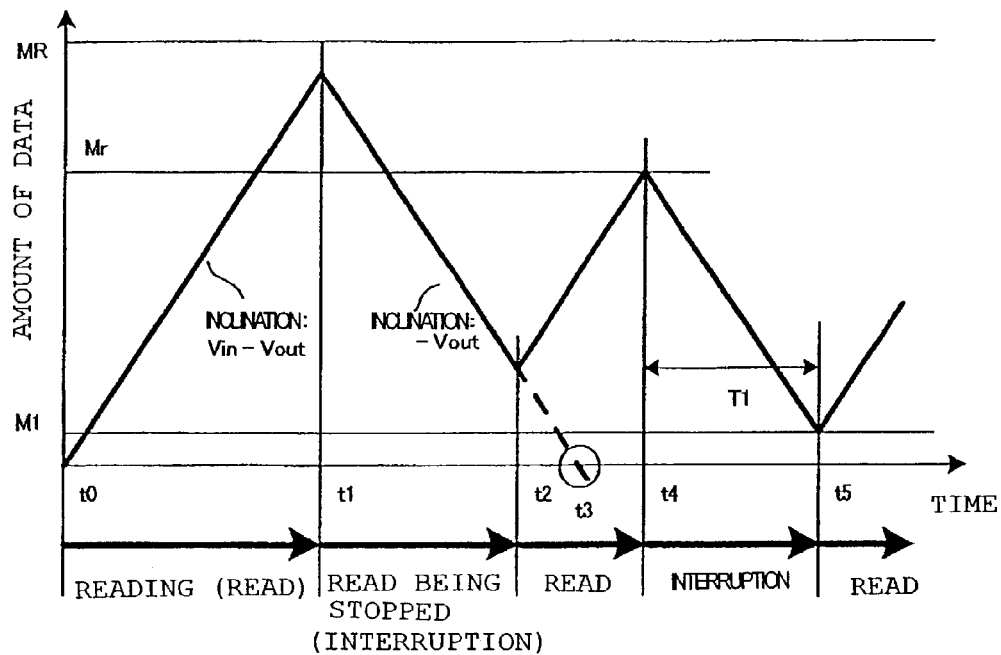
FIG. 28 illustrates a time variation in an amount of data in a read buffer memory during a reproduction operation.

FIG. 28 illustrates a time variation of an amount of data in the read buffer memory 37 during a reproduction operation of the optical disc apparatus 807. While the optical head 12 is reading data from the optical disc 2 (time t0 to t1), the data read from the optical disc 2 is sent to the read buffer memory 37. At this time, the amount of data in the read buffer memory 37 increases at a velocity of Vin−Vout. While a data read by the optical head 12 is stopped (time t1 to t2), the amount of data in the read buffer memory 37 decreases at a velocity of Vout.

For a reproduction operation of the optical disc apparatus 807, the reproduction data output from the read buffer memory 37 to the host computer 38 should not be interrupted and it is when the amount of data in the read buffer memory 37 falls below 0 (time t3) that the reproduction data is interrupted. Thus, the timing for starting a read operation should be controlled so that the amount of data in the read buffer memory 37 never falls below a predetermined amount M1. For the predetermined amount M1, for a DVD, for example, it is appropriate to set M1 to a capacity of one ECC (Error Correction Code) block which is one product code resulting from a combination of error correction codes. However, the capacity M1 can also be a value other than the capacity of one ECC block.

Assuming that the amount of data in the read buffer memory 37 at time t4 during a reproduction operation of the optical disc apparatus 807 is Mr (>M1), the optical head 12 can interrupt the data read and execute another process for a time T1 which is calculated by:

$$T1 = (Mr - M1)/Vout \quad (17)$$

Hereinafter, this time T1 will be referred to as "float T1."

In other words, even if the optical head 12 stops a data read operation at time t4, if the optical head 12 restarts the data read operation at time t5 at which the amount of data in the read buffer memory 37 becomes M1, the reproduction data output to the host computer 38 will never be interrupted.

Figure 29:
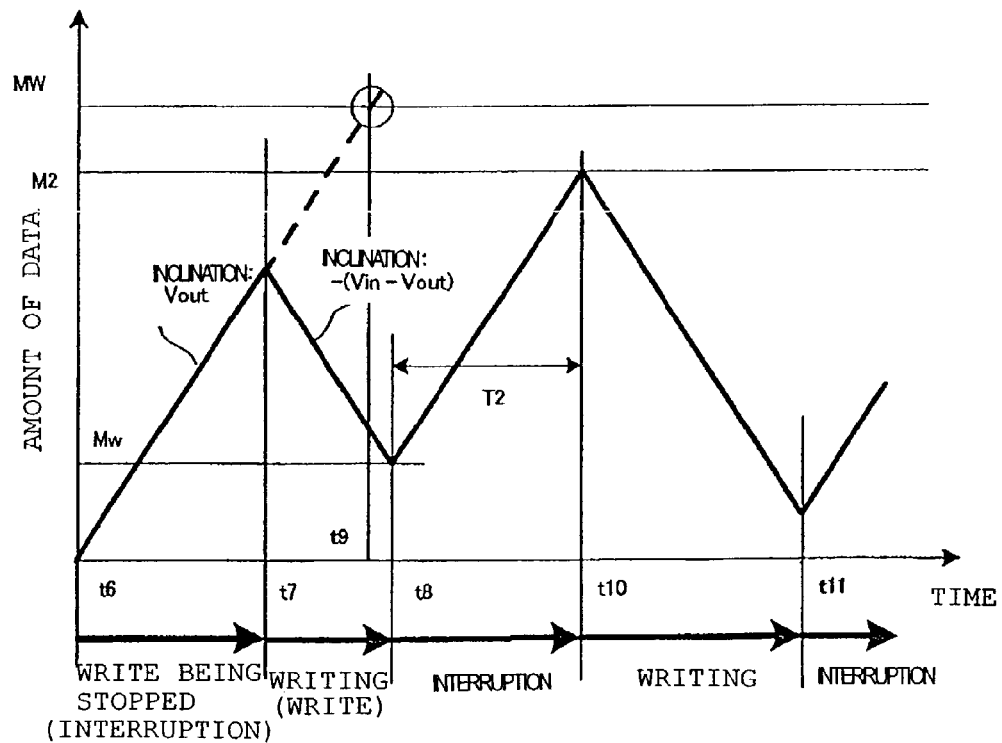
FIG. 29 illustrates a time variation in an amount of data in a write buffer memory during a recording operation.

Furthermore, FIG. 29 illustrates a time variation of an amount of data in the write buffer memory 39 during a recording operation of the optical disc apparatus 807. During a recording operation of the optical disc apparatus 807, data is sent from the host computer 38 to the write buffer memory 39 at a velocity of Vout. Thus, while the optical head 12 is not writing data to the optical disc (time t6 to t7), the amount of data in the write buffer memory 39 increases at a velocity of Vout.

On the other hand, while the optical head 12 is writing data (time t7 to t8), the amount of data in the write buffer memory 39 decreases at a velocity of Vin−Vout. In the recording operation of the optical disc apparatus 807, all recorded data output from the host computer 38 should be written to the optical disc 2. For this effect, a state (t9) in which the amount of data in the write buffer memory 39 reaches the buffer memory size and there will be no more space in the write buffer memory 39 to receive the recorded data output from the host computer 38 should be avoided. Thus, the amount of data stored in the write buffer memory 39 should be prevented from exceeding a predetermined amount M2. The predetermined amount M2 is preferably approximately half the size MW of the write buffer memory 39.

This is the amount considering the possibility that a retry process, etc., may occur during the recording operation of the apparatus, the writing operation of the optical head 12 may be interrupted and data may be stored in the write buffer memory 39 again. By the way, this predetermined amount M2 may also be a value other than approximately half the size MW of the write buffer memory 39.

Suppose the amount of data in the write buffer memory 39 at time t8 during a recording operation of the apparatus is Mw (<M2). Then, the optical head 12 stops the write operation for time T2 calculated by:

$$T2 = (M2 - Mw)/Vout \quad (18)$$

and can execute another process. Hereinafter, this time T2 will be referred to as "float T2."

In other words, even if the optical head 12 stops the write operation at time t8, if the optical head 12 restarts the write operation at time t10 at which the amount of data in the write buffer memory becomes M2, all the recorded data output from the host computer 38 is recorded in the optical disc 2.

Thus, focusing on the amount of data Mr in the read buffer memory 37 during a reproduction operation of the optical disc apparatus and the amount of data Mw in the write buffer memory 39 during a recording operation of the optical disc apparatus, it is possible to calculate floats T1 and T2 during which the optical head 12 can stop the read operation and write operation and execute tilt detection during this time.

Figure 30:
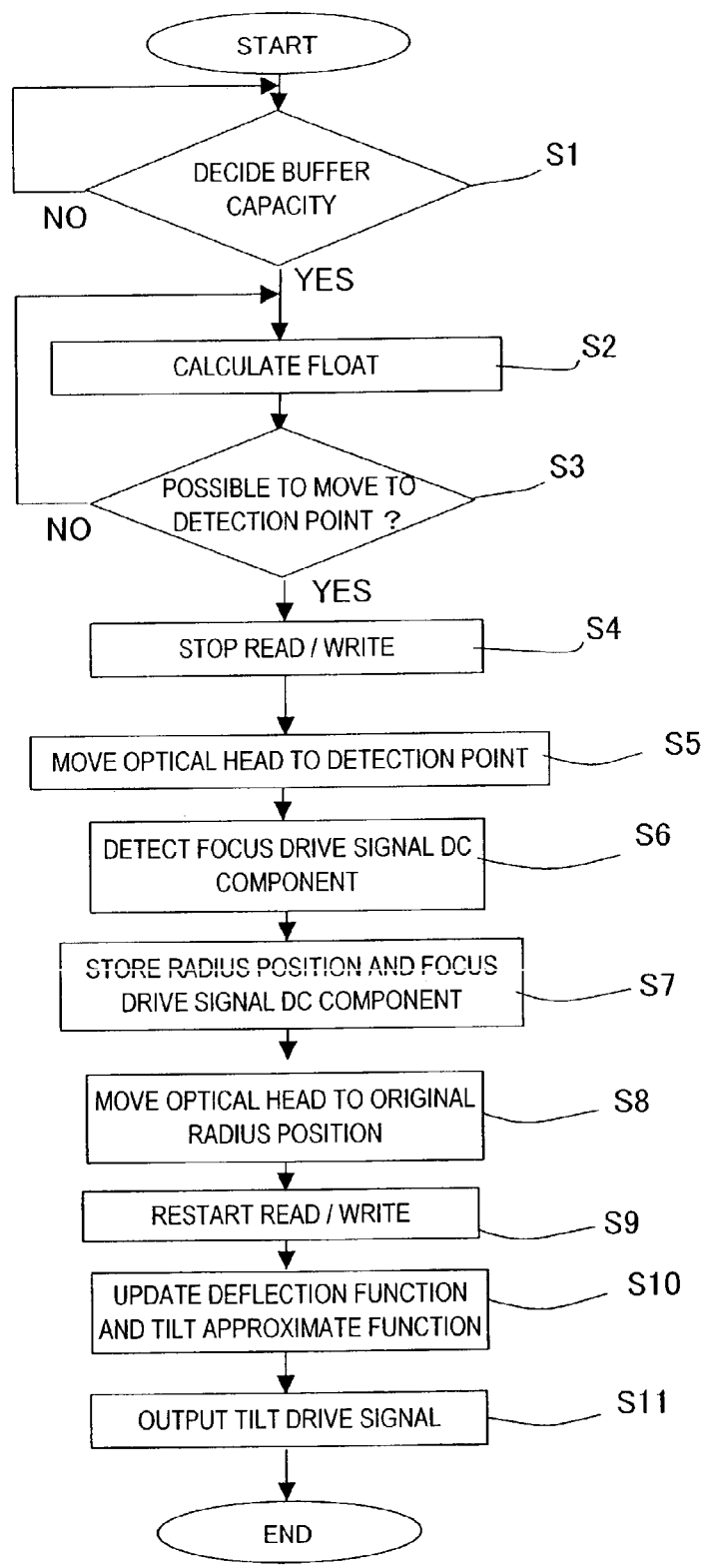
FIG. 30 is a flow chart showing a procedure for complementary detection.

As in the cases of the fifth and sixth embodiments, this embodiment performs tilt detection in two stages; initial detection at startup and complementary detection during an operation of the apparatus. Initial detection is carried out in the same way as in the fifth and sixth embodiments and complementary detection is carried out at the above-described floats T1 and T2. FIG. 30 is a flow chart showing a procedure for complementary detection by the optical disc apparatus 807.

First, suppose the optical disc apparatus 807 is performing a reproduction operation. The microcomputer 21 decides whether the amount of data Mr in the read buffer memory 37 exceeds the predetermined capacity M1 or not (S1). If it exceeds the predetermined capacity M1, the microcomputer 21 calculates the float T1 from the current amount of data Mr according to expression (17) (S2). The microcomputer 21 decides whether there is any detection point to which the optical head 12 can move from the current position to detect the DC component of the focus drive signal and from which the optical head 12 can return to the current position again within the float T1 (S3). If there is such an executable detection point, the optical head 12 stops the read operation (S4) and moves to the above-described detection point which has been decided to be executable (S5). At the detection point to which the head has moved, the microcomputer 21 detects the DC component of the focus drive signal (S6) and stores the relationship between the detection result and radius position as numerical data in the focus memory 22 (S7). Then, the optical head 12 moves to the original radius position (S8) and restarts a read operation (S9).

On the other hand, if the optical disc apparatus 807 is performing a recording operation, the microcomputer 21 decides whether the amount of data Mw in the write buffer memory 39 falls below the predetermined capacity M2 or not first (S1). The microcomputer 21 calculates the float T2 from the current amount of data Mw according to expression (18) (S2). The microcomputer 21 decides whether there is any detection point to which the head 12 can move from the current position to detect the DC component of the focus drive signal and from which the optical head 12 can return to the current position again within the float T2 (S3). If there is such an executable detection point, the optical head 12 stops the write operation (S4) and moves to the above-described detection point which has been decided to be executable (S5). At the detection point to which the head has moved, the microcomputer 21 detects the DC component of the focus drive signal (S6) and stores the relationship between the detection result and radius position as numerical data in the focus memory 22 (S7). Then, the optical head 12 moves to the original radius position (S8) and restarts a write operation (S9).

Such complementary detection of the apparatus during reproduction and recording is executed by the microcomputer 21 deciding whether there is a time enough for the optical head 12 to move from the current position to the predetermined detection point and detect the DC value of the focus drive signal, from the amount of data stored in the read buffer memory 37 and write buffer memory 39.

Furthermore, the microcomputer 21 recalculates and updates a deflection function and tilt approximate function using the numerical data stored through the complementary detection and initial detection data (S10). Furthermore, the microcomputer 21 always generates and outputs a tilt drive signal at the current radius position using the updated tilt approximate function (S11). The objective lens 4 is inclined by the output tilt drive signal, making it possible to realize satisfactory reproduction and recording. As a result, the update of the deflection function and tilt approximate function is reflected in tilt control through complementary detection as appropriate.

Then, tilt control of the objective lens when the optical disc apparatus 807 can operate reproduction at a higher multiple velocity than recording will be explained. In this case, by changing time intervals of updating the deflection function and tilt approximate function between reproduction and recording using the read buffer memory 37 and write buffer memory 39, it is possible to appropriately update the deflection function and tilt approximate function and secure the appropriate accuracy of approximation for reproduction and recording. The "higher multiple velocity" refers to rotating a disc faster than a rotation speed defined by the specification to increase the data transfer rate during recording or reproduction.

Figure 31:
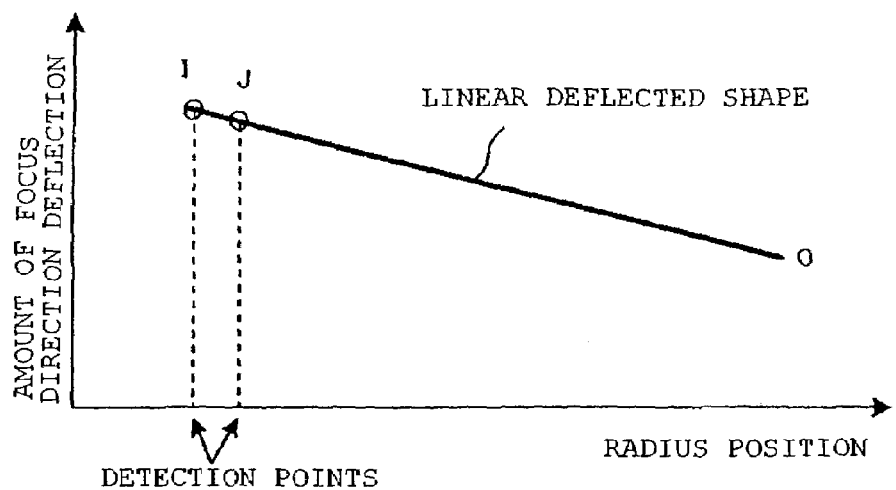
FIG. 31 is a schematic view of a deflected shape of the disc.

FIG. 31 shows the deflected shape of the disc when the deflection of the disc is assumed to be linear. In this case, because the deflection of the tilt is assumed to be linear, the tilt is constant at any position between detection point I at the inner radius and detection point O at the outer radius of the disc. Therefore, it is possible to calculate the deflection function and tilt approximate function by detecting and calculating the DC component of focus drive signal values at the detection points I and J at the inner radius through initial detection at startup. However, since the actual deflection of the disc generally increases toward the outer radius, the deflection function is different from the actual deflected shape.

Figure 32:
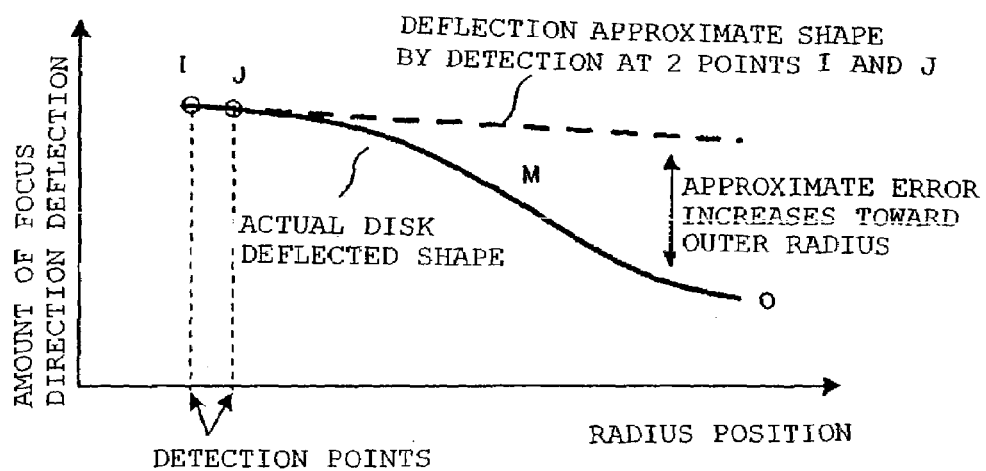
FIG. 32 is a schematic view of a relationship between a deflection function and actual deflected shape of the disc.

FIG. 32 shows a deflection function and a deflected shape of a disc. It is apparent from this figure that while an approximate error is small near the detection points I and J at the inner radius, the approximate error is greater near the detection point M at an intermediate radius than near the detection points I and J and the approximate error further increases toward the detection point O at the outermost radius. That is, when a straight line is used as the deflection function, the approximate error increases toward the outer radius.

Thus, when the optical disc 2 is reproduced or recorded continuously at a high multiple velocity, the speed at which the optical head moves toward the outer radius of the disc also increases, and therefore as the rotation speed increases, the time intervals for carrying out complementary detection should be reduced to update the deflection function and tilt approximate function more frequently.

Figure 33:
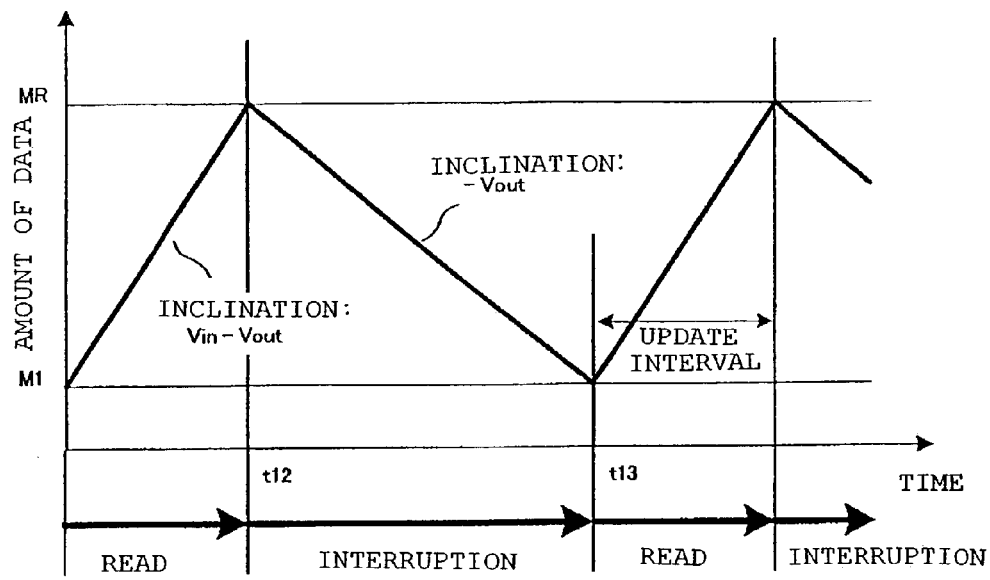
FIG. 33 illustrates a time variation of an amount of data in a read buffer memory during a reproduction operation.

FIG. 33 shows a time variation of the amount of data in the read buffer memory 37 when the optical disc apparatus is performing a reproduction operation. When the apparatus is performing a reproduction operation, if the optical head 12 stops the read operation at time t12 at which the amount of data in the read buffer memory 37 reaches the read buffer memory size MR, the amount of data in the read buffer memory 37 reduces at a velocity of Vout. Then, if the optical head 12 restarts the read operation at time t13 at which the amount of data in the read buffer memory 37 reaches M1, the reproduction data output to the host computer 38 is not interrupted.

Therefore, it is possible to carry out complementary detection during this time period of t12 to t13 and update the deflection function. Then, when the read operation of the optical head 12 is restarted, the data is stored in the read buffer memory 37 at a velocity of Vin−Vout. When there is some room in the amount of data in the read buffer memory 37, it is possible for the optical head 12 to stop the read operation again and update the deflection function and tilt approximate function again. Therefore, it is apparent that the time interval for updating the deflection function when the apparatus is performing a reproduction operation depends on the velocity of Vin−Vout at which data is stored in the read buffer memory 37.

Figure 34:
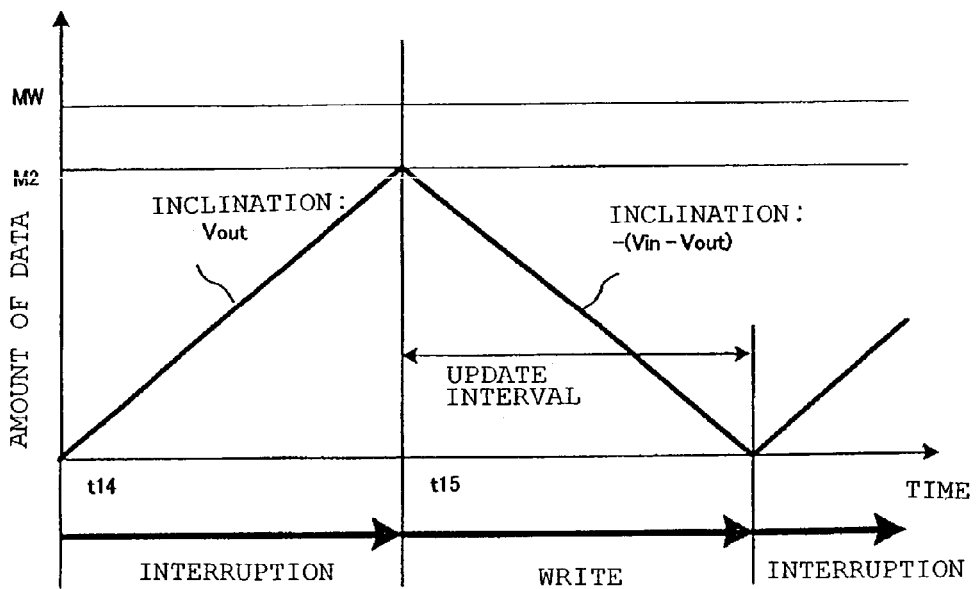
FIG. 34 illustrates a time variation of an amount of data in a write buffer memory during a recording operation.

On the other hand, FIG. 34 shows a time variation of the amount of data in the write buffer memory 39 during a recording operation of the apparatus. During a recording operation of the optical disc apparatus, the optical head 12 stops the write operation at time t14 at which the amount of data in the write buffer memory 39 is reduced to 0, the amount of data in the write buffer memory 39 increases at a velocity of Vout. Then, if the optical head 12 restarts the write operation at time t15 at which the amount of data in the write buffer memory 39 reaches M2, it is possible to record all the recorded data output from the host computer 38 in the optical disc 2.

Thus, it is possible to store or detect data for this time period from t14 to t15 and update the deflection function. Then, when the write operation of the optical disc 12 is restarted, the amount of data in the write buffer memory 39 decreases at a velocity of Vin−Vout. When there is a room in the capacity of the write buffer memory, the optical head 12 can stop the write operation again and update the deflection function again. Therefore, it is apparent that the time interval for updating the deflection function during recording depends on the velocity Vin−Vout at which the data in the write buffer memory 39 decreases.

Figure 35:
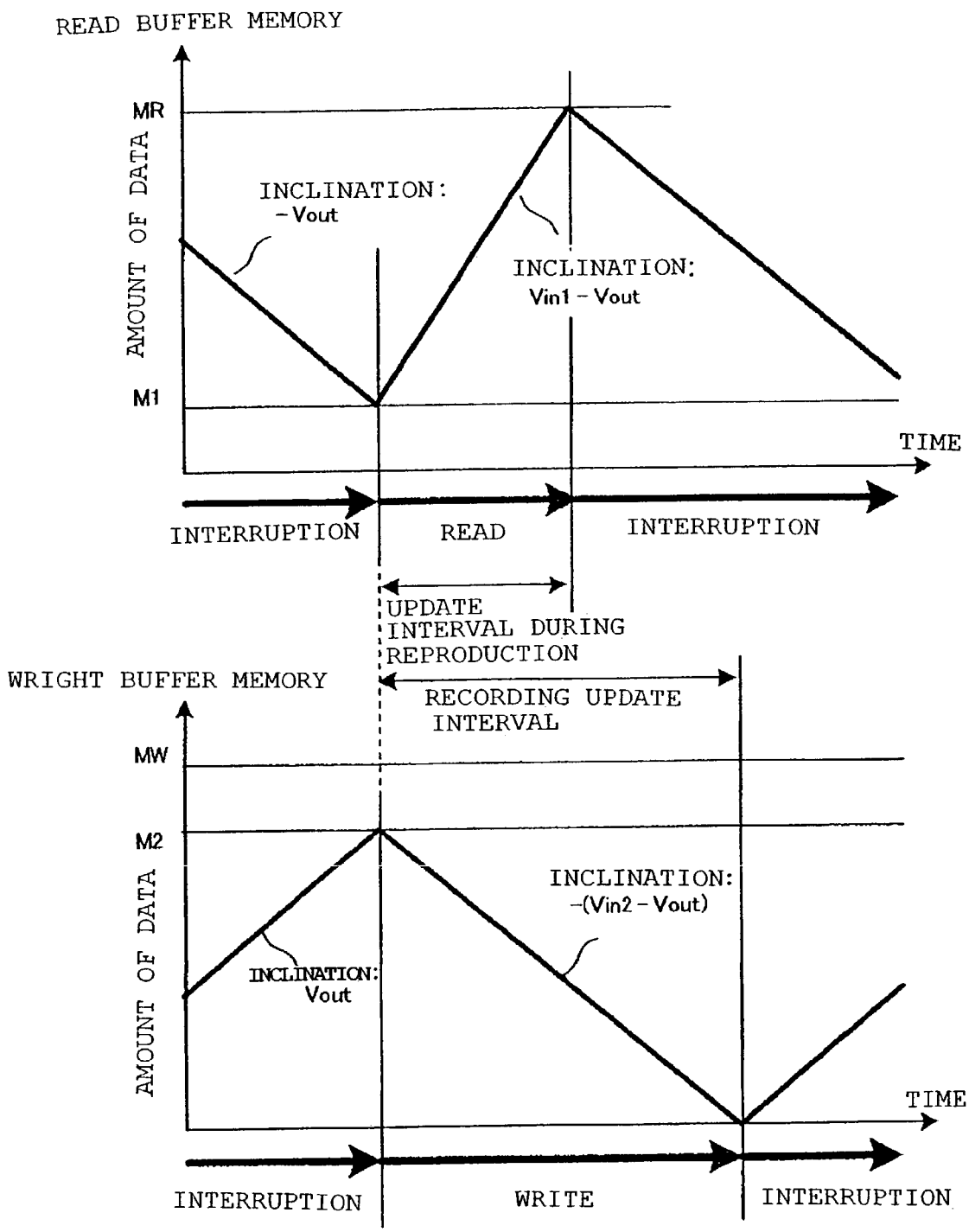
FIG. 35 illustrates a difference between time intervals of updating a deflection function during reproduction and during recording.

FIG. 35 shows time variations in the amount of data in the read buffer memory 37 and write buffer memory 39 at the optical disc apparatus that performs reproduction at a higher multiple velocity than recording. Suppose Vin during reproduction is Vin1 and Vin during recording is Vin2. Since reproduction is performed at a higher multiple velocity than recording, a relationship Vin1>Vin2 is established. From this relationship, the velocity Vin1−Vout at which the amount of data in the read buffer memory 37 increases during a reproduction operation of the apparatus becomes greater than the velocity Vin2−Vout at which the amount of data in the write buffer memory 39 decreases during recording by the apparatus.

Here, the timing at which the optical head 12 stops the read operation is the timing at which the amount of data in the read buffer memory 37 reaches the read buffer memory size MR and the timing at which the optical head 12 stops the write operation is the time at which the amount of data in the write buffer memory 39 is reduced to 0. During a read operation of the optical head 12, the maximum amount of data stored in the read buffer memory 37 is equal to the maximum amount of data stored in the write buffer memory 39 while the write operation by the optical head 12 is stopped and a relationship:

$$MR-M1=M2 \quad (19)$$

is established. In this case, from FIG. 21, it is apparent that the time interval for updating the deflection function during reproduction at a higher multiple velocity is shorter than the time interval for updating the deflection function during recording.

That is, the time interval for updating the deflection function during reproduction at higher multiple velocity can be shortened compared to that during recording, which means that the necessity from the standpoint of keeping the appropriate accuracy of approximation between reproduction and recording is satisfied.

Thus, according to this embodiment, it is possible for the optical head 12 to decide the timing for stopping a read operation or write operation taking advantage of the fact that data is stored in the read buffer memory 37 and write buffer memory 39 and perform complementary detection as appropriate. Therefore, it is possible to update the deflection function and tilt approximate function without interrupting the flow of reproduction data output to the host computer 38 during a reproduction operation of the optical disc apparatus or without interrupting the flow of recorded data output from the host computer 38 during a recording operation, and thereby perform appropriate tilt control.

Furthermore, it is possible to secure the accuracy of approximation of an appropriate deflection function for reproduction and recording for an optical disc apparatus represented by a CD-R/RW in particular that operates reproduction at a higher multiple velocity than recording.

Being capable of performing reproduction and recording always in a good condition, this embodiment is suitable for reproduction or recording of code data of a computer or data made up of coded music information that requires continuity.

Although the first to seventh embodiments refer to the optical disc having a single recording layer, the optical disc apparatus according to the first to seventh embodiments can be adapted to an optical disc having a plurality of recording layers. When the optical disc 2 is a two-layer disc having a first and second data recording layers, it is possible to determine a deflection function and tilt approximate function by carrying out the above-described initial detection operation and complementary detection operation on the respective data recording layers. However, if there are many detection points during initial detection, carrying out the same initial detection on the two data recording layers results in an extended time required for the initial detection. When the extension of the time required for initial detection matters, the above-described initial detection is carried out on the first data recording layer using the detection points A to G and initial detection is carried out on the second data recording layer using only the detection points E to G. Then, for the focus drive signal values at the detection points A to D on the second data recording layer, the focus drive signal values at the detection points A to D for the first data recording layer are used. This is because even if the data recording layer consists of two layers, the difference in the deflected shape is small at the inner radius of the optical disc 2 and the tilt angles of the two data recording layers are substantially equal. Using such a detection method allows the accuracy of detection to be substantially maintained even if the detection time is shortened.

Furthermore, the fifth to seventh embodiments are not provided with a circuit for measuring a drive current output from the first focus drive section 16a and second focus drive section 16b, but it is also possible to adopt the configuration of the first embodiment to detect a drive current. That is, the fifth to seventh embodiments can be combined with the first embodiment as appropriate. Furthermore, it is also possible to adopt a tilt coil as means for tilting the objective lens. In this case, a drive current to drive the tilt coil is determined based on a tilt approximate value obtained from the tilt approximate function and the objective lens is inclined according to the deflected shape of the disc. That is, the fifth to seventh embodiments can also be combined with the first to fourth embodiments as appropriate.

It is to be noted that the method of controlling the optical disc apparatus and the controlling method for the objective lens explained in the first to seventh embodiments are carried out by sequentially controlling the respective components of the optical disc apparatus. A program for allowing the microcomputer to execute the procedure is stored in an EEPROM, ROM, RAM, hard disc and computer-readable recording medium such as magnetic recording medium.

What is claimed is:

1. An optical disc apparatus comprising:
a light source for irradiating a light beam onto a data side of an information recording medium;
converging means for converging said light beam;
transferring means for transferring said converging means in such a way that the distance between said converging means and said data side changes;
photo-receiving means for receiving returned light of the light beam reflected by said data side;
converging state detecting means for generating a signal according to a converging state of the light beam on the data side of said information recording medium based on a signal from said photo-receiving means;
focus controlling means for outputting a drive signal to said transferring means based on a signal from said converging state detecting means and controlling said light beam in such a way that said light beam is in a predetermined converging state;
tilting means for tilting said converging means;
tilt calculating means for determining at least one coefficient of an approximate function used for approximating a shape of said data side based on said drive signal and determining an amount of tilt of said data side at an arbitrary radius position using said determined at least one coefficient and the approximate function; and
tilt controlling means for driving the tilting means according to said amount of tilt and irradiating the light beam onto said data side in a direction substantially perpendicular to said data side.

2. The optical disc apparatus according to claim 1, wherein said tilt calculating means updates said determined at least one coefficient based on said drive signal obtained after said at least one coefficient is determined.

3. An optical disc apparatus comprising:
a light source for irradiating a light beam onto a data side of an information recording medium;
converging means for converging said light beam;
transferring means for transferring said converging means in such a way that the distance between said converging means and said data side changes;
photo-receiving means for receiving returned light of the light beam reflected by said data side;
converging state detecting means for generating a signal according to a converging state of the light beam on the data side of said information recording medium based on a signal from said photo-receiving means;
focus controlling means for outputting a drive signal to said transferring means based on a signal from said converging state detecting means and controlling said light beam in such a way that said light beam is in a predetermined converging state;
tilting means for tilting said converging means;
tilt calculating means for determining at least one calculation expression used for calculating a shape of said data side based on said drive signal and determining an amount of tilt of said data side using said determined calculation expression; and
tilt controlling means for driving the tilting means according to said amount of tilt and irradiating the light beam onto said data side in a direction substantially perpendicular to said data side,
wherein said tilt calculating means updates said determined calculation expression based on said drive signal obtained after said calculation expression is determined,
wherein after setting said information recording medium in said optical disc apparatus and before recording or reproducing said information recording medium, said tilt calculating means executes initial detection of a drive signal to determine said calculation expression and complementary detection of a drive signal to update said calculation expression while recording or reproducing said information recording medium.

4. The optical disc apparatus according to claim 3, wherein said tilt calculating means determines said calculation expression at a plurality of detection points set at different radius positions of said data side based on drive signals obtained when said light beam irradiates said data side.

5. The optical disc apparatus according to claim 4, wherein said tilt calculating means detects a drive signal and updates said calculation expression every time said light beam arrives at or passes through any one of said plurality of detection points while performing recording or reproduction on said information recording medium.

6. The optical disc apparatus according to claim 4, wherein said tilt calculating means detects said drive signal at a plurality of positions in the radius direction of said information recording medium before said initial detection, decides a deflected shape of said data side from the detection result and determines the position of a detection point for detecting a drive signal during said initial detection and said complementary detection based on said decision result.

7. The optical disc apparatus according to claim 6, wherein when said tilt calculating means decides that the deflected shape of said data side is a first shape, said tilt calculating means sets a plurality of detection points during said initial detection and said complementary detection in such a way that said plurality of detection points are placed more densely at the inner radius and outer radius than the intermediate radius of said data side, and when said tilt calculating means decides that the deflected shape of said data side is a second shape, said tilt calculating means sets said plurality of detection points during said initial detection and said complementary detection in such a way that said plurality of detection points are spaced uniformly at the inner radius, intermediate radius and outer radius.

8. The optical disc apparatus according to claim 3, further comprising a temperature sensor, wherein said complementary detection is performed when the output of said temperature sensor changes by a predetermined value or more.

9. The optical disc apparatus according to claim 5, wherein the calculation expression of said tilt calculating means includes a deflection function to approximate tilt on said data side and the degree of said deflection function is set when said calculation expression is updated during said complementary detection.

10. The optical disc apparatus according to claim 5, further comprising rotating means for rotating said information recording medium at a predetermined number of rotations, wherein said drive signal output by focus controlling means is an average value of a period which is an integer multiple of a period during which said information recording medium makes one rotation.

11. The optical disc apparatus according to claim 5, further comprising: rotating means for rotating said information recording medium at a predetermined number of revolutions; and rotation controlling means for controlling said rotating means to a constant linear velocity when recording or reproduction is carried out on said information recording medium and controlling said rotating means to a constant angular velocity during said initial detection.

12. The optical disc apparatus according to claim 5, wherein when said drive signal is detected twice or more at one of said plurality of detection points, said tilt calculating means updates said calculation expression using an average value of drive signal values obtained so far.

13. The optical disc apparatus according to claim 5, wherein when said drive signal is detected twice or more at one of said plurality of detection points and the detection result is outside a predetermined range, with respect to a value of the drive signal which has been detected and obtained so far, said tilt calculating means decides the detection result to be inaccurate and stops the update of said calculation expression.

14. The optical disc apparatus according to claim 3, wherein said at least one calculation expression includes a deflection function that approximates deflection of the data side and a tilt approximate function that indicates tilt at an arbitrary position in the radius direction.

15. The optical disc apparatus according to claim 4, wherein the calculation expression of said tilt calculating means includes a line graph function.

16. The optical disc apparatus according to claim 15, wherein said tilt calculating means detects a drive signal every time said light beam arrives at or passes through any one of said plurality of detection points while recording or reproducing is being performed on said information recording medium and updates all drive signal values used when deciding said line graph function based on the detection result and updates the line graph based on the updated drive signal value.

17. The optical disc apparatus according to claim 16, wherein a plurality of detection points during said initial detection and said complementary detection is set so that the detection points are more densely located at the inner radius and outer radius than the intermediate radius of said data side.

18. The optical disc apparatus according to claim 4, wherein when the data side of said information recording medium includes a first and second recording layers, the tilt calculating means determines at least one calculation expression used to calculate the shape of said first and second recording layers and calculates an amount of tilt of said first and second recording layers and said converging means using said determined calculation expression.

19. The optical disc apparatus according to claim 1, wherein said transferring means includes a pair of focus actuators which drive said converging means in an approximately perpendicular direction to said data side, and said tilting means is said pair of focus actuators which drives said converging means so as to incline with respect to said data side.

20. The optical disc apparatus according to claim 1, wherein said transferring means includes a pair of focus actuators which drive said converging means in an approximately perpendicular direction to said data side, and said tilting means includes a tilt actuator which drives said converging means so as to incline with respect to said data side.

21. A method of controlling an optical disc apparatus comprising the steps of:
    driving converging means for converging a light beam irradiated onto a data side of an information recording medium in a direction perpendicular to said data side so as to change the converging state of said light beam;
    receiving returned light of the light beam reflected by said data side;
    generating a signal according to the converging state of the light beam on the data side of said information recording medium based on a signal from said photo-receiving means;
    outputting a drive signal to means for transferring said converging means based on a signal from said converging state detecting means and controlling said light beam in such a way that said beam is in a predetermined converging state;
    determining at least one coefficient of an approximate function used to approximate the shape of said data side based on said drive signal and calculating an amount of tilt of said data side at an arbitrary radius position using said determined at least the coefficient calculation and the approximate function; and
    driving means for changing tilt of said converging means according to said amount of tilt and controlling the light beam in such a way that the light beam is irradiated onto said data side in a direction substantially perpendicular to said data side.

22. A method of controlling an optical disc apparatus comprising the steps of:
    (A) acquiring a plurality of focus drive signals which are obtained by irradiating a light beam onto a data side of an information recording medium at a plurality of detection positions different from each other in a radial direction of the information recording medium, under the condition that a focus control is conducted such that the light beam irradiating the data side is in a predetermined converging state;
    (B) determining at least one coefficient of an approximate function used for approximating a shape of said data side based on the acquired focus drive signals; and
    (C) calculating an amount of tile of said data side at an arbitrary radius position by using the determined coefficient and the approximate function and changing the tilt of an objective lens based on the calculated amount of the tilt.

23. The method of controlling an optical disc apparatus according to claim 22, further comprising the steps of:
    (D) acquiring at least one focus drive signal which is obtained by irradiating a light beam onto a data side at at least one predetermined detection position under the focus control state, after performing step (B);
    (E) updating said calculation expression based on said focus drive signals acquired in steps (A) and (D); and
    (F) calculating the amount of tilt of said data side by using the updated calculation expression and changing the tilt of an objective lens based on the calculated amount of the tilt.

24. A method of controlling an optical disc apparatus comprising the steps of:
    (A) acquiring a plurality of focus drive signals which are obtained by irradiating a light beam a data side of an information recording medium at a plurality of detection positions different with each other in a radial direction of the information recording medium, under the condition that a focus control is conducted such that the light beam irradiating the data side is in a predetermined converging state;
(B) determining at least one calculation expression used for calculating a shape of said data side based on the acquired focus drive signals;
(C) calculating an amount of tilt of said data side by using the determined calculation expression and changing the tilt of an objective lens based on the calculated amount of the tilt;
(D) acquiring at least one focus drive signal which is obtained by irradiating a light beam onto a data side at at least one predetermined detection position under the focus control state, after performing step (B);
(E) updating said calculation expression based on said focus drive signals acquired in steps (A) and (D); and
(F) calculating the amount of tilt of said data side by using the updated calculation expression and changing the tilt of an objective lens based on the calculated amount of the tilt;
wherein the steps (D) to (F) are performed every time said light beam arrives at or passes through said at least one predetermined position of said information recording medium.

25. A method of controlling an optical disc apparatus comprising the steps of:
(A) acquiring a plurality of focus drive signals which are obtained by irradiating a light beam a data side of an information recording medium at a plurality of detection positions different with each other in a radial direction of the information recording medium, under the condition that a focus control is conducted such that the light beam irradiating the data side is in a predetermined converging state;
(B) determining at least one calculation expression used for calculating a shape of said data side based on the acquired focus drive signals;
(C) calculating an amount of tilt of said data side by using the determined calculation expression and changing the tilt of an objective lens based on the calculated amount of the tilt;
(D) acquiring at least one focus chive signal which is obtained by irradiating a light beam onto a data side of at least one predetermined detection position under the focus control state, after performing step (B);
(E) updating said calculation expression based on said focus drive signals acquired in steps (A) and (D); and
(F) calculating the amount of tilt of said data side by using the updated calculation expression and changing the tilt of an objective lens based on the calculated amount of the tilt;
wherein the method of controlling an optical disc apparatus further comprises the step of detecting a temperature in said optical disc apparatus, wherein the steps (D) to (F) are performed in the case where the change of the temperature exceeds a predetermined value.

26. The method of controlling an optical disc apparatus according to claim 23, wherein the detection positions where said focus drive signals are acquired in steps (A) and (D) are arranged more densely at an inner radius and an outer radius of said information recording medium than at an intermediate radius.

27. The method of controlling an optical disc apparatus according to claim 23, wherein the approximate function includes a polygonal line graph function.

28. The method of controlling an optical disc apparatus according to claim 27, further comprising the step of correcting all the focus drive signals acquired in step (A) based on the focus drive signal acquired in step (D), and wherein step (E) is performed based on the corrected focus drive signals.

29. The optical disc apparatus according to claim 1, wherein the tilt calculating means determines at least two coefficients of the approximate function.

30. The method of controlling an optical disc according to claim 21, wherein at least two coefficients of an approximate function are determined.

31. The method of controlling an optical disc according to claim 22, wherein at least two coefficients of an approximate function are determined.

* * * * *

UNITED STATES PATENT AND TRADEMARK OFFICE
CERTIFICATE OF CORRECTION

PATENT NO. : 7,054,241 B2  Page 1 of 1
APPLICATION NO. : 10/326621
DATED : May 30, 2006
INVENTOR(S) : Kenji Kondo et al.

It is certified that error appears in the above-identified patent and that said Letters Patent is hereby corrected as shown below:

Title Page, Item (75):

The second inventor's name should read: -- Yuuichi Kuze --;
The fourth inventor's name should read: -- Shin-ichi Yamada --;
The suffix -- shi -- should be inserted after the city for each inventor;

Column 52:

Line 43, "tile" should read -- tilt --;

Column 54:

Line 1, "chive" should read -- drive --.

Signed and Sealed this

Nineteenth Day of December, 2006

JON W. DUDAS
*Director of the United States Patent and Trademark Office*